(12) United States Patent
Von Seggern et al.

(10) Patent No.: US 11,136,947 B2
(45) Date of Patent: Oct. 5, 2021

(54) AIR CLEANER WITH HIGH PERFORMANCE SEAL AND MEDIA

(71) Applicants: Michael J. Von Seggern, Kearney, NE (US); Trenton Yendra, Gibbon, NE (US); Daniel Copley, Oxford, MS (US); John Nichols, Oxford, MS (US); Jason LaMarr Tate, Thompsons Station, TN (US); Brian T. Ehrenberg, Kansas City, MO (US)

(72) Inventors: Michael J. Von Seggern, Kearney, NE (US); Trenton Yendra, Gibbon, NE (US); Daniel Copley, Oxford, MS (US); John Nichols, Oxford, MS (US); Jason LaMarr Tate, Thompsons Station, TN (US); Brian T. Ehrenberg, Kansas City, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 245 days.

(21) Appl. No.: 16/014,611

(22) Filed: Jun. 21, 2018

(65) Prior Publication Data
US 2018/0372036 A1  Dec. 27, 2018

Related U.S. Application Data

(60) Provisional application No. 62/630,587, filed on Feb. 14, 2018, provisional application No. 62/525,631, filed on Jun. 27, 2017.

(51) Int. Cl.
*F02M 35/024* (2006.01)
*B01D 46/24* (2006.01)
(Continued)

(52) U.S. Cl.
CPC ... *F02M 35/02433* (2013.01); *B01D 46/2411* (2013.01); *B01D 46/2414* (2013.01);
(Continued)

(58) Field of Classification Search
CPC ............ B01D 46/2411; B01D 46/2414; B01D 2271/027; B01D 46/0002;
(Continued)

(56) References Cited

U.S. PATENT DOCUMENTS 6,312,491 B2   11/2001  Coulonvaux
7,311,748 B2 *  12/2007  Holmes .............. B01D 46/0002
                                                        55/498
(Continued)

FOREIGN PATENT DOCUMENTS

DE    10 2009 021512 A1   11/2010
DE    10 2016 002 954 A1   9/2016
(Continued)

OTHER PUBLICATIONS

U.S. Appl. No. 62/417,722, filed Nov. 4, 2016, Decoster et al.

*Primary Examiner* — Robert Clemente
(74) *Attorney, Agent, or Firm* — Reinhart Boerner Van Deuren P.C.

(57) ABSTRACT

A filter cartridge and filter assembly using the filter cartridge is provided. The filter cartridge having a contoured end member to angularly orient and/or axially orient the filter cartridge, and particularly a seal thereof, relative to a filter housing. The filter housing is reconfigurable to allow it to be used in different locations having different spatial configurations.

23 Claims, 46 Drawing Sheets

(51) Int. Cl.
*F02M 35/04* (2006.01)
*F02M 35/02* (2006.01)

(52) U.S. Cl.
CPC ...... *F02M 35/0202* (2013.01); *F02M 35/048* (2013.01); *B01D 2271/027* (2013.01); *F02M 35/02425* (2013.01); *F02M 35/02483* (2013.01)

(58) Field of Classification Search
CPC ......... F02M 35/02433; F02M 35/0202; F02M 35/048; F02M 35/02483; F02M 35/02425
See application file for complete search history.

(56) References Cited

U.S. PATENT DOCUMENTS

| | | | |
|---|---|---|---|
| 8,361,181 | B2 | 1/2013 | Osendorf et al. |
| 8,828,123 | B2 | 9/2014 | Holzmann et al. |
| 2007/0084170 | A1 | 4/2007 | Ehrenberg |
| 2009/0230051 | A1 | 9/2009 | Holmes et al. |
| 2012/0067014 | A1 | 3/2012 | Dhiman et al. |
| 2012/0181224 | A1 | 7/2012 | Rapin |
| 2014/0102060 | A1 | 4/2014 | Kato et al. |
| 2014/0137525 | A1 | 5/2014 | Cambpell et al. |
| 2014/0165834 | A1 | 6/2014 | Kaufmann et al. |
| 2015/0096931 | A1 | 4/2015 | Jensen |
| 2015/0101295 | A1 | 4/2015 | Thompson et al. |

FOREIGN PATENT DOCUMENTS

| | | |
|---|---|---|
| EP | 2 570 171 A2 | 3/2013 |
| WO | WO 2010/011628 A2 | 1/2010 |
| WO | WO 2014/078796 A2 | 5/2014 |
| WO | WO 2018/111434 A2 | 6/2018 |

* cited by examiner

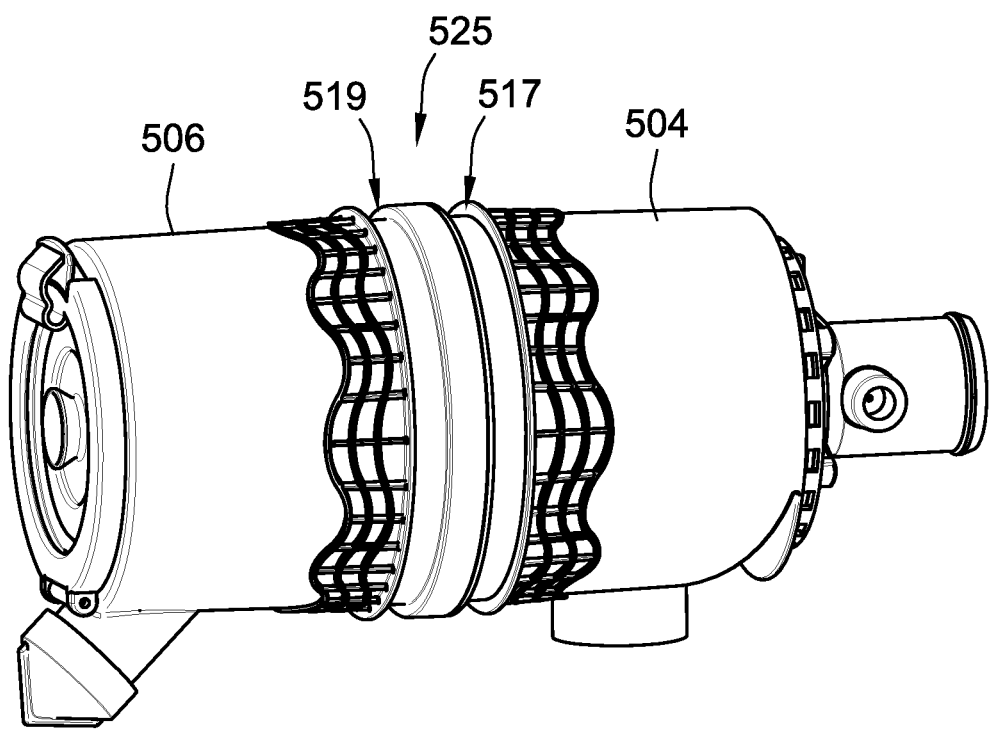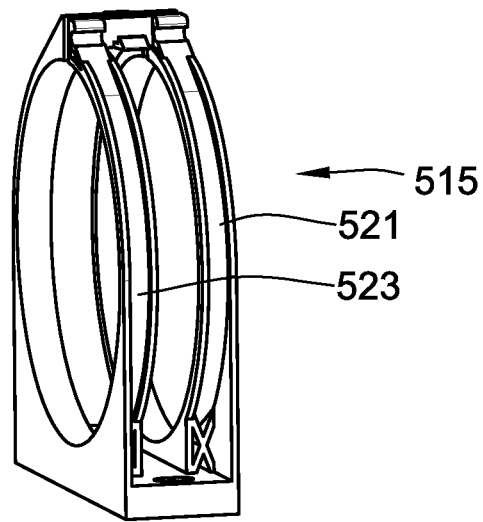
FIG. 39

AIR CLEANER WITH HIGH PERFORMANCE SEAL AND MEDIA

CROSS-REFERENCE TO RELATED PATENT APPLICATIONS

This patent application claims the benefit of U.S. Provisional Patent Application No. 62/525,631, filed Jun. 27, 2017, and U.S. Provisional Patent Application No. 62/630,587, filed Feb. 14, 2018, the entire teachings and disclosure of which are incorporated herein by reference thereto.

FIELD OF THE INVENTION

This invention generally relates to filters and more particularly air filters and systems and methods for filtering air.

BACKGROUND

Filters are used to filter fluids. For example fluids such as air or fuel are filter prior to being used by internal combustion engines to improve performance and reduce the risk of damage to the engine. Many other systems use filters to filter working fluids.

Filter systems also referred to as filter assemblies will often include a reusable housing that houses a replaceable filter cartridge (also referred to as filter element). This reduces overall cost as the housing need not be discarded once the filter media that does the filtering of the fluid becomes spent and can no longer function properly. Only the replaceable filter cartridge gets replaced in this instance.

Due to the large number of applications, it is desirable to make sure that the correct filter element is provided so that a positive seal can be maintained between mating components of the filter cartridge and the filter housing.

Further, the filter system is often located within a larger device such as a vehicle and particularly an engine compartment of a vehicle. Due to the ever increasing complexity of these locations and the desire to make things smaller, it may be difficult to provide a single system that can be installed in different locations, e.g. different engine compartments for different vehicles, and still allow for proper or easy servicing of the filter system.

The present invention provides improvements over the current state of the filter art.

SUMMARY OF THE INVENTION

New and improved filter cartridges, filter housings and filter assemblies are provided. In an embodiment, a filter cartridge including filter media and a contoured end member is provided. The contoured end member includes a contoured alignment portion and a contoured seal portion.

In one embodiment, the contoured alignment portion is an axial end portion of the contoured end member, the axial end portion defines an axially undulating wave profile formed by a plurality of axially extending projections.

In one embodiment, the contoured seal portion provides a radially directed seal surface that has a contoured profile in the axial direction.

In one embodiment, the contoured profile of the contoured seal portion is a wave profile.

In one embodiment, the contoured alignment portion is an axial end portion of the contoured end member. The axial end portion defines a wave profile formed by a plurality of axially extending alignment projections. The contoured seal portion provides a radially directed seal surface that has a contoured profile in the axial direction and is provided by a plurality of axially extending seal projections. The alignment projections extend an axial distance that is at least twice an axial distance of the seal projections.

In one embodiment, the contoured member is formed from at least two pours of material.

In one embodiment, the two pours of material have different rigidities.

In one embodiment, the contoured member includes a preform and a second material poured over, at least in part, the preform. The preform may or may not extend at least in part radially outward from the second material poured over the preform. Poured over may include foamed up around a preform.

In one embodiment, the contoured member has a plurality of axially extending projections that form a wave profile and define a radially facing seal surface and at least one alignment projection extending axially that is positioned radially outward of the wave profile.

In one embodiment, the alignment projection is more rigid than the wave profile.

In one embodiment, the contoured member includes a plurality of castellations that form alternating first and second axially extending slots, the first and second slots having different axial lengths.

In another embodiment, a filter assembly is provided. The filter assembly includes filter cartridge, a filter housing, an alignment feature and a seal feature. The filter cartridge may be according to any embodiment described herein. The filter housing has an internal cavity that receives the filter cartridge. The alignment feature cooperates with the contoured end member of the filter cartridge to angularly align the filter cartridge within the filter housing. The seal feature cooperates with the contoured end member to form a seal between the filter housing and the filter cartridge.

In one embodiment, the housing has a first housing component and the alignment feature is provided by the first housing component. The seal features is provided by a second component attached to the first housing component. In another embodiment, the alignment feature and the seal feature are provided by a single component.

In one embodiment, the second component is snap attached to the first housing component.

In one embodiment, the housing includes a first housing component. The seal and alignment features are provided by a second component attached to the first housing component.

In another embodiment, a filter housing assembly for operably holding a filter element is provided. The filter housing assembly is reconfigurable. The filter housing assembly includes a housing body, a fluid port component and a cover member component. The housing body defines an internal cavity, a first opening into the internal cavity and a second opening into the internal cavity. The housing body includes a first attachment interface proximate the first opening and a second attachment interface proximate the second opening. The fluid port component includes a base member, a first fluid port, and a first housing attachment interface. The first housing attachment interface is engageable with the first attachment interface to secure the fluid port component proximate the first opening with the first fluid port providing fluid communication with the internal cavity through the first opening when the first housing attachment interface is engaged with the first attachment interface. The first housing attachment interface is engageable with the second attachment interface to secure the fluid port component proximate second opening with the first fluid port providing fluid communication with the internal cavity through the second opening when the first housing attachment interface is engaged with the second attachment interface. The cover member component includes a second housing attachment interface. The second housing attachment interface is engageable with the first attachment interface to secure the cover member proximate the first opening, the cover configured to prevent removal of the filter element from the internal cavity through the first opening when the cover member is engaged with the first attachment interface and is in a closed state. The second housing attachment interface is engageable with the second attachment interface to secure the cover member proximate the second opening, the cover configured to prevent removal of the filter element from the internal cavity through the second opening when the cover member is engaged with the second attachment interface and is in a closed state.

In one embodiment, the cover member is, at least in part, movable relative to the housing body to an open state to permit removal of the filter element through the first opening when the cover member is attached to the first attachment interface. The cover member is, at least in part, movable relative to the housing body to an open state to permit removal of the filter element through the second opening when the cover member is attached to the second attachment interface.

In one embodiment, the housing body includes a first seal surface for sealing engagement with the filter element when the cover member is engaged with the first attachment interface and a second seal surface for sealing engagement with the filter element when the cover member is engaged with the second attachment interface.

In one embodiment, the first opening defines a first central axis and the second opening defines a second central axis. The cover member is, at least in part, pivotable relative to the housing body about a first hinge axis defined between the first attachment interface and the second housing attachment interface that is perpendicular to the first central axis to an open state to permit removal of the filter element through the first opening when the cover member is attached to the first attachment interface. The cover member is, at least in part, pivotable relative to the housing body about a second hinge axis defined between the second attachment interface and the second housing attachment interface that is perpendicular to the second central axis to an open state to permit removal of the filter element through the second opening when the cover member is attached to the second attachment interface.

In one embodiment, the housing body includes a first seal surface for sealing engagement with the filter element when the cover member is engaged with the first attachment interface and a second seal surface for sealing engagement with the filter element when the cover member is engaged with the second attachment interface.

In one embodiment, the first attachment interface includes a first axially extending annular flange providing the first seal surface and the second attachment interface includes a second axially extending annular flange providing the second seal surface. The cover member includes an annular collar member, the collar member defining an annular groove. The annular groove axially receives the first axially extending annular flange when the cover member is attached to the first attachment interface and that forces a seal member of the filter element into the first seal surface when in the closed state. The annular groove axially receives the second axially extending annular flange when the cover member is attached to the second attachment interface and that forces a seal member of the filter element into the second seal surface when in the closed state.

In one embodiment, the first attachment interface includes a first axially extending annular flange providing the first seal surface and the second attachment interface includes a second axially extending annular flange providing the second seal surface. The cover member includes an annular collar member the collar member defining an annular ring. The annular ring forces a seal member of the filter element into the first seal surface when the cover member is attached to the first attachment interface and when in the closed state. The annular ring forces a seal member of the filter element into the first seal surface when the cover member is attached to the first attachment interface and when in the closed state.

In one embodiment, the first attachment interface includes at least one first radially extending projection. The second attachment interface includes at least one second radially extending projection. The first housing attachment interface of the first fluid port component includes at least one third radially extending projection configured to cooperate with at least one first radially extending projection when the first fluid port component is attached to the first attachment interface and configured to cooperate with at least one second radially extending projection when the first fluid port component is attached to the second attachment interface. The second housing attachment interface of the cover member includes at least one fourth radially extending projection configured to cooperate with at least one first radially extending projection when the cover member is attached to the first attachment interface and in the closed state. The second housing attachment interfaces is configured to cooperate with at least one second radially extending projection when the cover member is attached to the second attachment interface and in the closed state.

In one embodiment, the first fluid port component includes a seal surface for sealing a filter element to the first fluid port, the seal surface being removable from the housing body when the first fluid port component is removed from the housing body.

In one embodiment, a second fluid port fluidly communicates with the internal cavity.

In an embodiment, a reconfigurable filter housing assembly for operably holding a filter element is provided. The filter housing includes a housing body, a fluid port component and a cover member. The housing body defines an internal cavity, a first opening into the internal cavity and a second opening into the internal cavity. The fluid port component includes a first fluid port. In a first configuration, the first fluid port component is attached to the housing body proximate the first opening with the first fluid port in fluid communication with the internal cavity through the first opening and the cover member is attached to the housing body proximate the second opening. The cover member is configured to prevent removal of the filter element through the second opening when in a closed state. The cover member is configured to permit removal of the filter element through the second opening when in an open state. In a second configuration, the first fluid port component is attached to the housing body proximate the second opening with the first fluid port in fluid communication with the internal cavity through the second opening. The cover member is attached to the housing body proximate the first opening. The cover member is configured to prevent removal of the filter element through the first opening when in a closed state. The cover member is configured to permit removal of the filter element through the first opening when in an open state.

In an embodiment, filter assembly is provided. The filter assembly includes a reconfigurable filter housing assembly. The housing body further including a second fluid. A filter element including filter media is positioned within the internal cavity of the housing body. The filter element is insertable into the housing body through the second opening in the first configuration and insertable into the housing body through the first opening in the second configuration.

In one embodiment, the second fluid port in fluid communication with the internal cavity. The filter housing assembly includes a first housing seal surface provided by the housing body. A second housing seal surface is provided by the housing body. A third housing seal surface provided by the fluid port component. The filter element is sealable between the second fluid port and the first fluid port to force dirty fluid to flow through the filter media as fluid flows between the first and second fluid ports. The filter element includes a first element seal member and a second element seal member. The first filter element seal member sealing with the third housing seal member and the second element seal member sealing with the second housing seal surface when inserted into the internal cavity in the first configuration and with the cover member in a closed state. The second element seal member sealing with the first housing seal surface when inserted into the internal cavity in the first configuration and with the cover member in a closed state.

In one embodiment, the housing body is formed from a plurality of body components connected together, one of the housing body components carrying the second fluid port.

In one embodiment, the cover member includes an annular collar member. The collar member defines an annular ring. The annular ring forces the second element seal member into the second housing seal surface when in the first configuration and when the cover member is in the closed state. The annular ring forces the second element seal member into the first housing seal surface when in the second configuration and when the cover member is in the closed state.

In one embodiment, the housing body includes a first annular ring adjacent the first opening including a radially extending projection and a second annular ring adjacent the second opening including a radially extending projection. The fluid port component includes a radially extending projection engaging the radially extending projection of the first annular ring in the first configuration to secure the fluid port component to the housing body and engaging the radially extending projection of the second annular ring in the second configuration to secure the fluid port component to the housing body. The cover member includes a radially extending projection engaging the radially extending projection of the second annular ring in the first configuration to secure the cover member to the housing body and engaging the radially extending projection of the first annular ring in the second configuration to secure the cover member to the housing body.

In one embodiment, the radially extending projection of the cover member is provided by a latch for selectively disengaging and engaging the radially extending projection of the cover member relative to the radially extending projection of the first and second annular rings to allow for selective securement and release of the filter element from the filter housing body.

In one embodiment, the annular collar member is hingedly attached for selective pivoting between the closed state and the open state.

In one embodiment, the cover member includes an annular collar member. The collar member has an outer diameter being greater than a diameter of the first opening and being greater than a diameter of the second opening. The annular collar has an inner diameter being smaller than the diameter of the first opening and being smaller than the diameter of the second opening. The annular collar overlapping, in part, the first opening when in the closed state in the second configuration and overlapping, in part, the second opening when in the closed state in the first configuration.

In one embodiment, the filter element includes an extension of filter media extending between a first end a second end. The filter element includes a first end cap attached to the first end being a closed imperforate end cap and including the second element seal member. The first end cap is exposed through the annular collar when in the closed state in the first configuration. The first end cap exposed through the annular collar when in the closed state in the second configuration.

In one embodiment, the housing assembly includes a first axially extending annular flange proximate the first opening providing the first seal surface. The housing assembly includes a second axially extending annular flange proximate the second opening providing the second seal surface. The annular collar defines an annular groove. The second axially extending annular flange and a portion of the first end cap are axially received into the annular groove if in the first configuration with the cover member in the closed state. The first axially extending annular flange and a portion of the first end cap are axially received into the annular groove if in the second configuration with the cover member in the closed state.

In one embodiment, the closed imperforate end cap includes an axially extending portion that is axially received in the groove when the cover member is in the closed state.

In one embodiment, the axially extending portion is an annular ring portion. The ring portion radially tapers when moving axially away from the filter media.

In one embodiment, the axially extending portion is formed from a resilient member that may be radially flexed when engaged by the cover member in the closed state.

BRIEF DESCRIPTION OF THE DRAWINGS

FIG. 39 illustrates the mounting bracket and the filter housing of the filter assembly of FIG. 33;

DETAILED DESCRIPTION OF THE INVENTION

Figure 1:
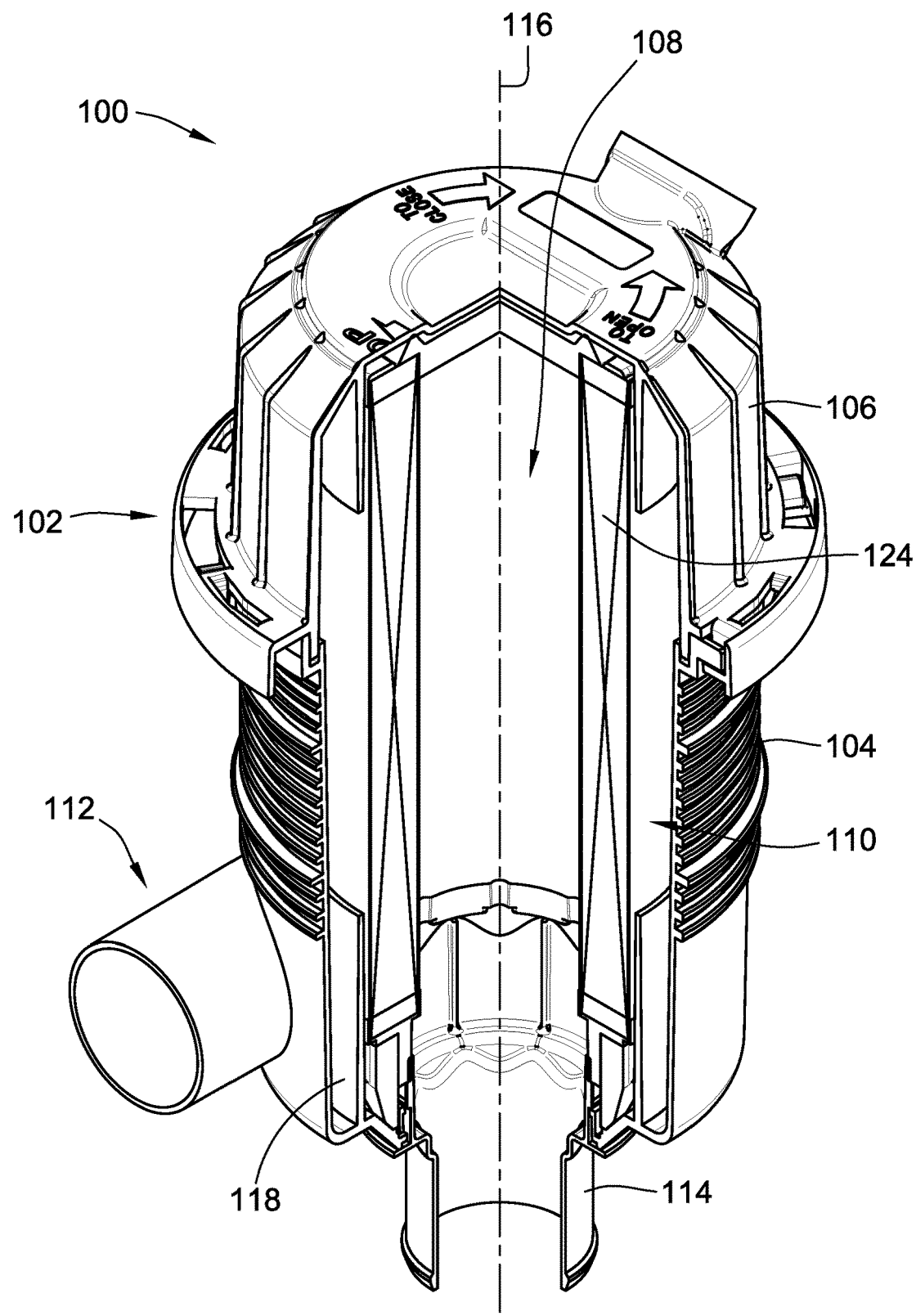
FIG. 1 illustrates an embodiment of a filter assembly in partial cross-section

FIG. 1 illustrates a filter assembly 100 in cross-section. The filter assembly 100 is an air cleaner assembly in this embodiment. The filter assembly 100 includes a housing 102 formed from first and second housing components 104, 106 that define an internal cavity 108. A replaceable filter cartridge 110 (also referred to simply as a filter or as a filter element 110) is located within the internal cavity 108 to filter particulates from the air as it flows from a first fluid port in the form of inlet 112 in the housing 102 to a second fluid port in the form of clean air outlet 114 provided by fluid port component 146. In this embodiment, both the inlet 112 and outlet 114 are formed by or attached to the first housing component 104.

The air inlet 112 is offset from a central axis 116 such that it enters the filter housing 102 in a tangential manner which causes the air to spin within the filter housing 102. Further, the filter housing 102 and particularly the first housing component 104 includes a shield member 118 that prevents the air from directly impinging on the filter media of the replaceable filter cartridge 110 as it enters the filter housing 102.

Figure 2:
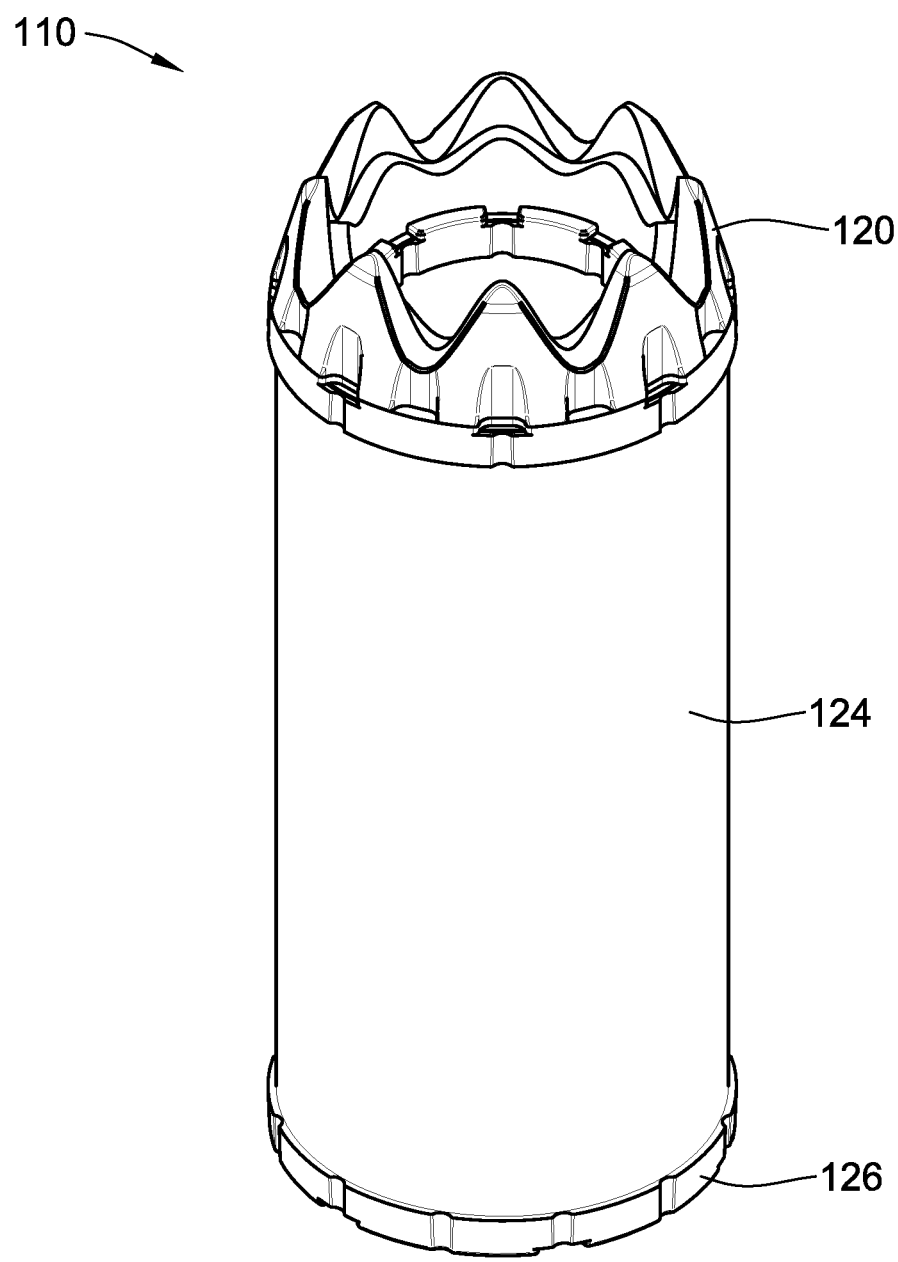
FIG. 2 illustrates a filter element usable in the filter assembly of FIG. 1.
Figure 7:
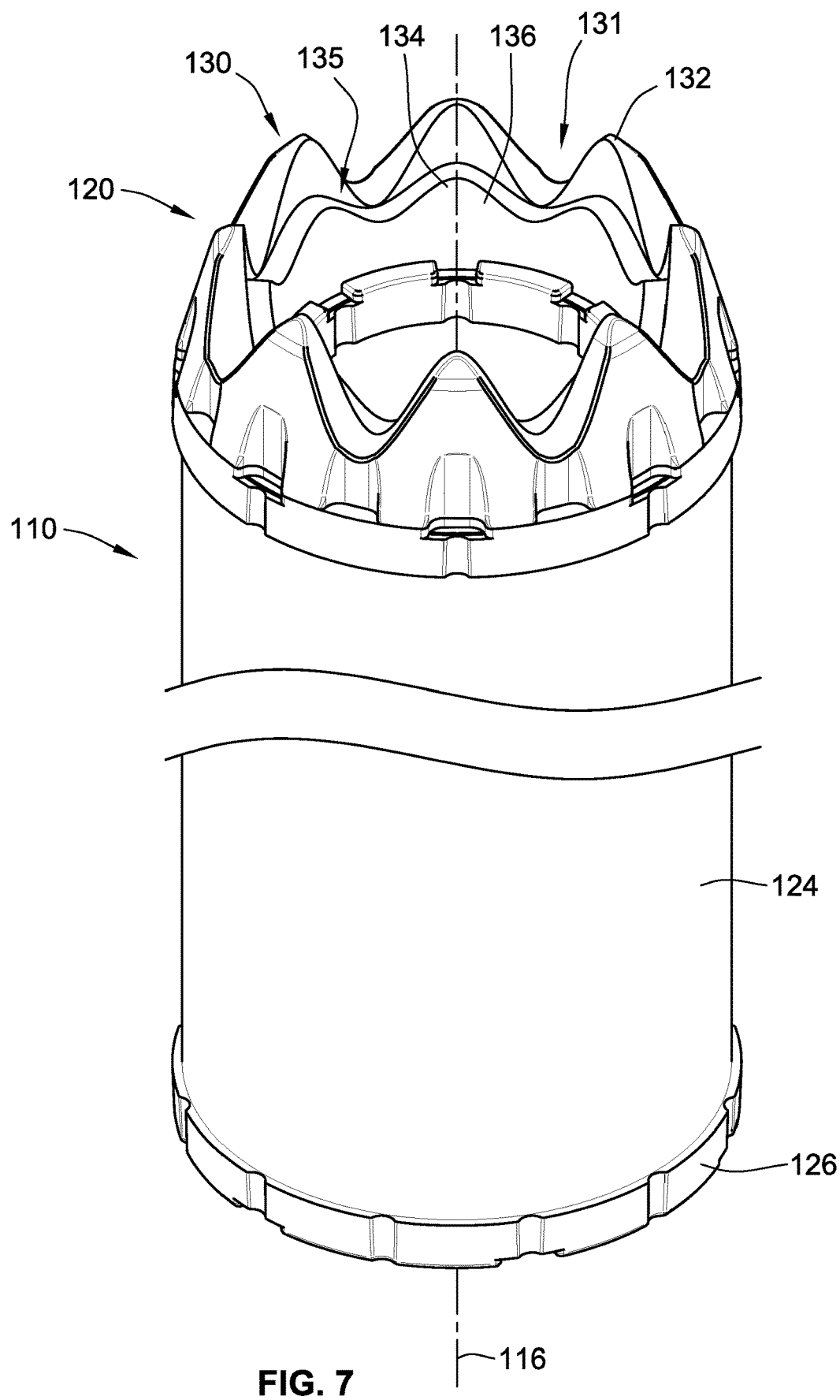
FIGS. 7-9 illustrate a filter element usable in the filter assembly of FIG. 1.
Figure 8:
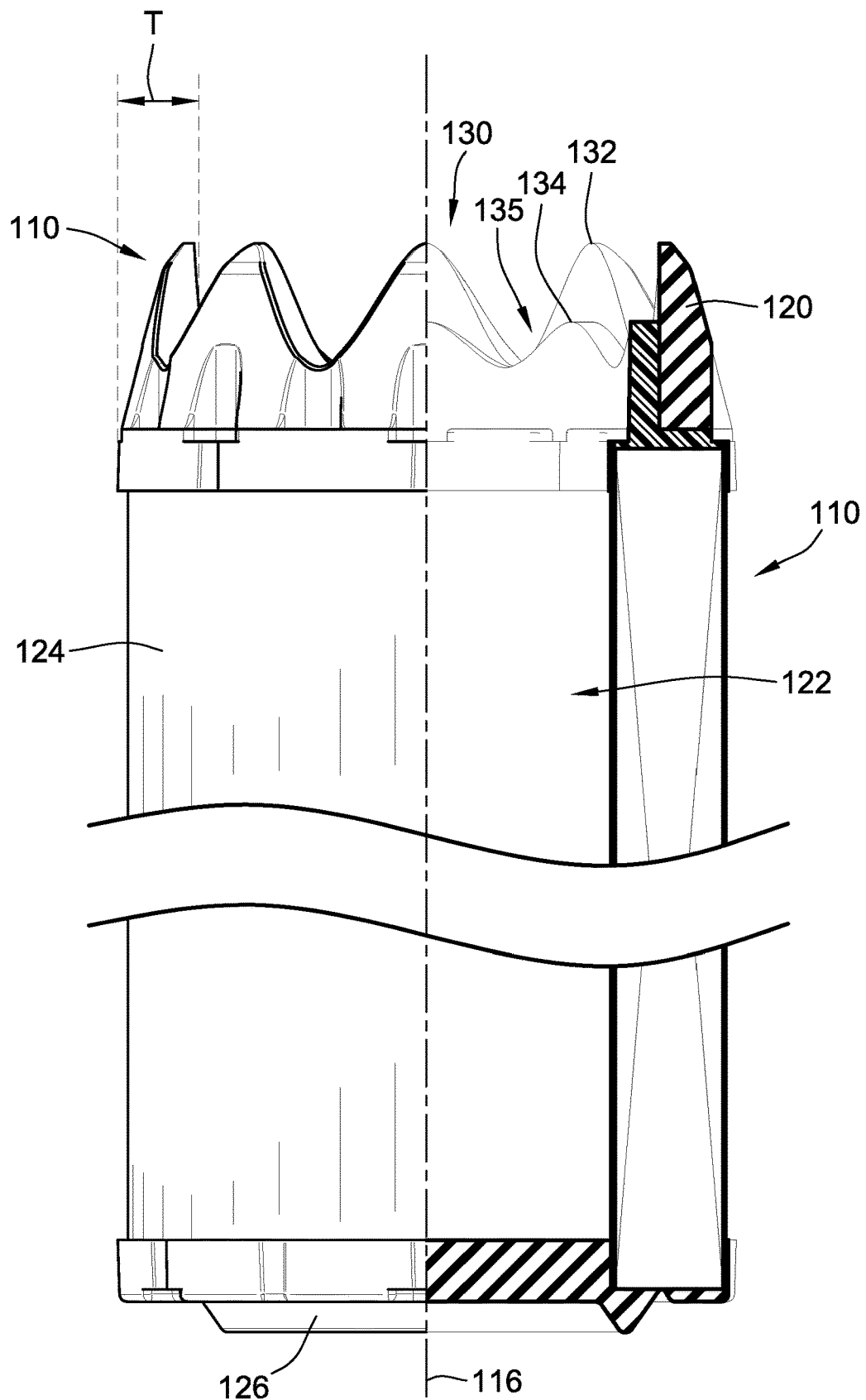

A primary filter cartridge 110 (also referred to as a primary filter) is illustrated in FIGS. 2, 7 and 8. The primary filter 110 includes a contoured end member 120 that will mate with corresponding structure of the housing 102. The contoured end member 120 of the primary filter 110 is an open member that provides fluid communication with an internal cavity 122 of the cylinder of filter media 124 of the primary filter 110. A closed endcap 126 is attached to an opposite end of the filter media 124 of the primary filter 110.

The contoured end member 120 includes a plurality of axially extending projections 130 and intermediate valleys 131 that define an axially undulating first wave profile. The axially extending projections 130 also form an annular wall that surrounds central axis 116 defined by the filter media 124. The thickness t (see FIG. 8) of the projections 130 tapers in the radial direction when moving axially away from the filter media 124 towards tips 132 of the projections 130. Further, a second axially undulating wave profile 135 is provided by inner projections 134 and intermediate valleys 137 of the countered end member 120 on a radially inner side 136 of the annular wall formed by the axially extending projections 130.

Figure 3:
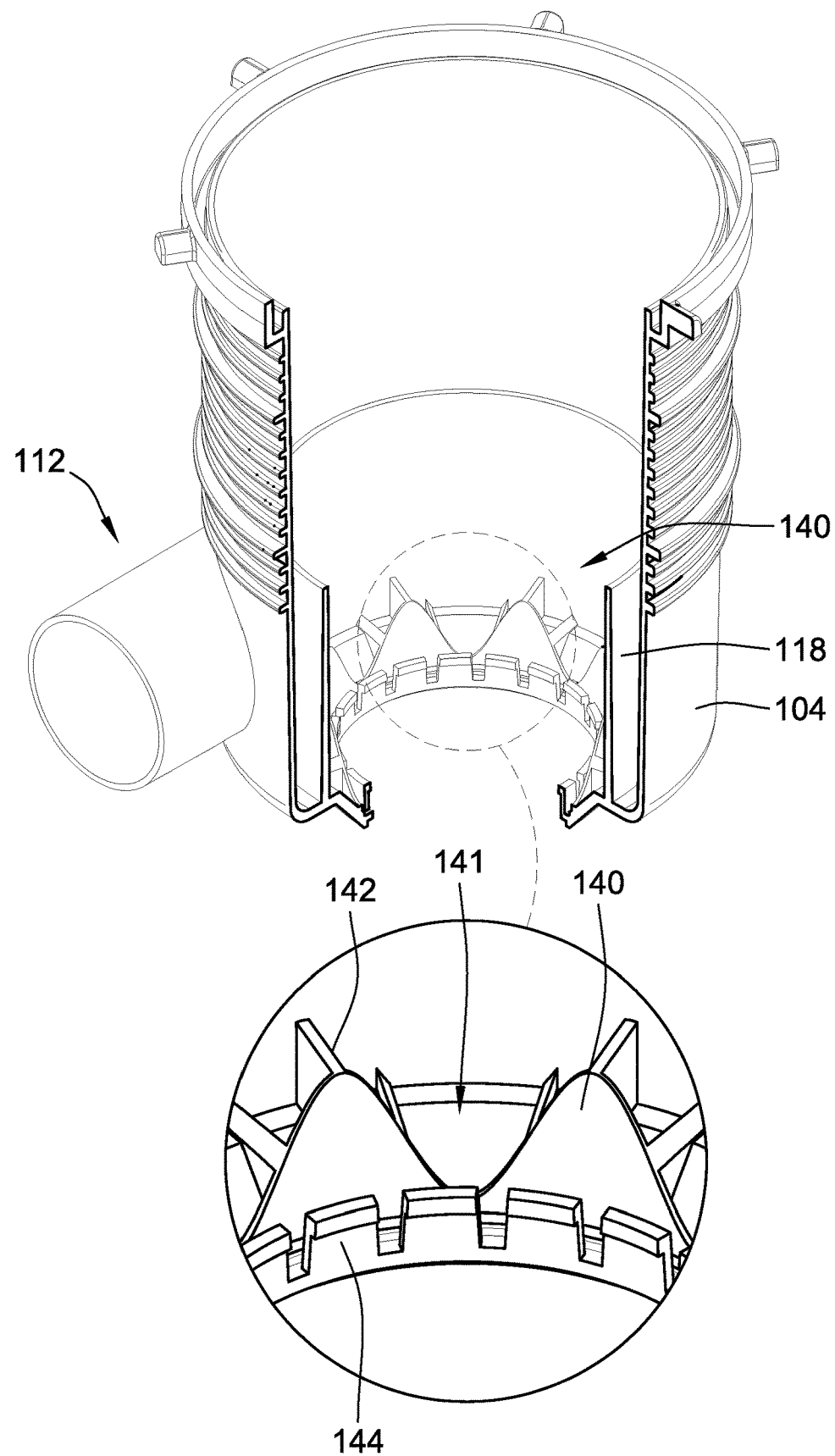
FIG. 3 illustrates a filter housing component of the filter assembly of FIG. 1.

In some embodiments, the outer projections 130 are formed from a first pour of material and the inner wave profile is provided by a second pour of material (order is not important and first and second do not mean order of pouring). Preferably, the first pour (outer pour) is formed from a rigid urethane forming a support/alignment structure and the second pour (inner pour) is formed from a softer seal material, e.g. a FOAM seal/media potting compound. The first pour could be a preformed component attached to the filter media 124 by the second pour. Alternatively, all of the structure provided by the first and second pours could be preformed and then secured to the filter media by potting or embedding. Further yet, all of the structure provided by the first and second pours could be formed as a single component from a single pour, such as from a foamed urethane FIG. 3 illustrates the first housing component 104 in partial cut-away form. FIG. 3 illustrates that the first housing component 104 has a corresponding countered arrangement of axially extending projections 140 and intermediate valleys 141. The axially extending projections 140 also form an axially undulating wave profile. This wave profile mates with the outer wave profile provided by the axially extending projection 130 of countered end member 120 of the primary filter 110. Some radially extending ribbing 142 is also illustrated that is positioned radially outward from the axially extending projections 140 to provide radial support. Some shorter axially extending flexible fingers 144 are positioned radially inward of the axially extending projections 140.

Figure 4:
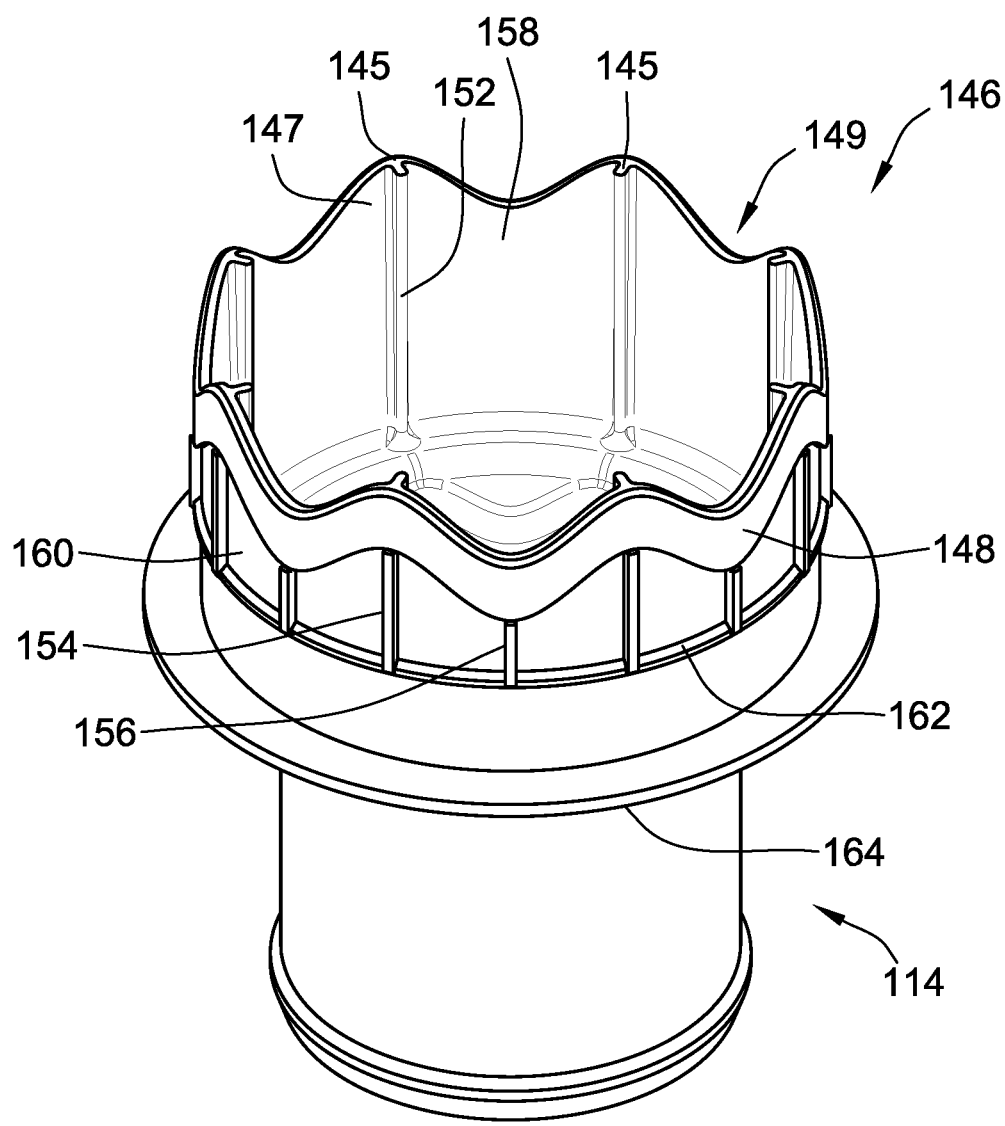
FIG. 4 illustrates a fluid port component attachable to the filter housing component of FIG. 3

FIG. 4 illustrates a snap-in outlet component 146 with a corresponding axially undulating wave profile 148 provided by axially extending projections 147 and intermediate valleys 149, as well. Being "snap in" is simply a feature of this particular embodiment. However, other embodiments may not use snap-in connections or this component 146 could be integrally or unitarily formed with first housing component 104. This wave profile 148 will correspond with the inner wave profile 135 for sealing with the primary filter 110. The snap-in outlet component 146 may include axially extending ribbing 152, 154, 156 on inner and outer radial surfaces 158, 160 for structural strength. The ribbing 154, 156 may not extend the entire axial extension of the outer radial surface 160. A portion of the outer radial surface 160 that does not include ribbing 154, 156 provides the axially undulating wave profile 148 and a radially outward directed sealing surface that has a axially undulating wave profile that will mate with the similarly shaped radially inward directed sealing surface of the filter cartridge, e.g. provided by the axially undulating wave profile 135 radially inner surface 136 of the contoured end member 120.

Figure 13:
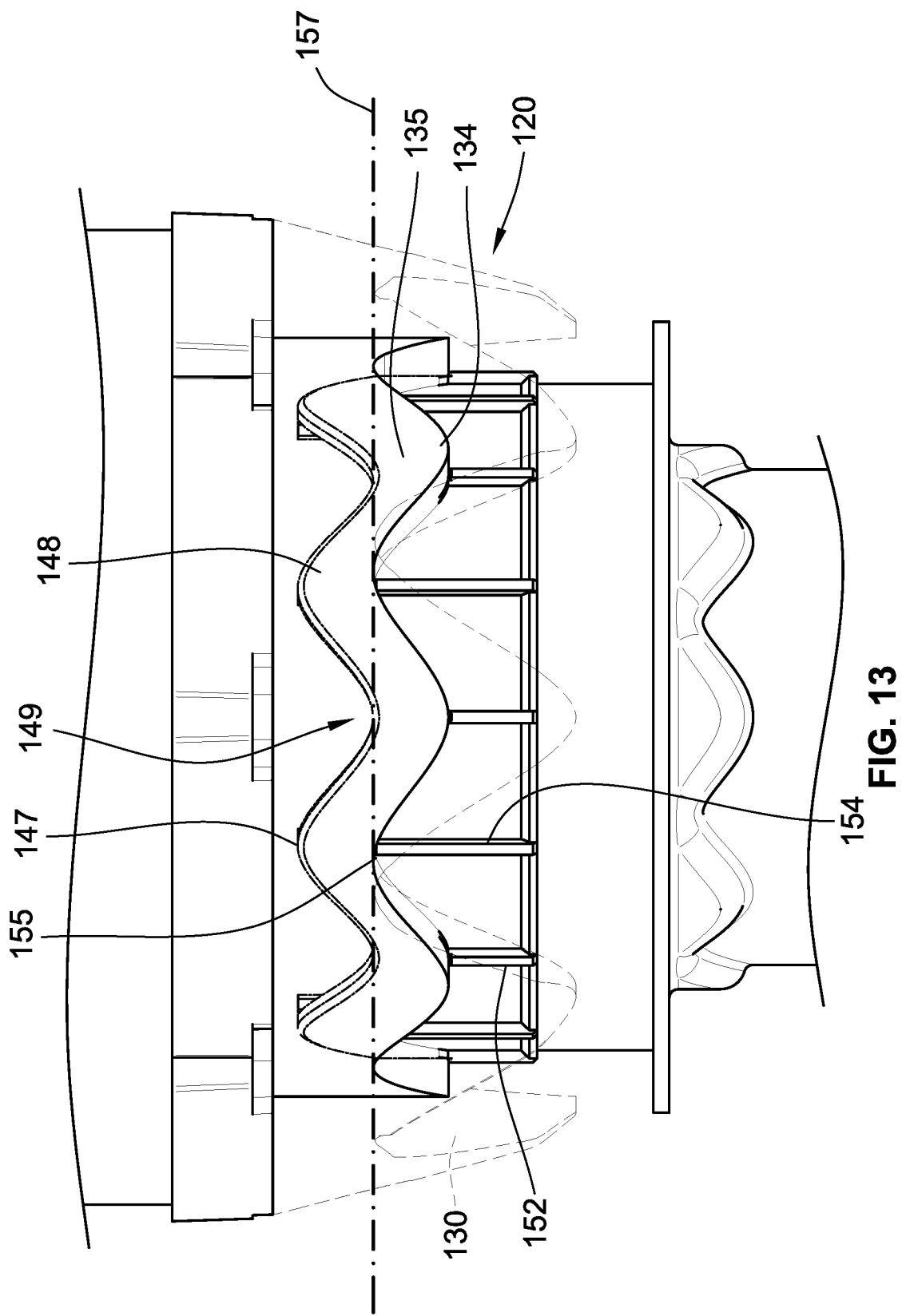
FIG. 13 illustrates the sealing engagement of the filter element of FIGS. 7-9 with the fluid port component of FIG. 4.

With additional reference to FIG. 13, it is notable that the depth of the valleys 149 is such that the ends 155 of ribbing 154 and valleys 149 are at a same axial location (see e.g. dashed line 157 in FIG. 13), or such that the ends 155 are positioned axially between peaks 145 and valleys 149. This arrangement prevents a standard non-undulating seal, e.g. all at a same axial location to be used with the sealing surface provided by the undulating wave profile 148 of the snap-in outlet component 146. It is noted that full ribs such as ribbing 154 is not necessary. For instance, a short nib located proximate ends 155 would be sufficient to force the use of an undulating seal for the filter element 110.

Further, while projections 140 and valleys 141 are illustrated as being formed by the first housing component 104, these components could be formed by the snap-in outlet component 146.

Figure 5:
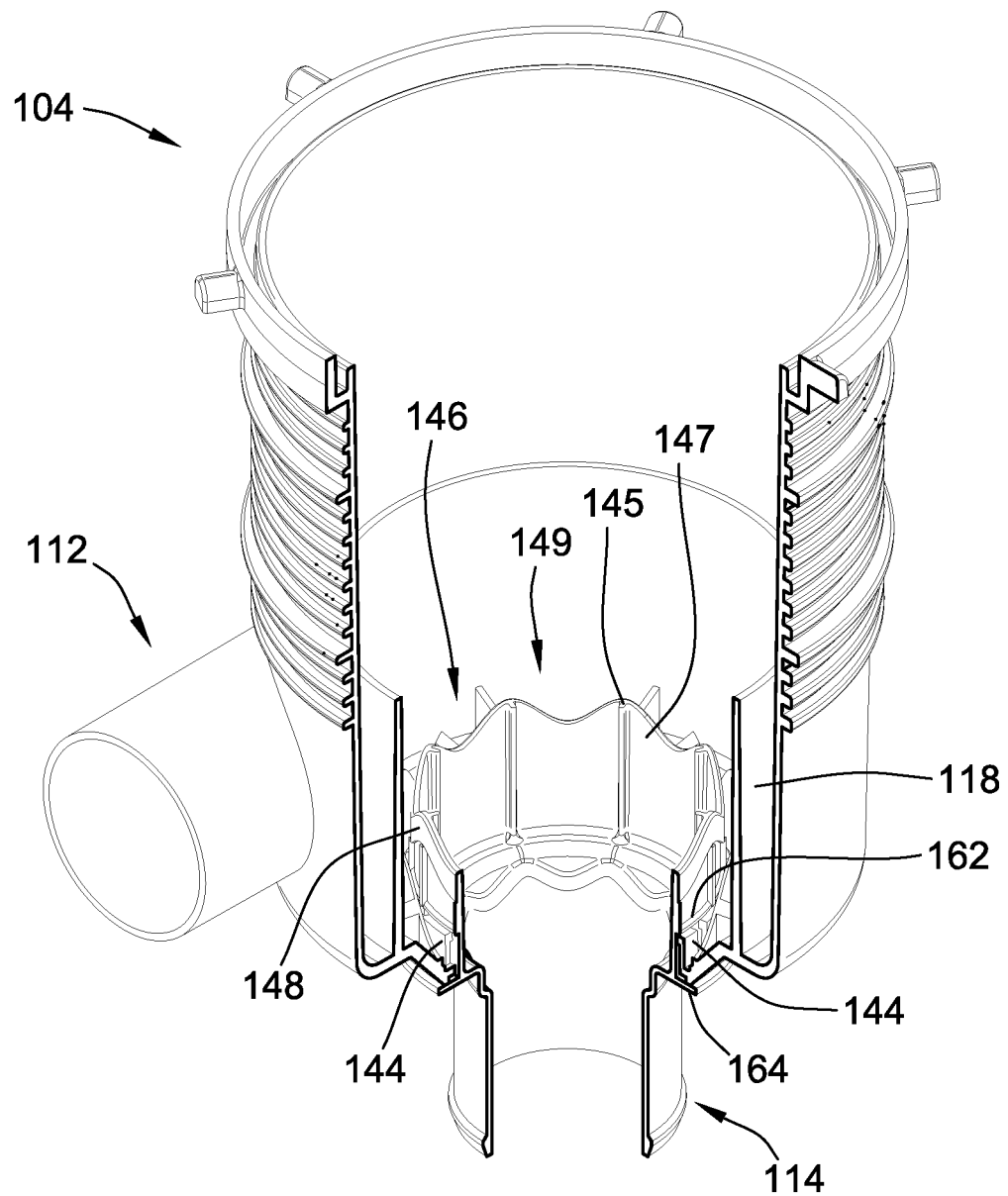
FIGS. 5 and 6 illustrate the filter housing component of FIG. 3 and the fluid port component of FIG. 4 in an assembled state.
Figure 6:
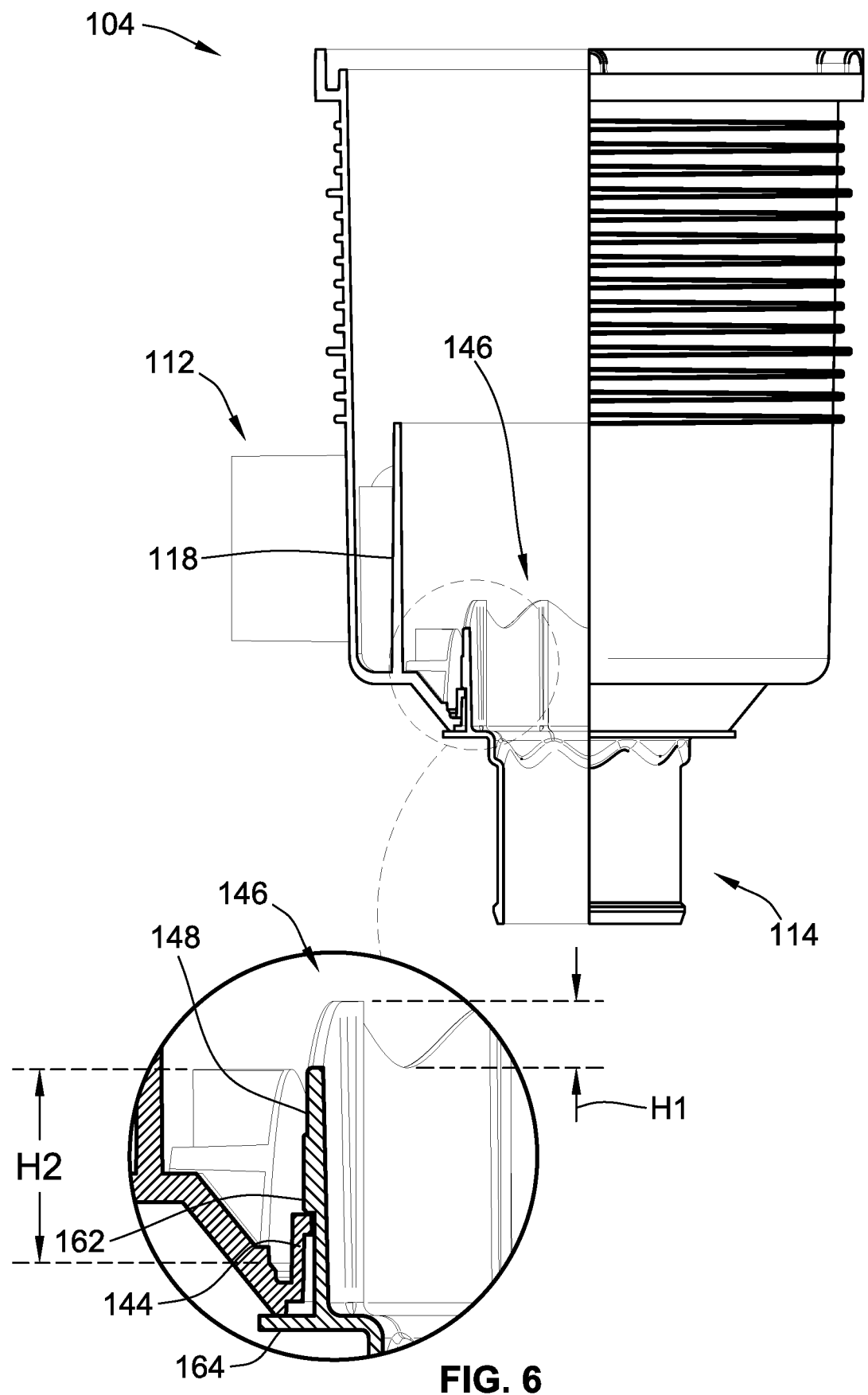
Figure 11:
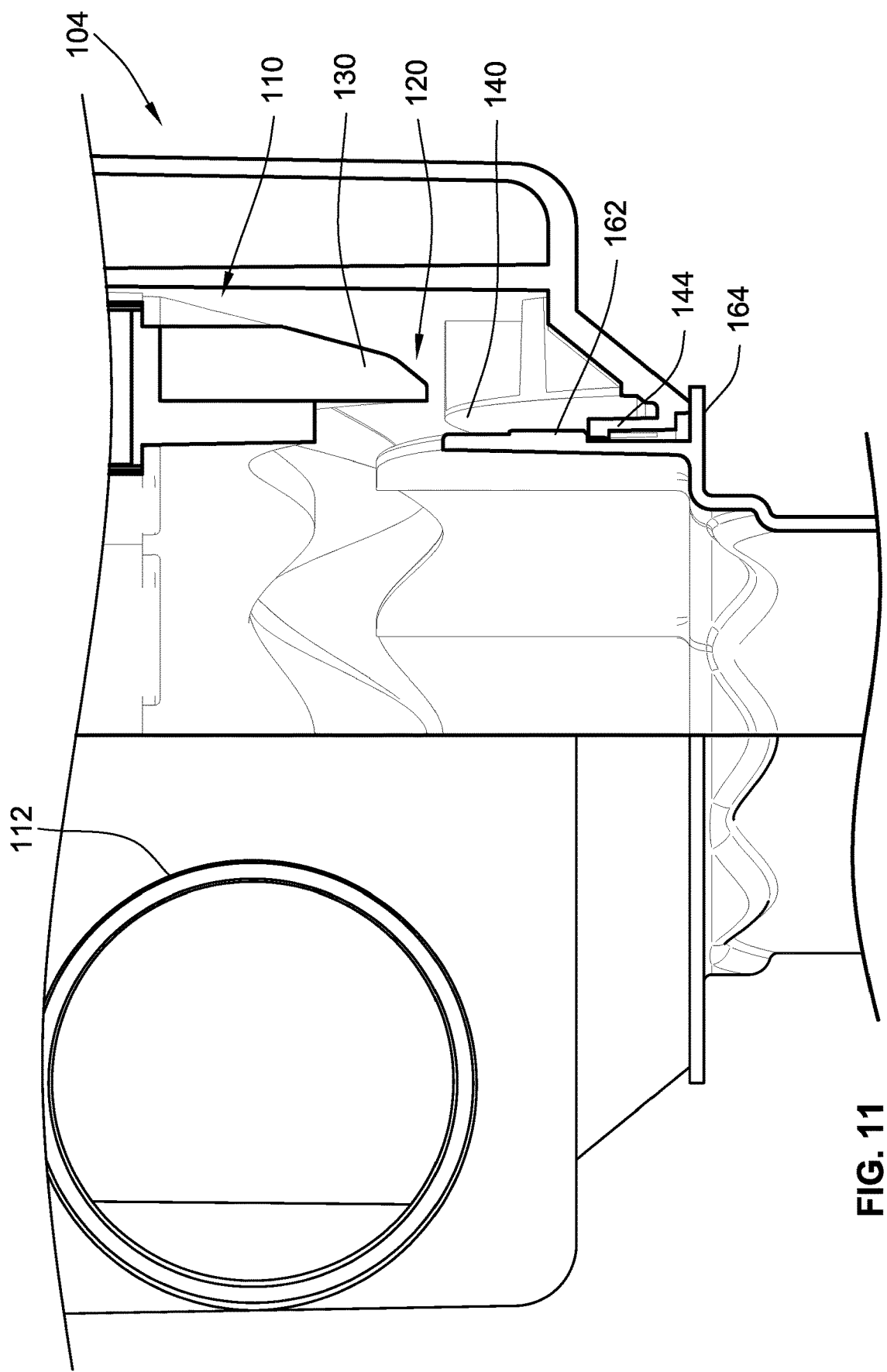

FIGS. 5, 6 and 11 illustrate the first housing component 104 with the snap-in outlet component 146 mounted therein. It can be seen that the shorter axially extending flexible fingers 144 engage and hold the snap-in outlet component 146 in the first housing component 104 by being positioned axially between two radially outward extending flanges 162, 164 formed by the snap-in outlet component 146.

Figure 9:
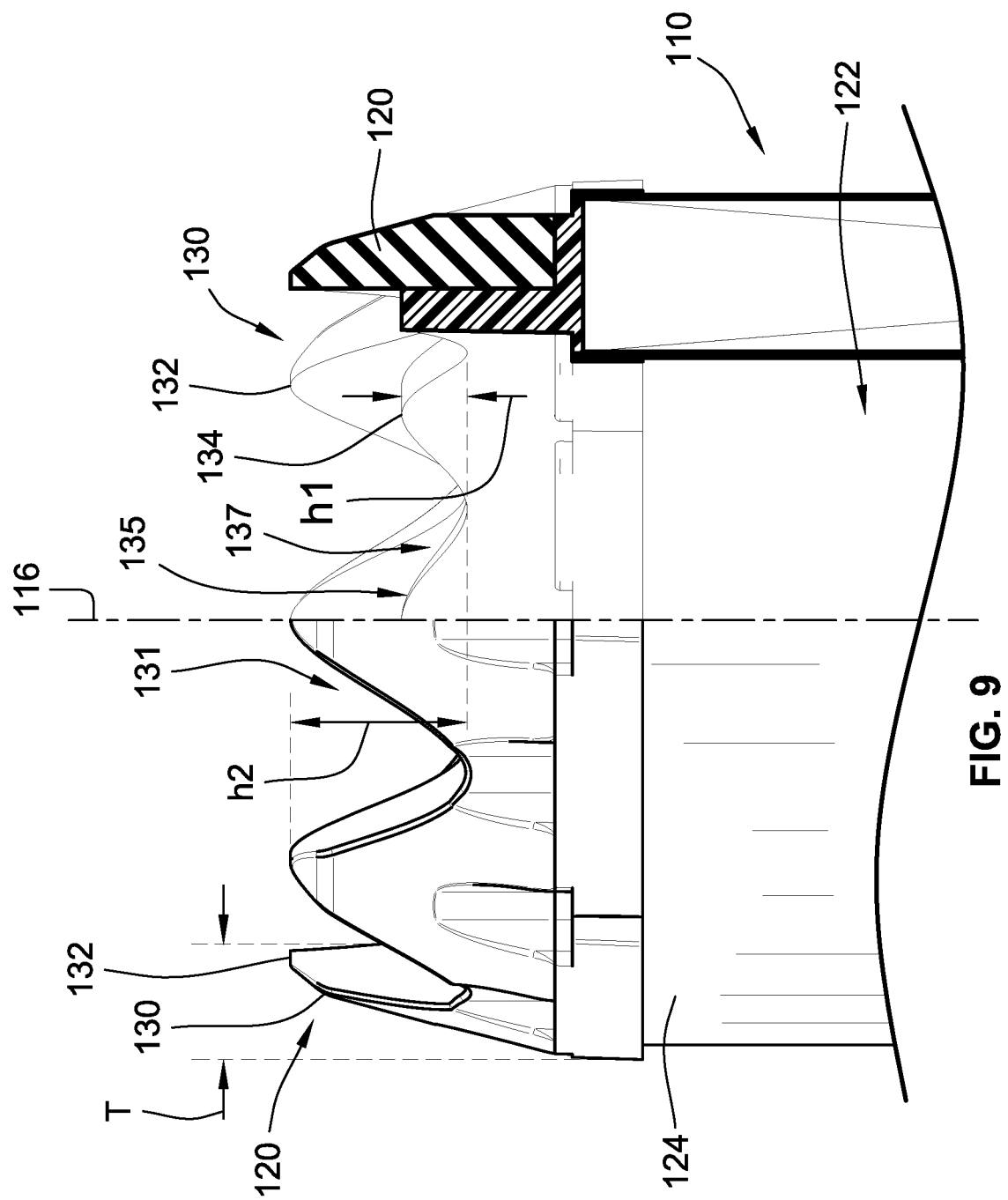

Ideally, the housing projections 140 forming the axially undulating wave profile are at least twice as high (in an axial direction) as the projections 147 on the snap-in outlet component 146 defining the axially undulating wave profile 148 for the snap-in outlet component 146. Similarly, as illustrated in FIG. 9, the axially extending projections 130 defining the outer wave profile defined by the first pour, in some embodiments, are preferably at least two times as high (in an axial direction, e.g. parallel to axis 116) as the inner projections 134 defining the inner wave profile 135. This allows the wave profiles of the primary filter 110 to mate with the wave profiles of the housing components (e.g. the first housing component 104 and the snap-in outlet component 146) prior to engagement of the wave profiles that ultimately provide the seal between the filter element 110 and snap-in outlet component 146.

Figure 10:
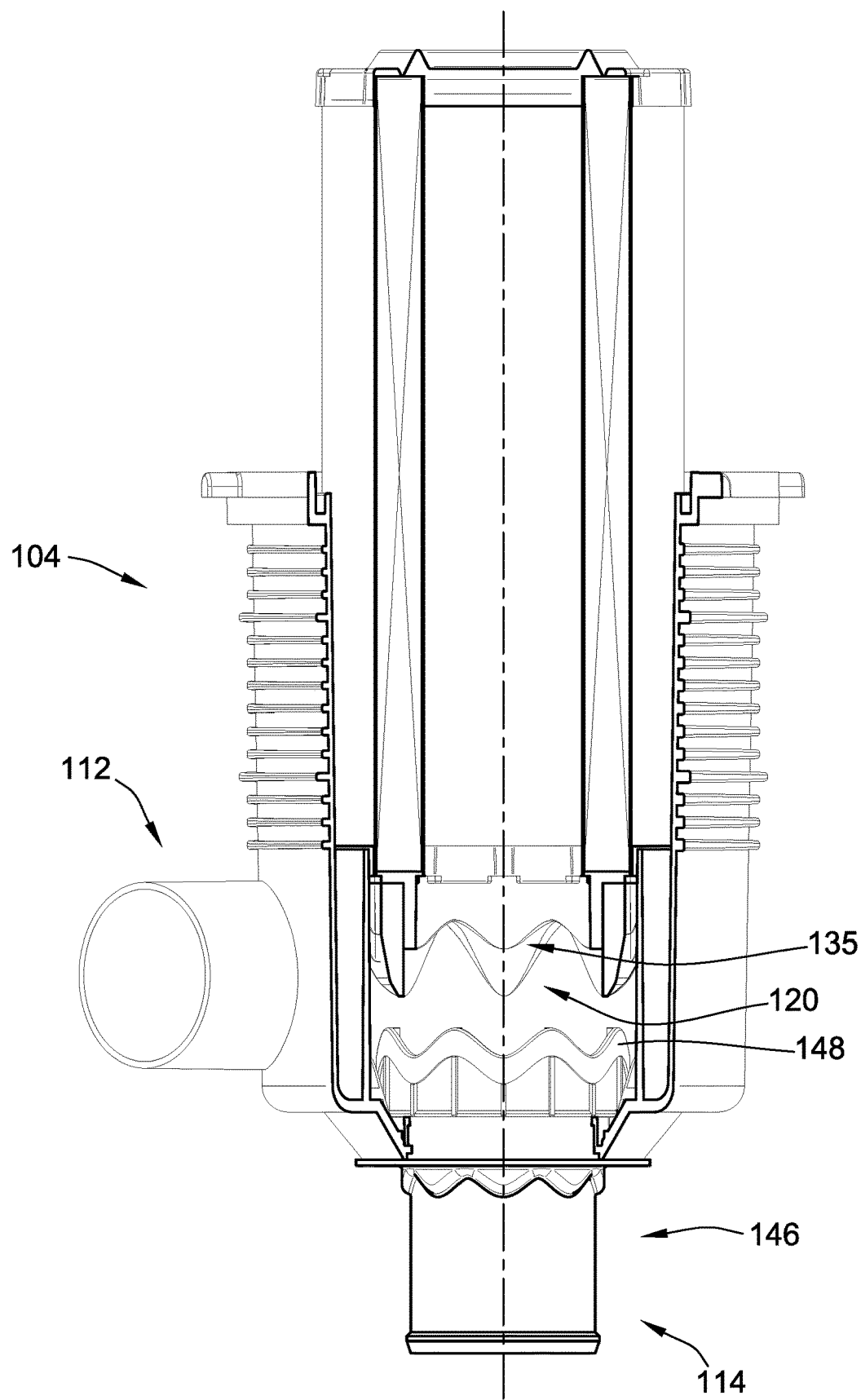
FIGS. 10-12 illustrate the filter element of FIGS. 7-9 installed in the filter assembly of FIG. 1.

The outer mating wave profiles defined by projections 130 and 140 are higher and formed, preferably, of a rigid material (relative to the inner material) to prevent any seal engagement prior to proper alignment as well as to aid in guiding the user to the proper angular alignment (see e.g. FIG. 10). If the filter element 110 is not properly angularly aligned in the first housing component 104, the axial projections 130 formed from the rigid urethane material will bottom out on (e.g. axially engage) projections 140 defining the outer wave feature at the bottom of the first housing component 104 before allowing the inner wave profiles defined by projections 134, 147 to engage to form a seal, e.g. to radially overlap and form a radial seal therebetween in the illustrated embodiment.

Figure 12:
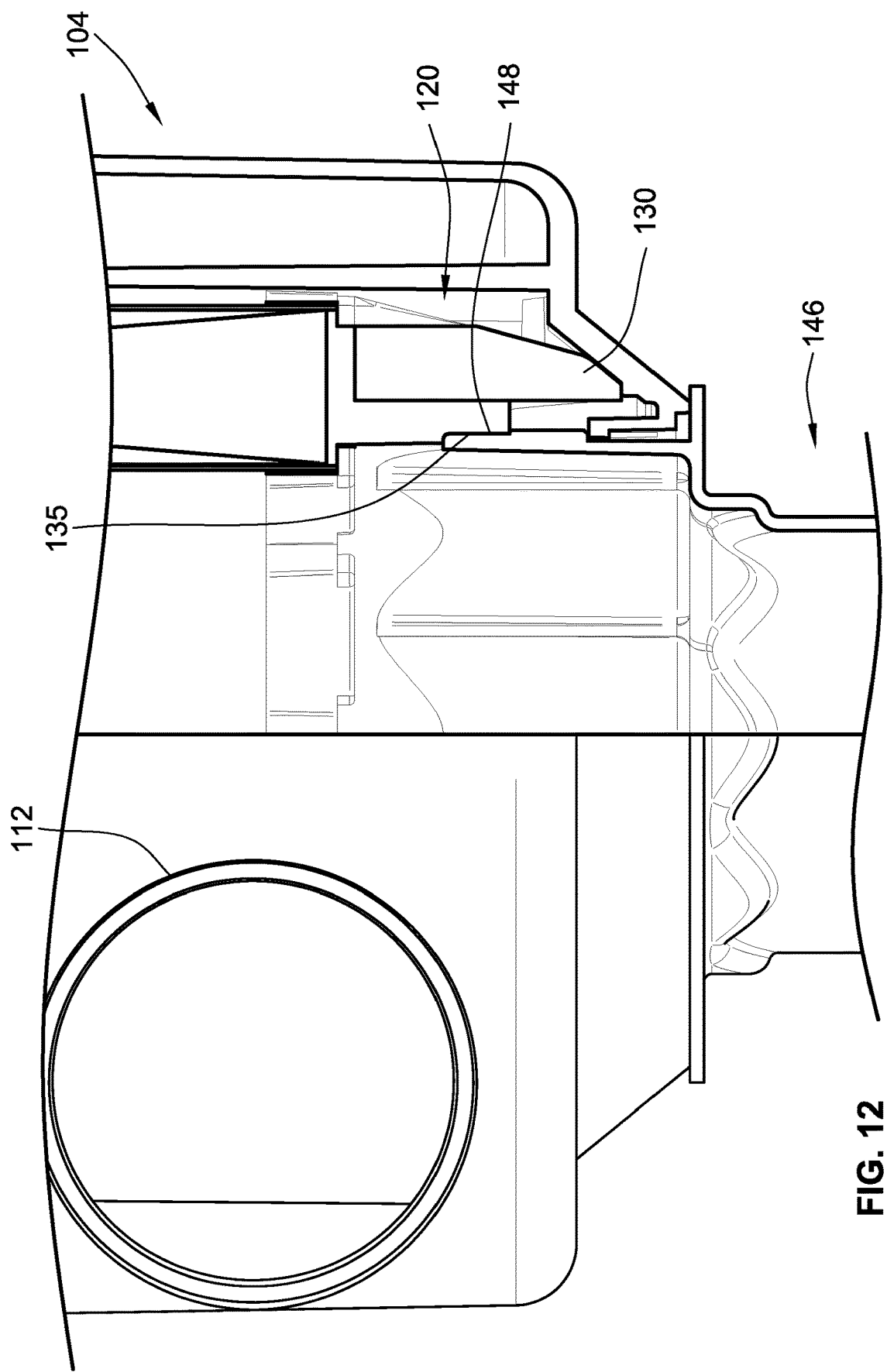

FIGS. 12 and 13 illustrates the filter cartridge 110 in correct axial and angular alignment and properly seated. For simplicity, FIG. 13 only illustrates the sealing component of the filter element 110 and the snap-in outlet component 146. The proper alignment between undulating wave profile 135 and undulating wave profile 148 allows for full seal engagement between the contoured end member 120 and the snap-in outlet component 146. In this embodiment, a radial seal is provided between the inner surface 136 of the filter element 110 of the contoured end member 120 and radially outer surface 160 of the snap-in outlet component 146. The outer surface disruption in the form of ribbing 154, 156 of the snap-in outlet component 146 corresponds to the wave profile of the filter cartridge 110 to further ensure seal integrity and positive axial location. Notably, when properly installed, the peaks or tips of one set of projections will align with the valleys between adjacent projections of the cooperating wave profile. For example, the tips 132 of the outer wave profile provided by projections 130 of the contoured end member 120 of filter element 110 will angularly align with the valleys formed between adjacent projections 140 of the first housing component 104.

Figure 14:
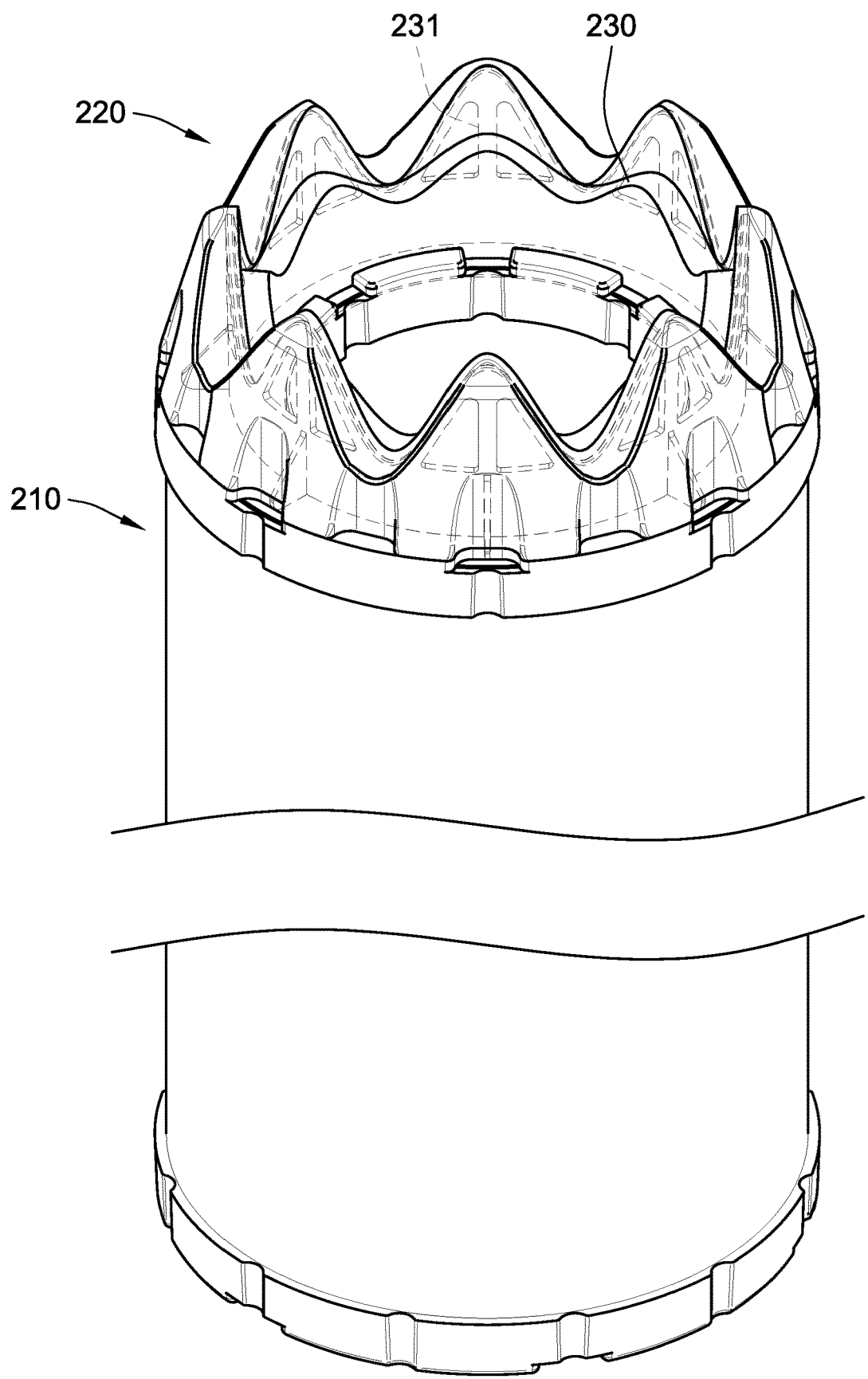
FIGS. 14 and 15 illustrate an alternative embodiment of a filter element useable in the filter assembly of FIG. 1, similar to the filter element of FIGS. 7-9.
Figure 15:
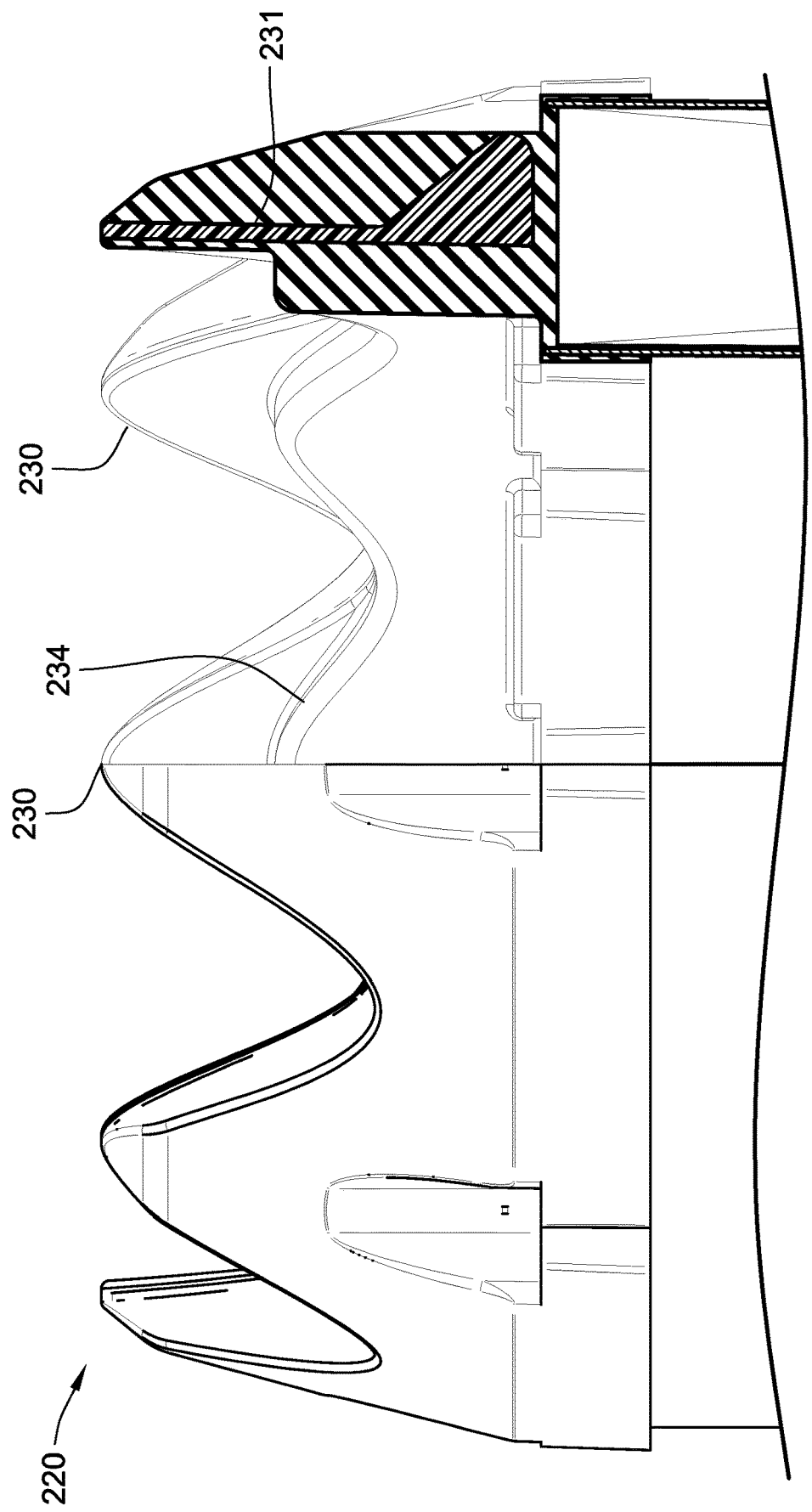
Figure 16:
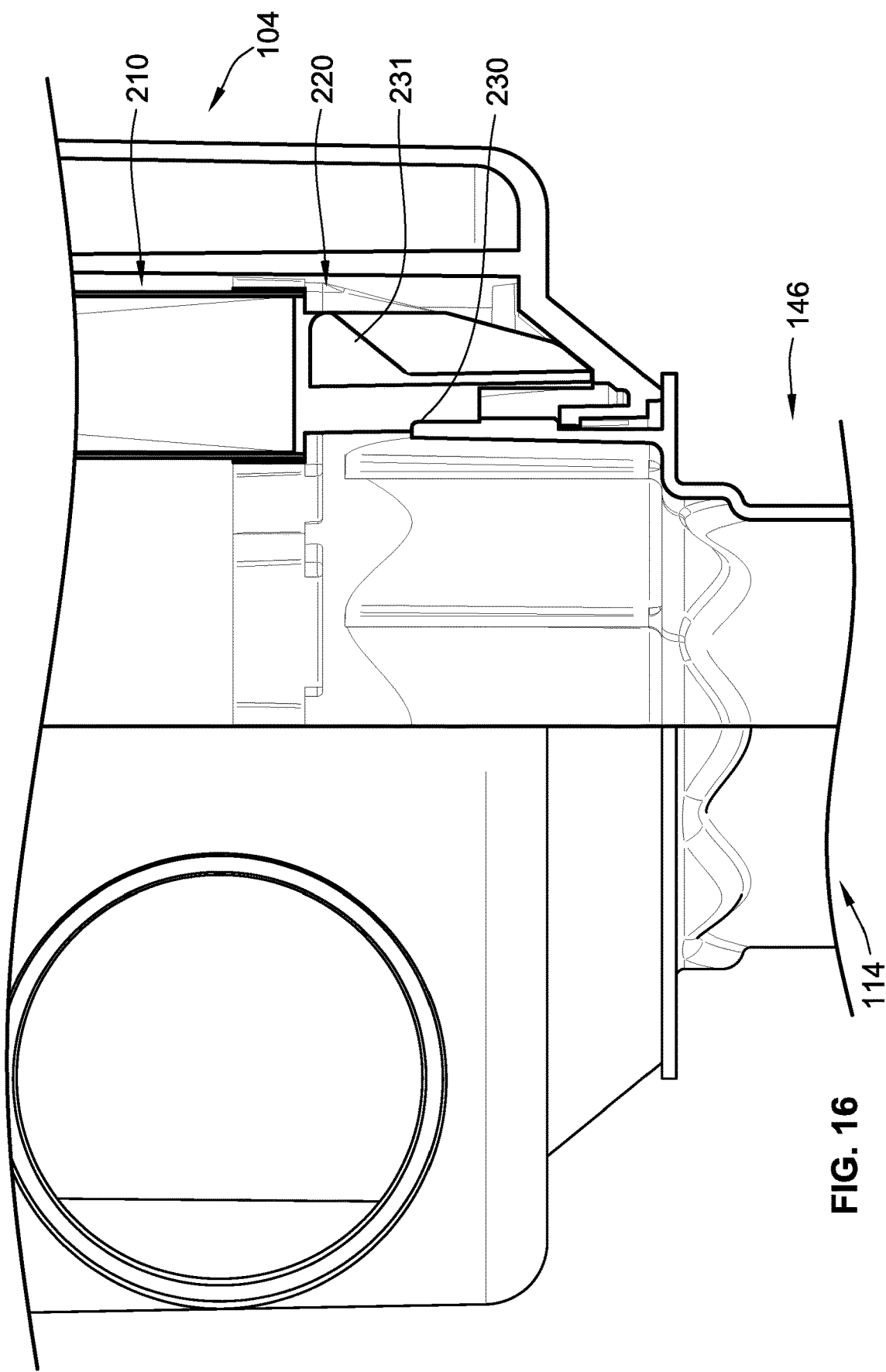
FIG. 16 illustrates the filter element of FIGS. 14 and 15 installed.

FIGS. 14-16 illustrate an alternative embodiment of a filter element 210 with a contoured end member 220 where the rigid seal support that provides rigidity to the outer wave profile of the filter cartridge is provided by a preformed plastic insert 231. A foam urethane or other soft urethane encapsulates the rigid preformed plastic insert 231. In this embodiment, both the outer wave profile that provides for angular alignment and projections 230 and the inner wave profile that provides for sealing with the snap-in outlet component 146 and projections 234 are formed from a single continuous material, e.g. a foamed urethane that is molded around plastic insert 231. Not only can the plastic insert 231 provide rigidity to the projections 230, the insert 231 can provide radial rigidity to the inner wave profile to promote radial sealing with undulating sealing surface provided by the snap-in outlet component 146.

Figure 17:
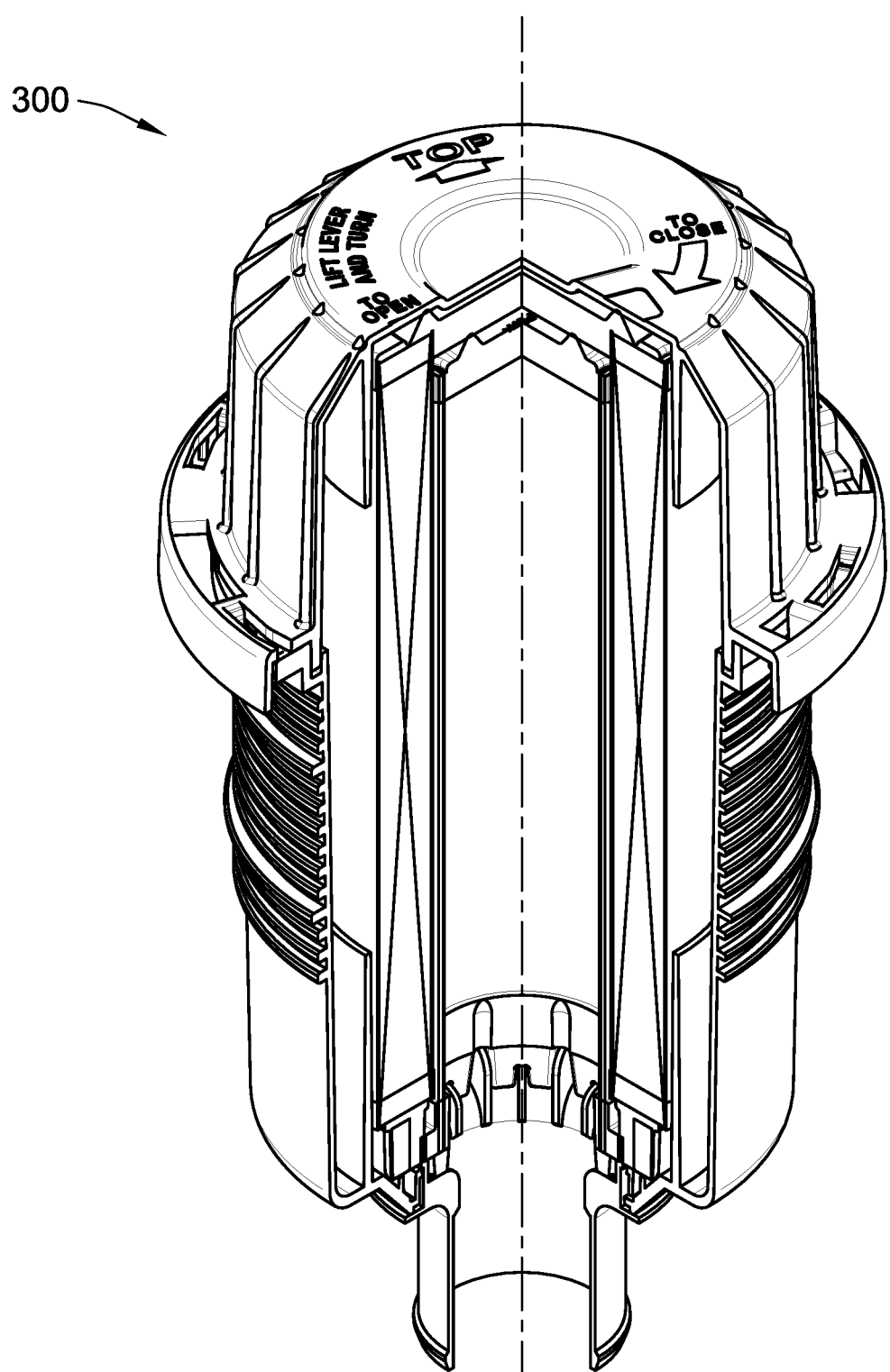
FIG. 17 illustrates a further embodiment of filter assembly.
Figure 18:
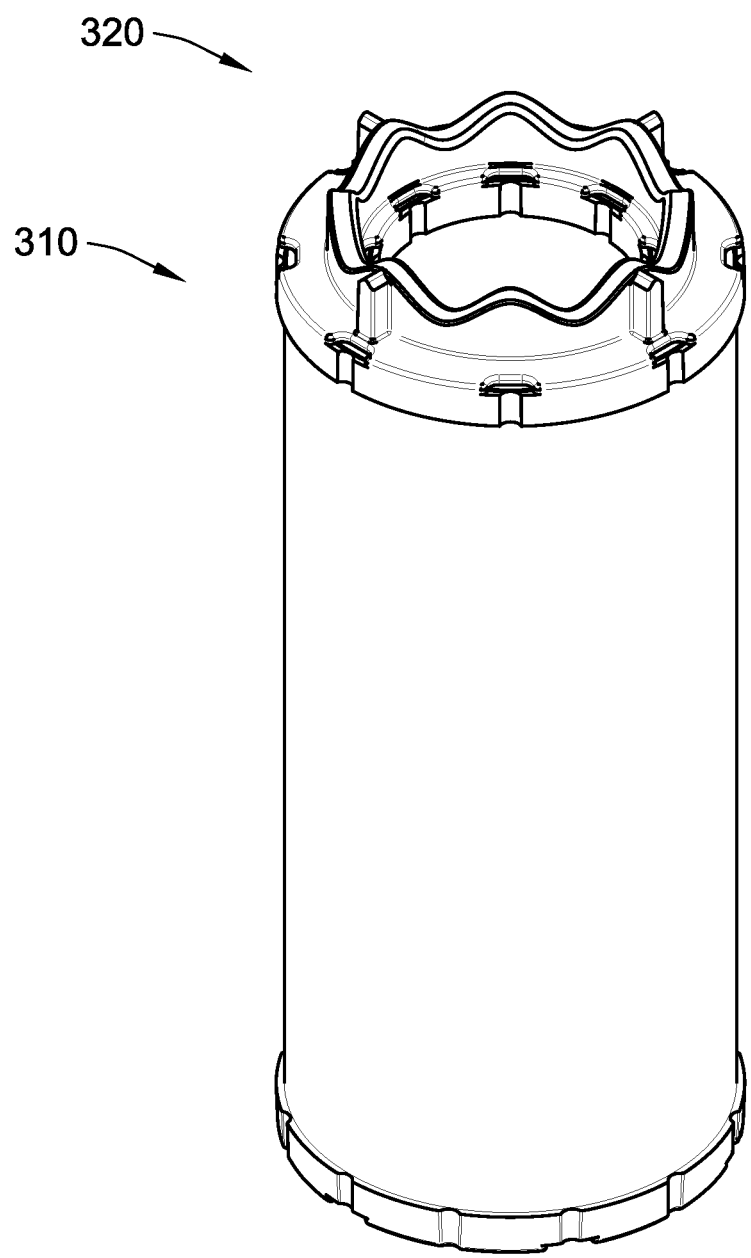
FIG. 18 illustrates a filter element useable in the filter assemble of FIG. 17.
Figure 19:
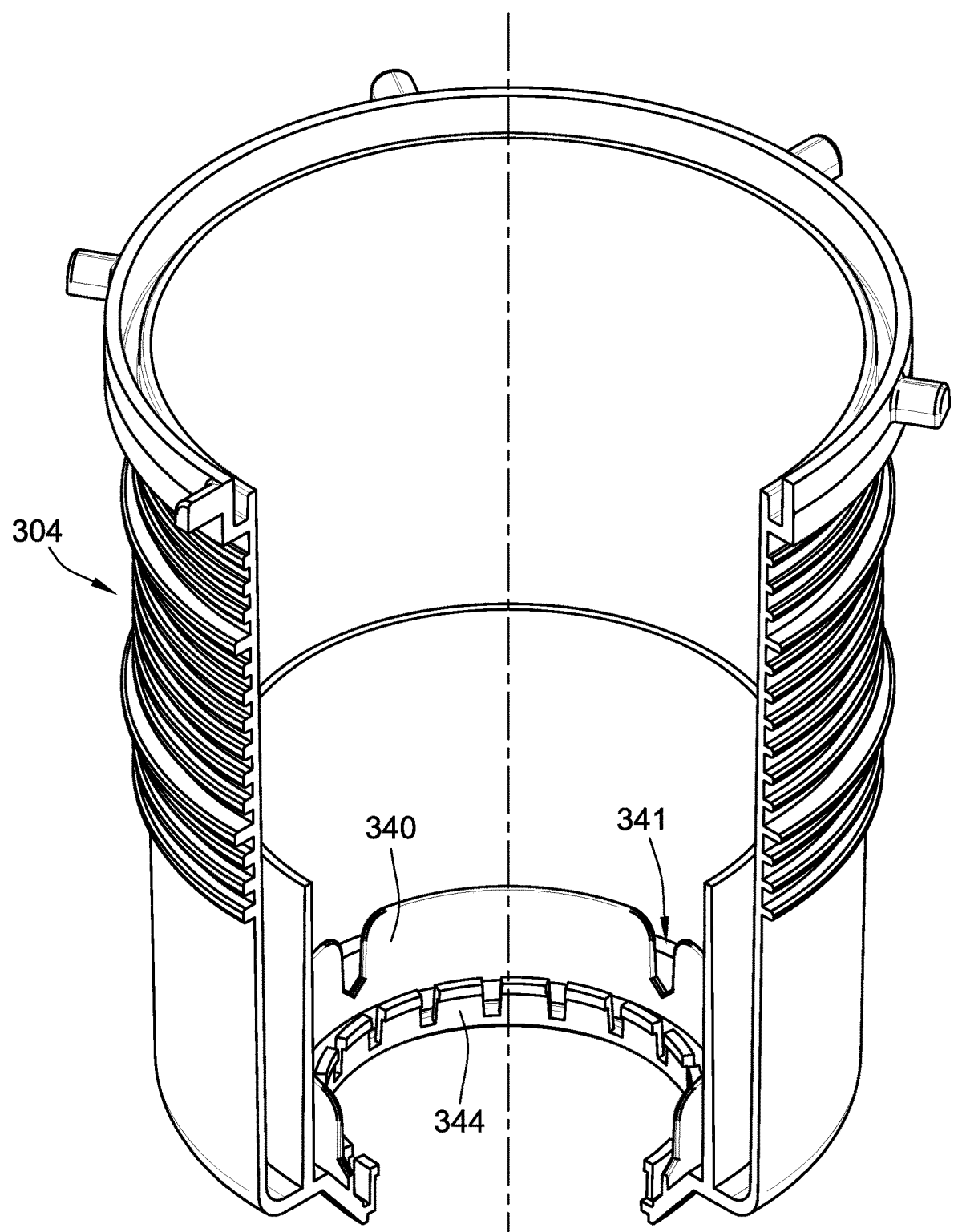
FIG. 19 illustrates a filter housing component of the filter assembly of FIG. 17.
Figure 20:
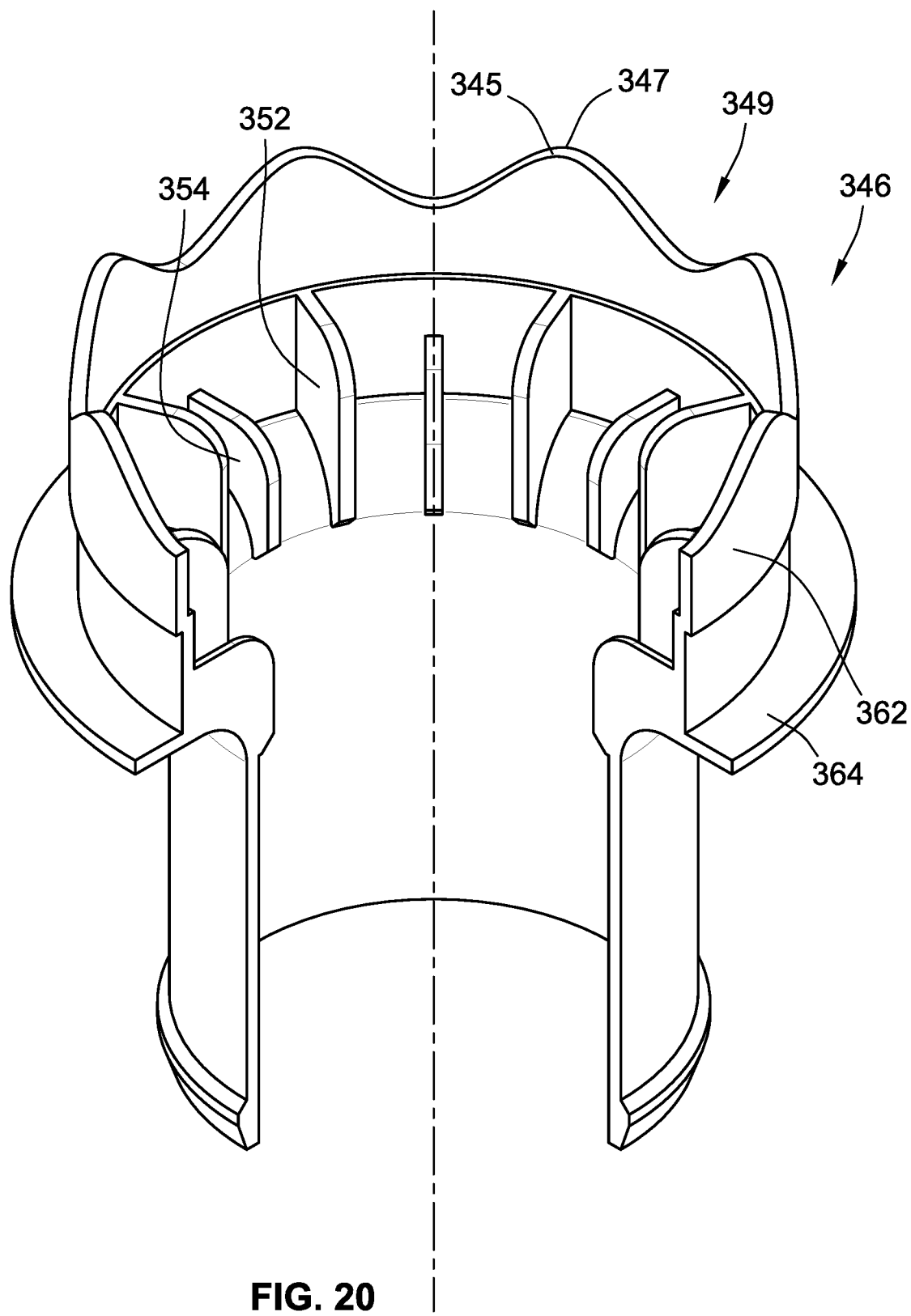
FIG. 20 illustrates a fluid port component attachable to the filter housing component of FIG. 19.
Figure 21:
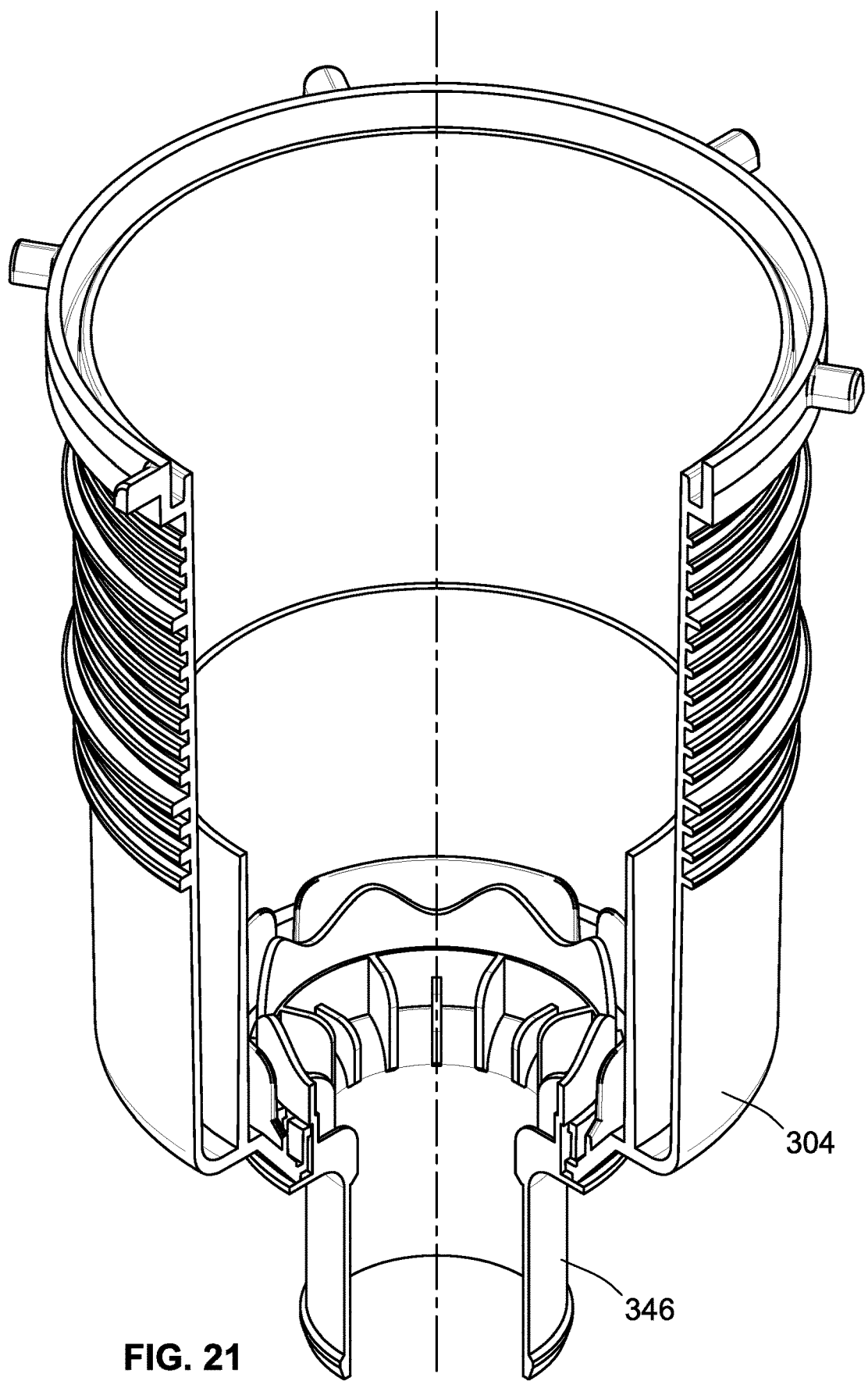
FIGS. 21 and 22 illustrate the filter housing component of FIG. 19 and the fluid port component of FIG. 20 in an assembled state.
Figure 22:
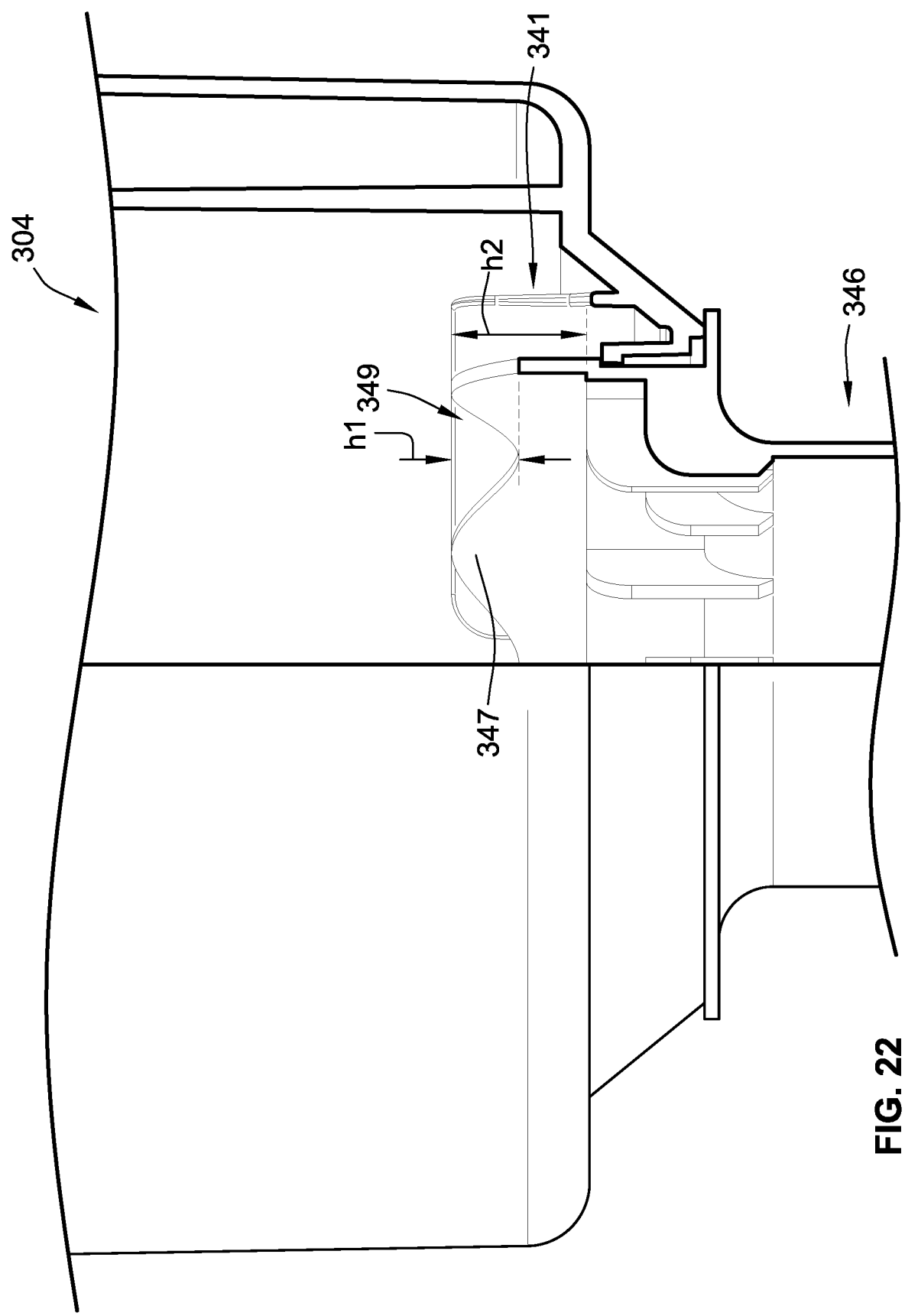
Figure 22A:
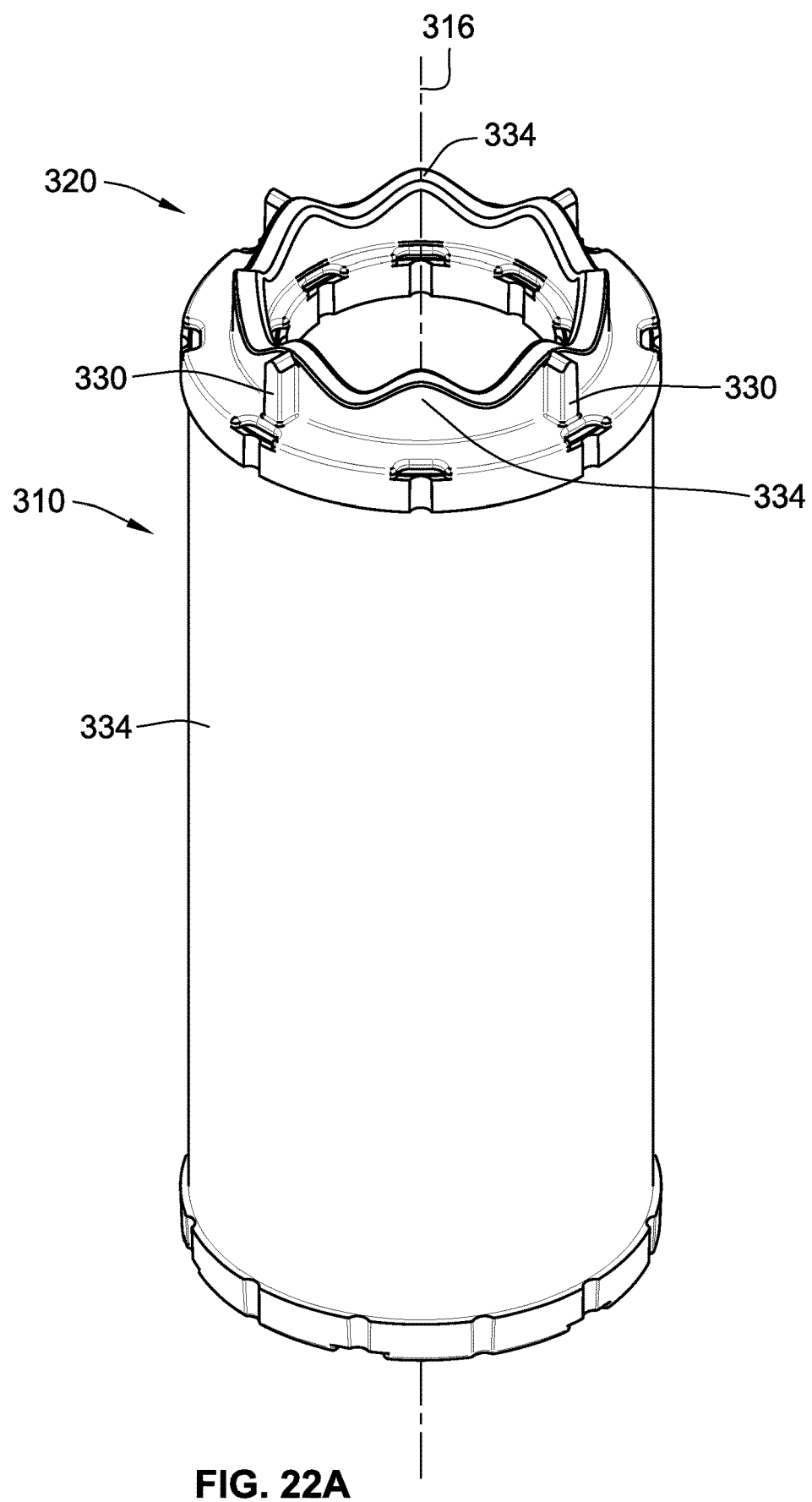
FIGS. 22A and 23 are further illustrations of the filter element of FIG. 18.
Figure 23:
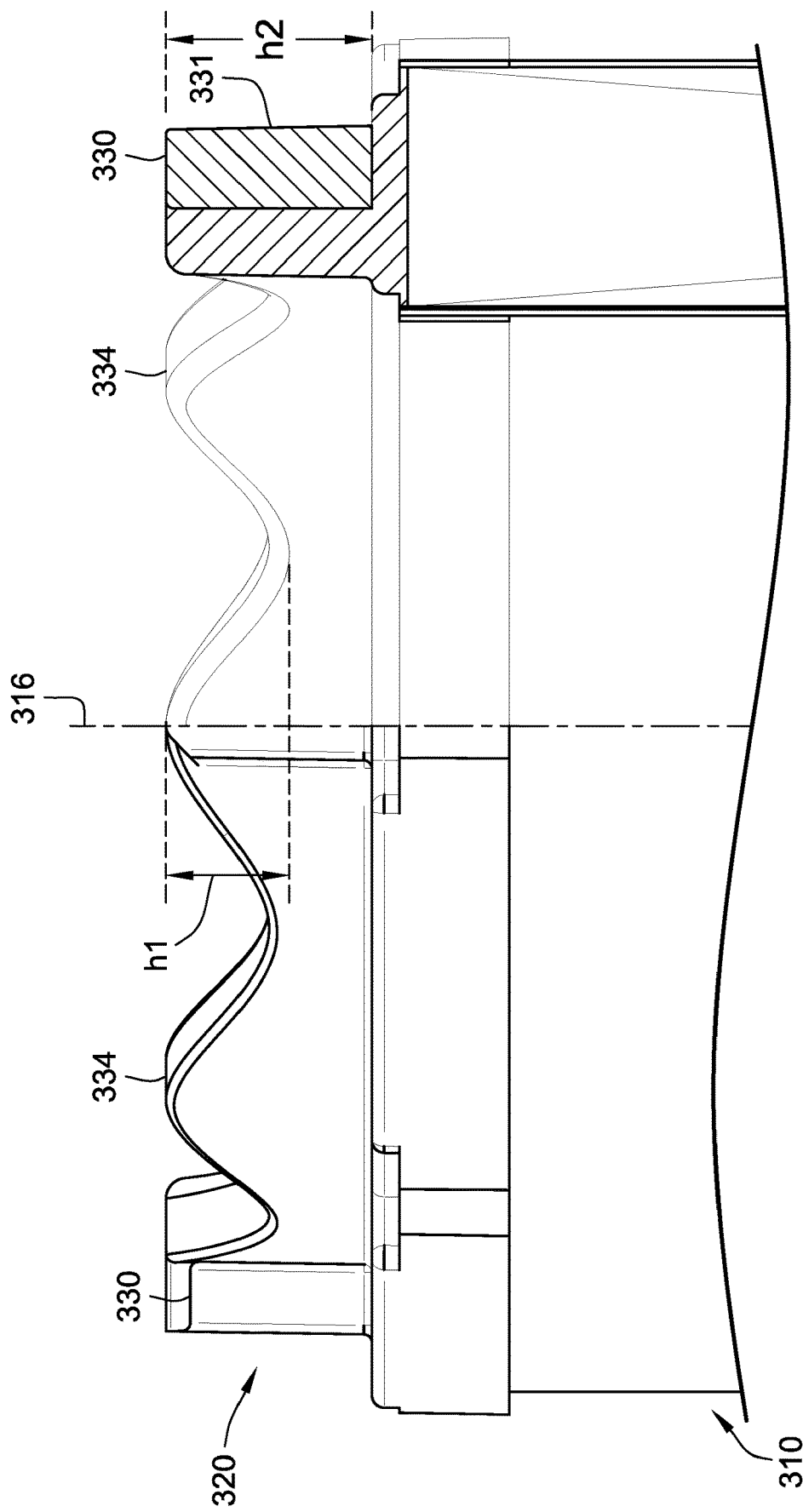

FIG. 17 illustrates a further filter assembly 300 in partial cross-section. This filter assembly 300 is similar to the filter assembly 100 of FIG. 1. However, a different engagement with the primary filter 310 is provided.

With additional reference to FIGS. 19-22, the first housing component 304 again has the radially inner flexible fingers 344 for attaching the snap-in outlet component 346. The first housing component 304 does not have the same axially extending projections that form the axially undulating curved wave profile. Instead, the first housing component 304 includes a plurality of axially extending projections 340 that define slots 341 angularly therebetween that are used for proper angular filter alignment. The axially extending projections 340 again circumscribe a central axis.

The snap-in outlet component 346 includes an axially undulating wave profile defined by projections 347 and a plurality of ribs 352, 354 radially inward of the undulating wave profile. The ribs 352, 354 have varying axial heights. The heights correspond to the axial projections 347 and valleys 349 of the axially undulating wave profile. Radially extending annular flanges 362, 364 again cooperate with the radially inner flexible fingers 344 of the first housing component 304 for mounting purposes.

The height (h2) of the slots 341 between the axially extending projections 340 of the housing component 304 is at least two times greater than the height (h1) of the projections 347 of the axially undulating wave profile of the snap-in outlet component 346.

FIGS. 18 and 22A-23 illustrate the primary filter 310. In this embodiment, the contoured end member 320 includes an axially undulating wave profile defined by a plurality of projections 334 that extend angularly about a central axis 316. Further, at least one radially outward extending projection 330 is positioned/extends radially outward from the projections 334 that define the axially undulating wave profile. There are four projections 330 in this embodiment. These four projections 330 are formed from a rigid material. In this embodiment, a rigid seal support 331 is molded into an outer poured foam or soft urethane with the projections 330 extending radially outward from the poured urethane. The rigid projections 330 will align with the slots 341 in the first housing component 304 for proper angular alignment.

The rigid projections 330, in this embodiment, extend axially at least two times the axial extension of the projections 334 defining the undulating wave profile formed from the softer material. This allows the size of the wave profile and projections 334 of the filter cartridge 310 to mate with the corresponding axially undulating structure of the snap-in outlet component 346 and particularly the undulating sealing surface thereof and slots 341 of the first housing component 304. Further, projections 340 and slots 341 could be formed as part of the snap-in outlet component 346.

Figure 24:
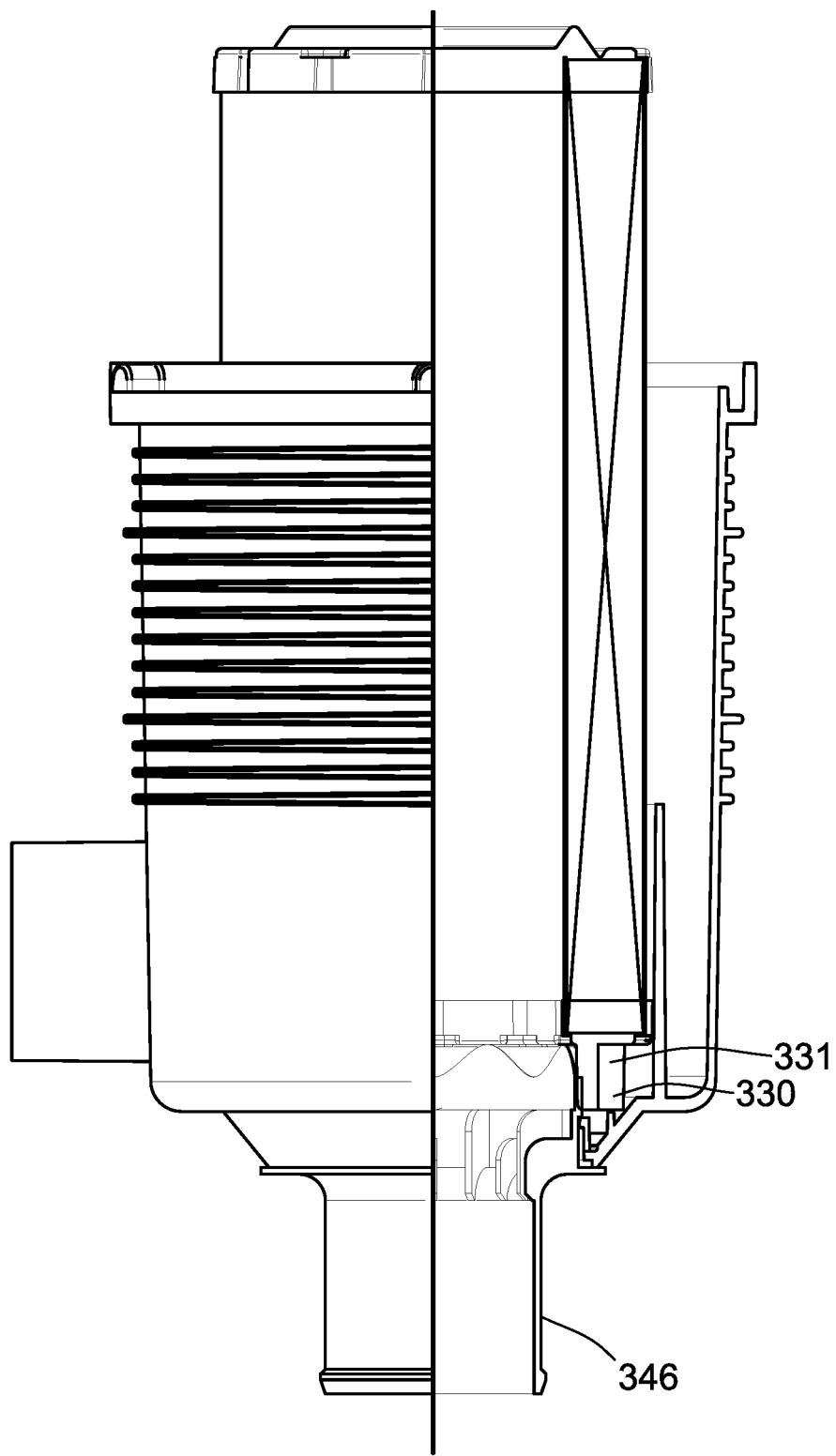
FIGS. 24-26 illustrate the filter element of FIG. 18 installed in the filter assembly of FIG. 17.
Figure 25:
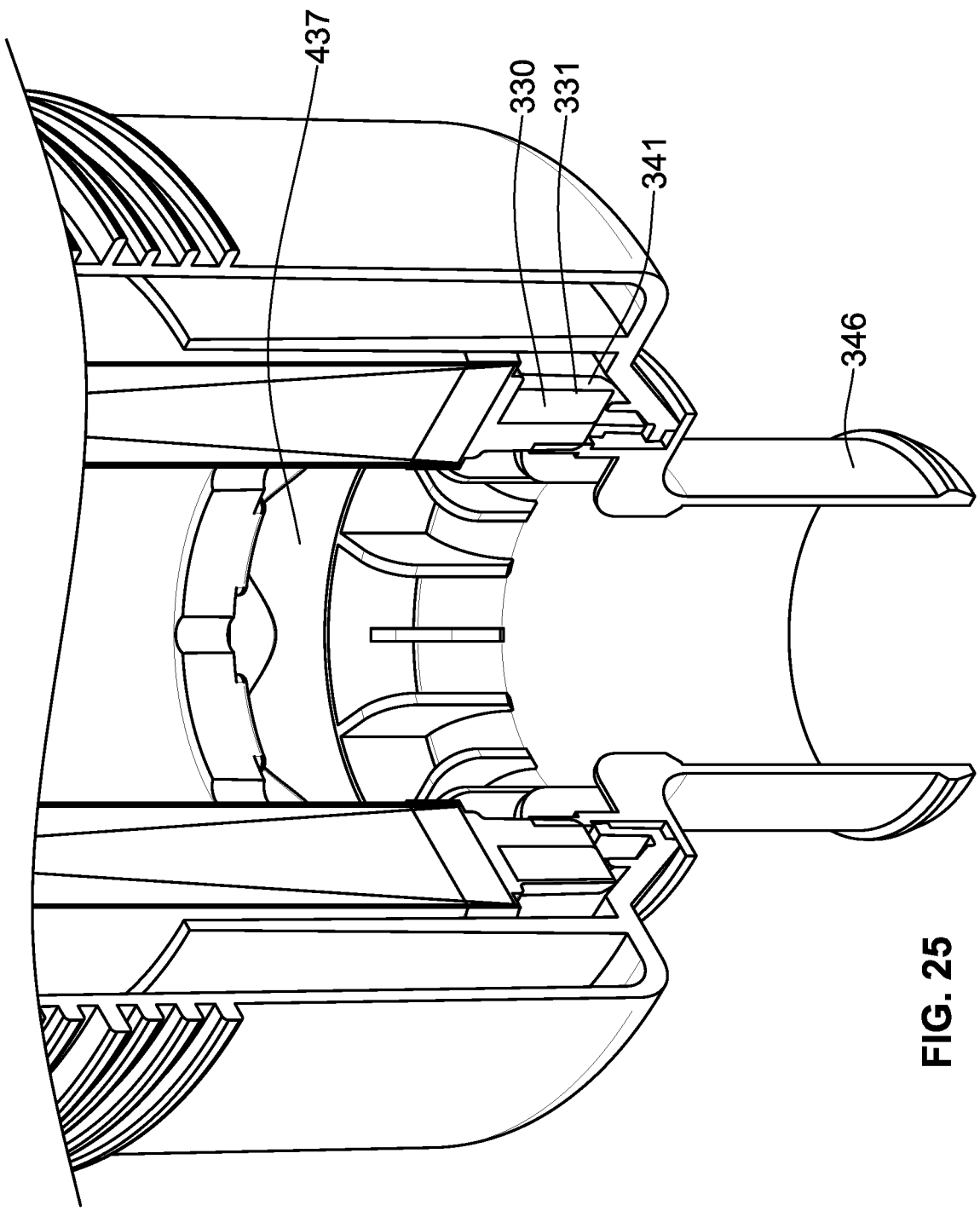
Figure 26:
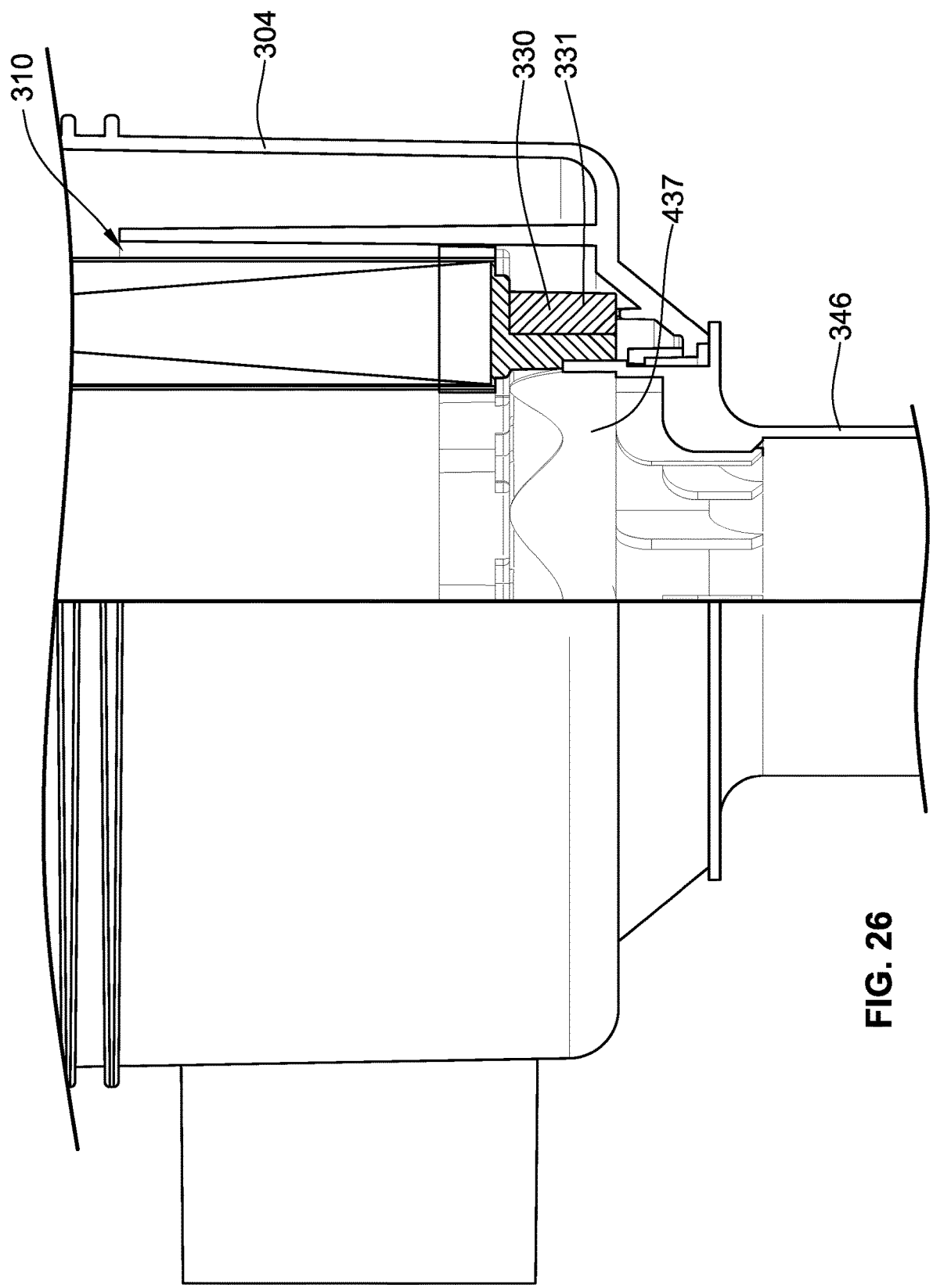
Figure 27:
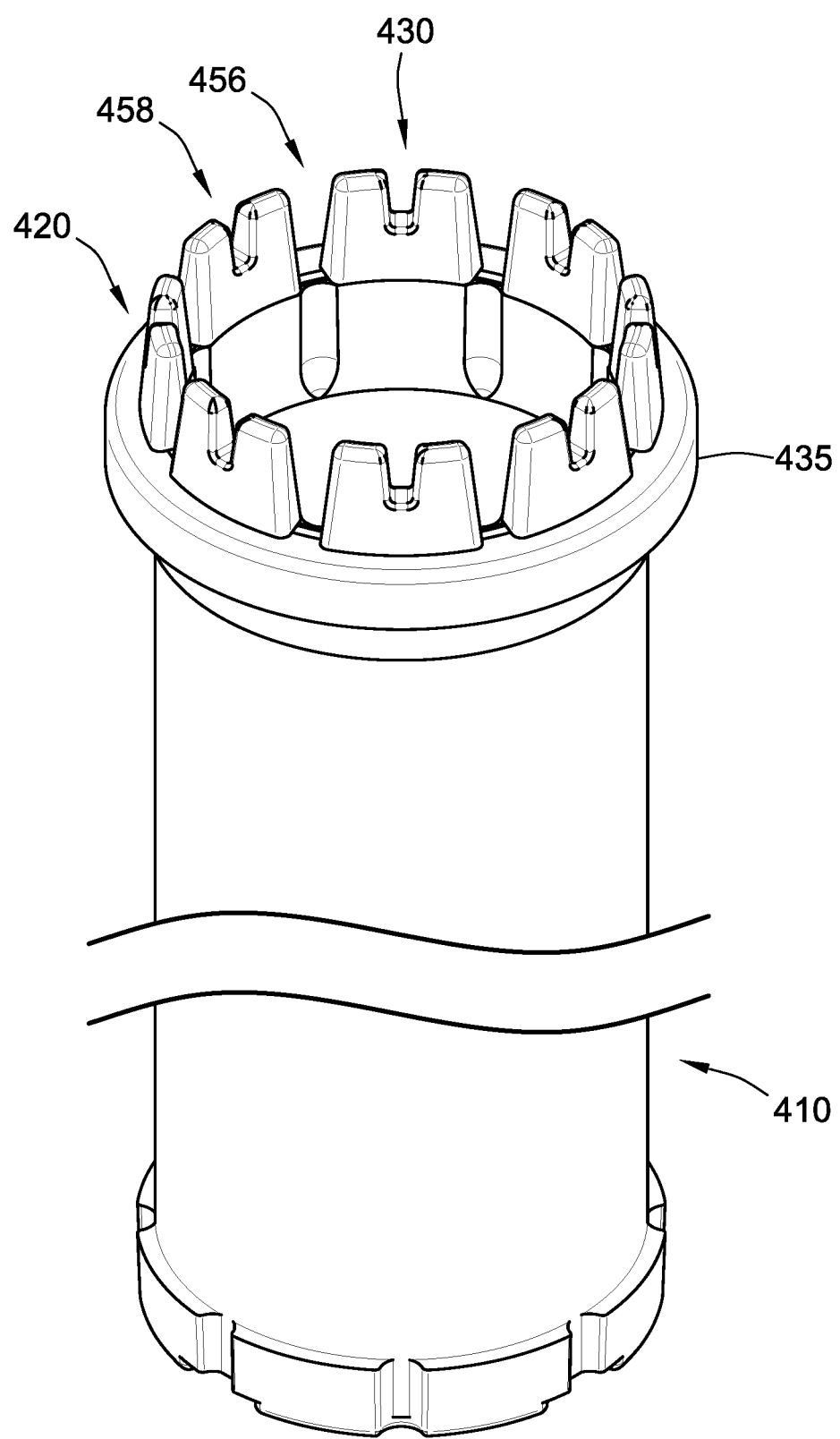
FIGS. 27 an 29 illustrate a further filter element that may be used as a secondary filter element.
Figure 28:
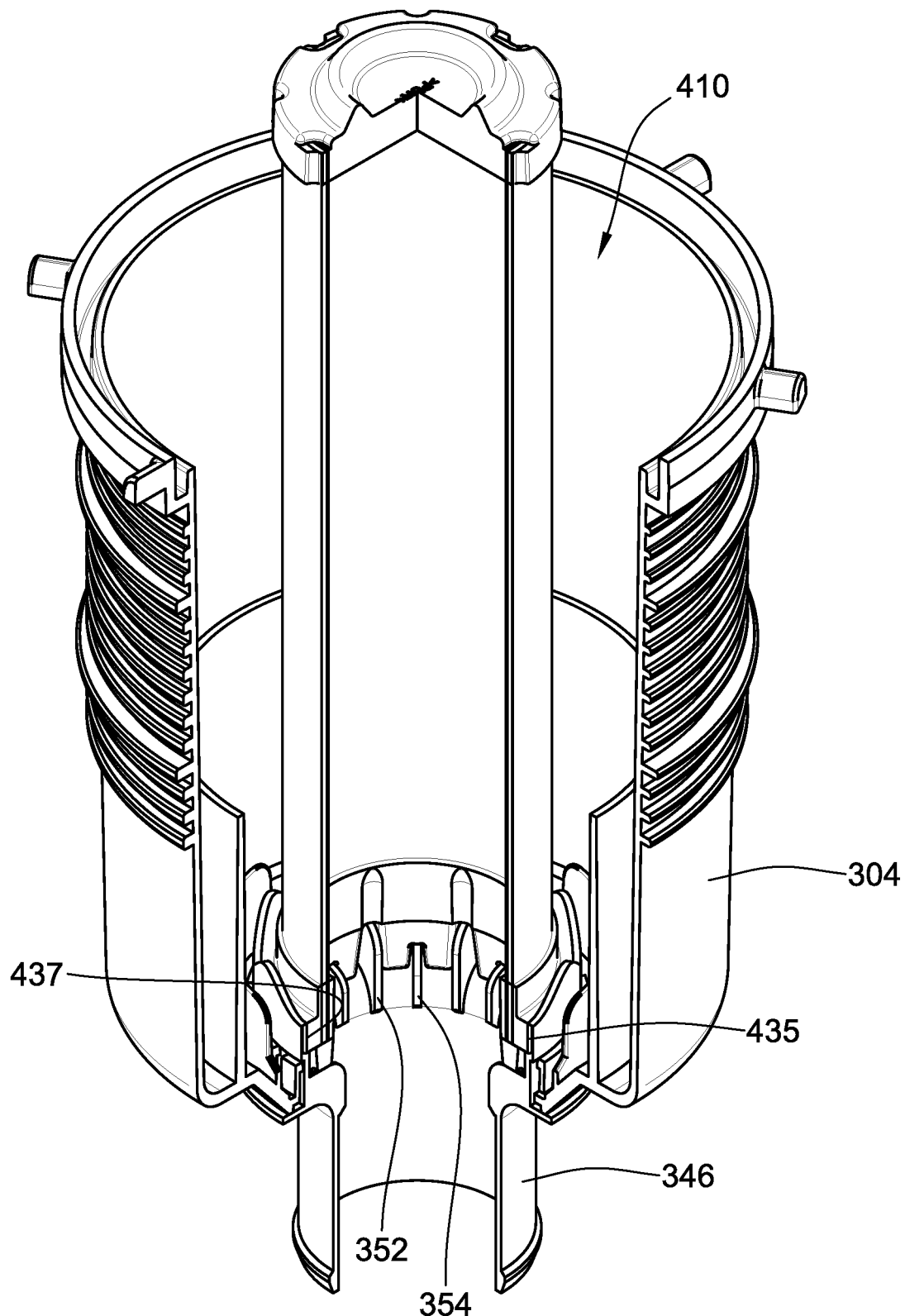
FIGS. 28 and 31-32 illustrate the filter element of FIG. 27 installed in the filter assembly of FIG. 17.
Figure 29:
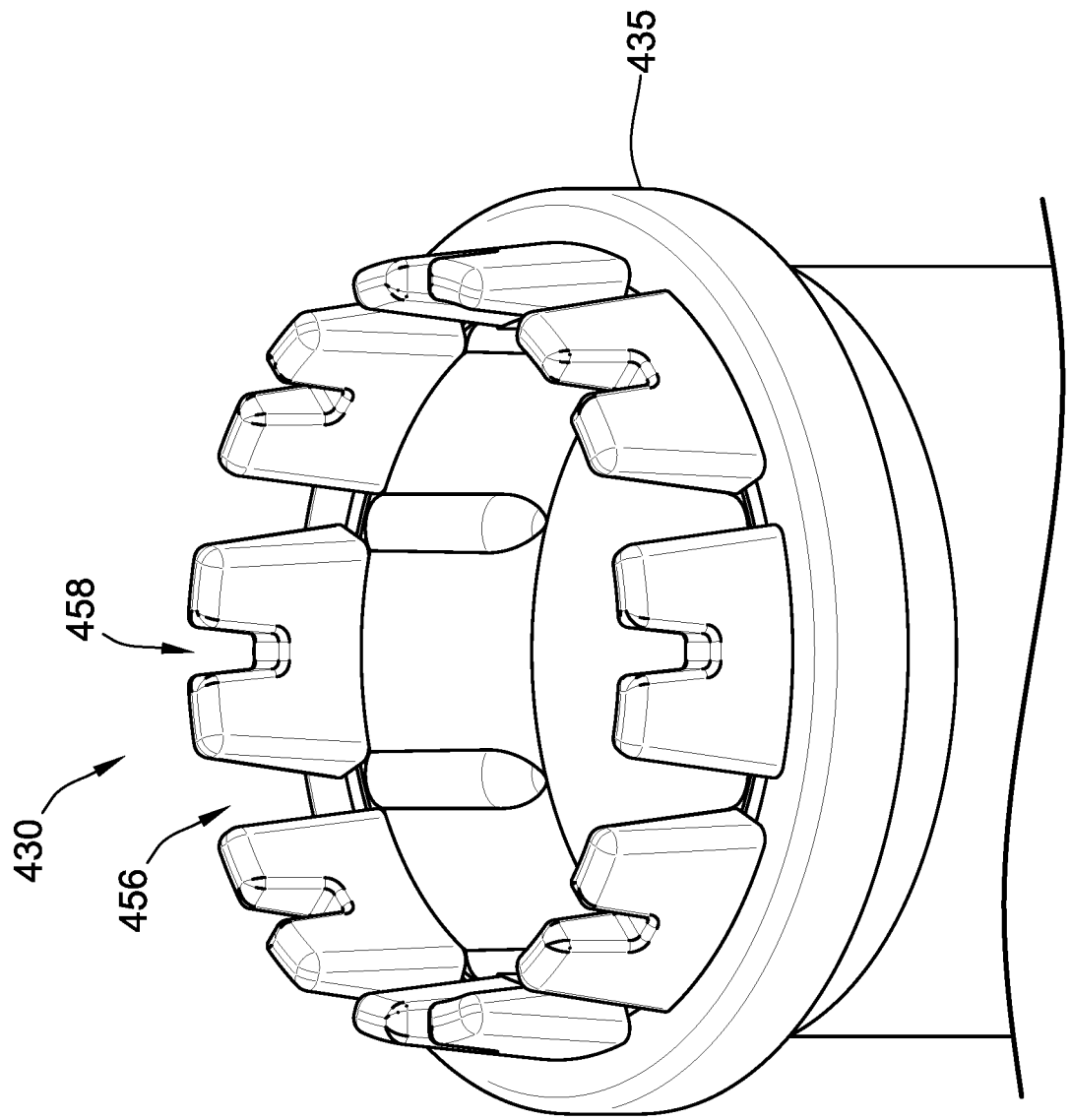
Figure 30:
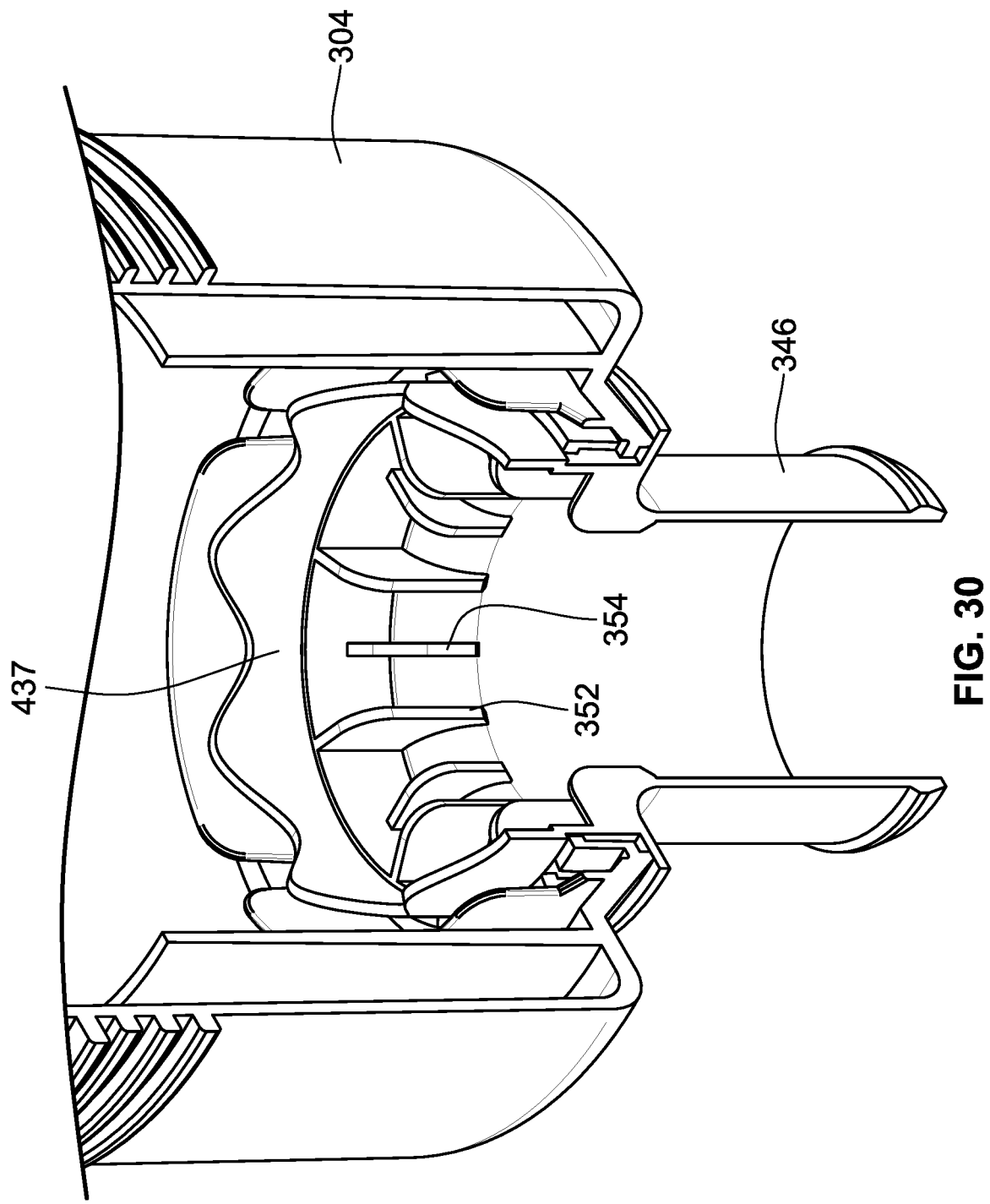
FIG. 30 is an enlarged illustration of the fluid port component installed in a filter housing component.

With reference to FIGS. 24-26, the slots 341 (housing component 304) and radially outward extending rigid projections 330 (cartridge 310) ensure that the seal (e.g. soft urethane) does not engage the sealing surface of the snap-in component 346 prior to proper angular alignment. When properly aligned, the rigid radial projections 330 can fall into the receiving slots 341 and allow the radially directed seal to engage the radially outer surface of the wave profile of the snap-in outlet component 346. The rigid projections provide an axially undulating profile that allows for proper angular orientation.

FIGS. 27-32 illustrate the inclusion of a secondary filter 410. While not illustrated, the secondary filter 410 fits inside the primary filter 310 in the filter assembly 300 of FIG. 17. The secondary filter 410 includes a radially outward directed sealing surface 435 that is illustrated as being straight, .e.g. it does not axially undulate, but could have an axially undulating wave profile. This sealing surface 435 seals with an inner surface 437, see FIGS. 25 and 26, of the snap-in outlet component 346.

The secondary filter 410 includes a contoured end member 420 that includes a plurality of axially castellated projections 430 that mate with the axially extending ribs 352, 354 that are radially inward of the wave profile of the snap-in outlet component 346. As such, the castellated projections 430 define alternating axially extending slots 456, 458 that have differing heights. Slots 456 receive ribs 352 while slots 458 receive ribs 354. The ends of the ribs 352, 354 are axially offset from one another while the valleys of slots 456, 458 are similarly axially offset to mate with the corresponding ribs 352, 354.

The castellated projections 430 could be two pours of a first rigid material and then a second soft material over the top of the rigid material. Further, the rigid material could be provided by a preform over which the second soft material is poured to secure the preformed structure to the filter media and provide sealing surface 435.

Figure 31:
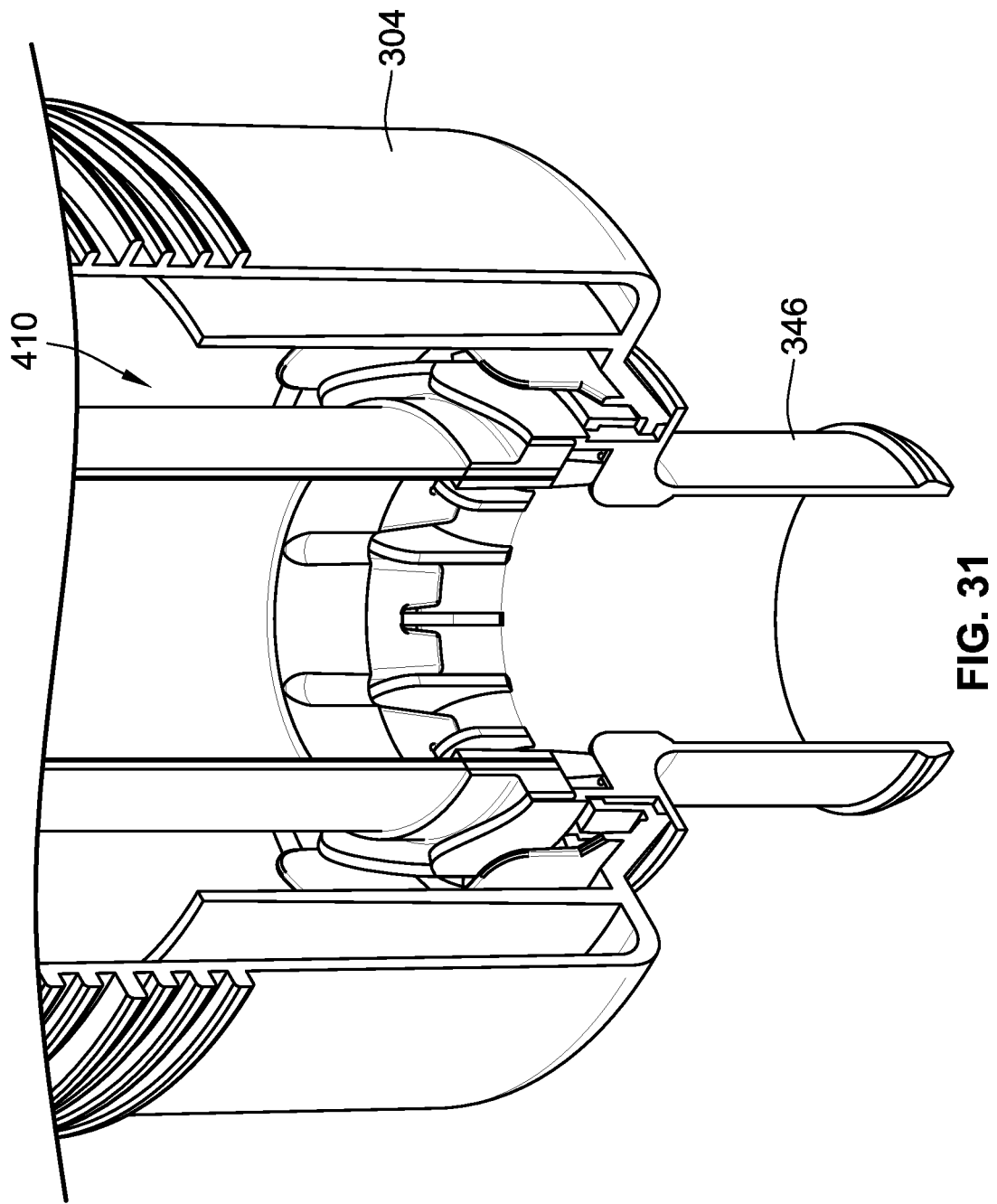
Figure 32:
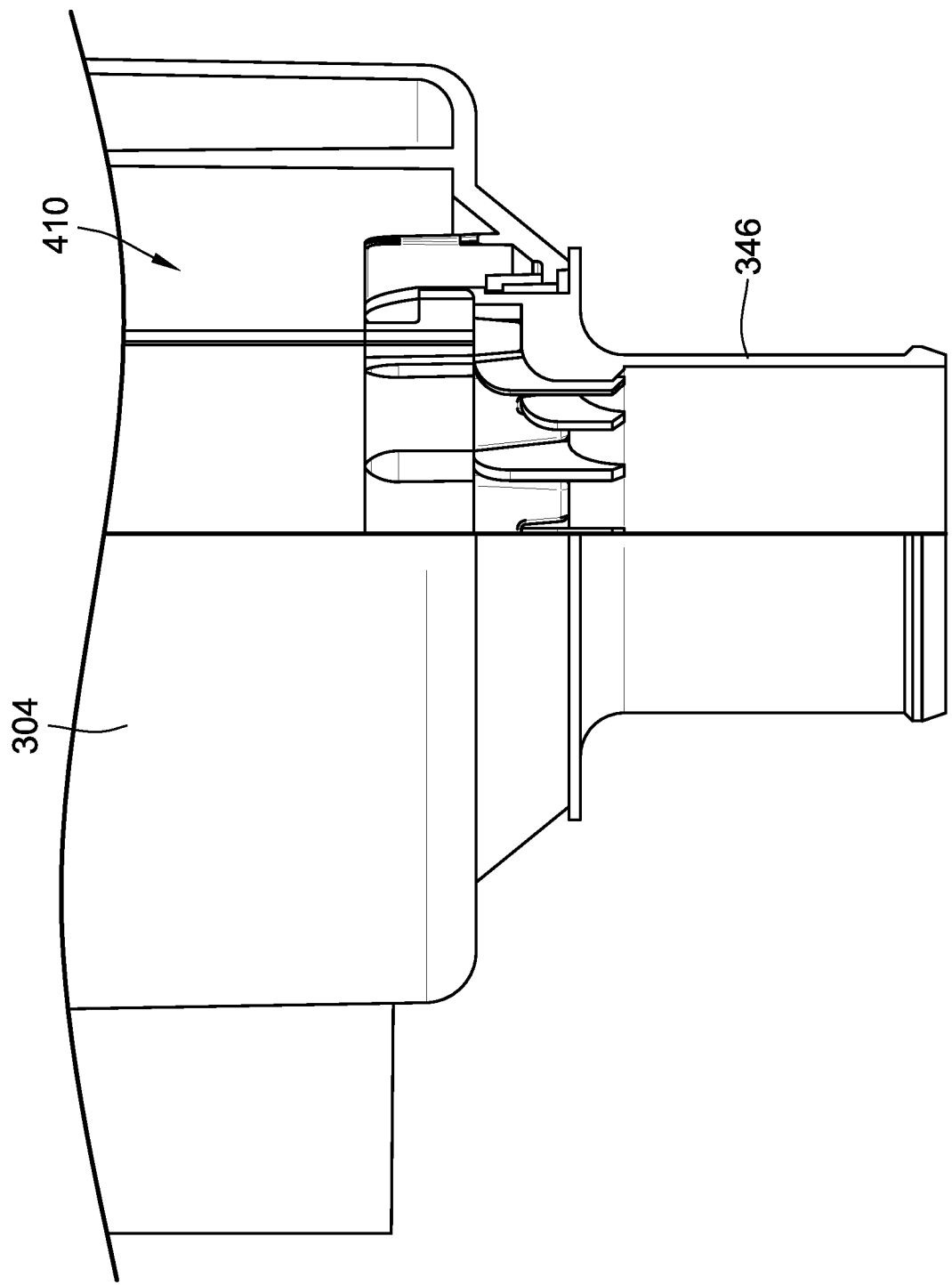

When the castellation projections 430 and corresponding slots 456, 458 properly receive the axially extending ribbing 352, 354 of the snap-in outlet component 346, the seal of the secondary cartridge is allowed to engage the radially inward facing sealing surface 437 of the snap-in outlet component 346 (see FIGS. 31 and 32).

It should be noted that the "snap-in outlet component" could be formed as an integral one piece construction with the first housing component. Alternatively, portions of the snap-in outlet component could be provided the first housing component while other portions are still provided by a snap-in component.

Figure 33:
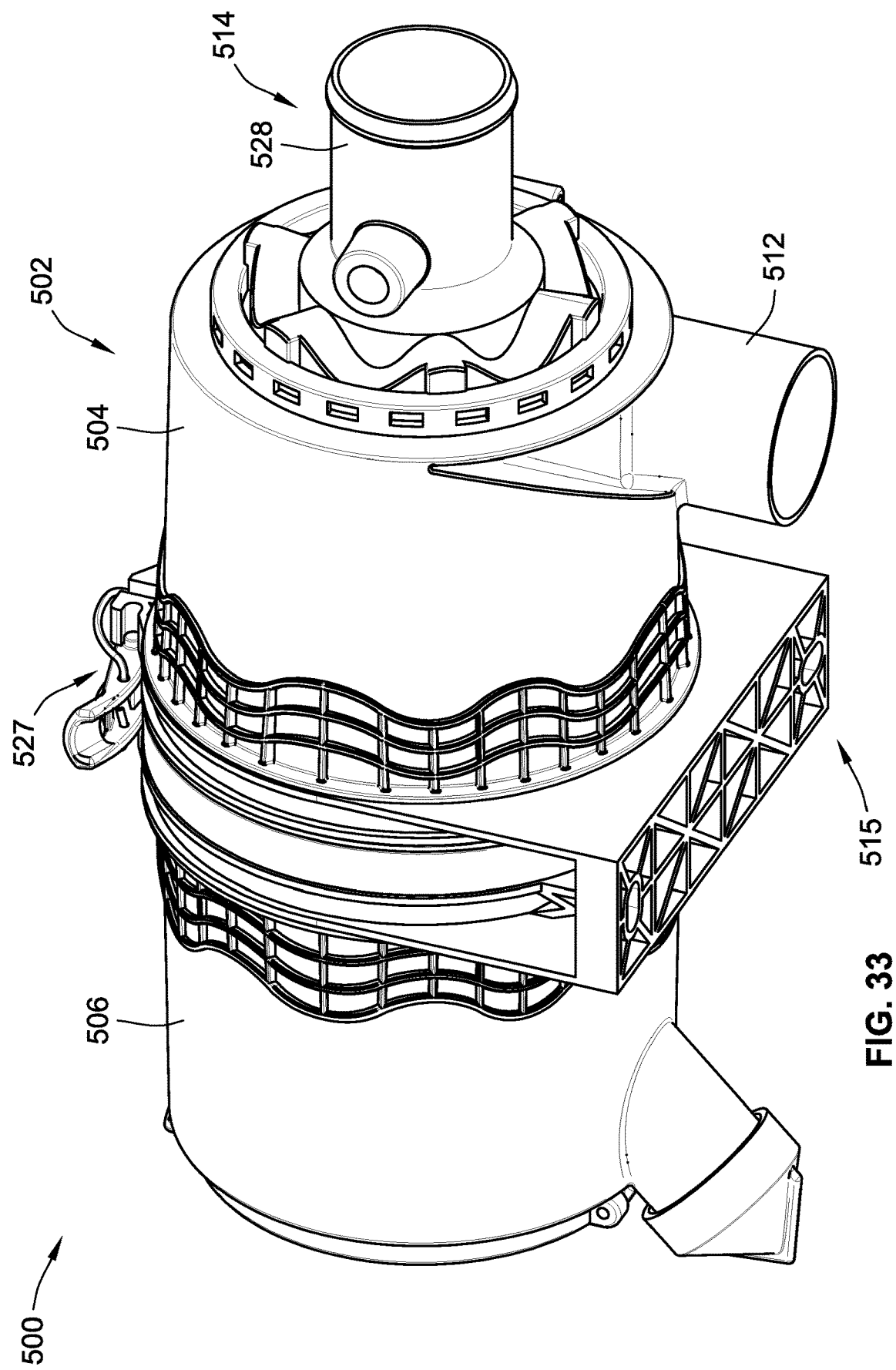
FIG. 33 illustrates a further embodiment of a filter assembly.

FIG. 33 illustrates a further embodiment of a filter assembly 500. The filter assembly 500 is similar in many respects to the prior filter assemblies and will incorporate an axially undulating wave seal arrangement. Any and all features of the wave seal arrangements described above can be incorporated into embodiments of the filter assembly 500.

Figure 34:
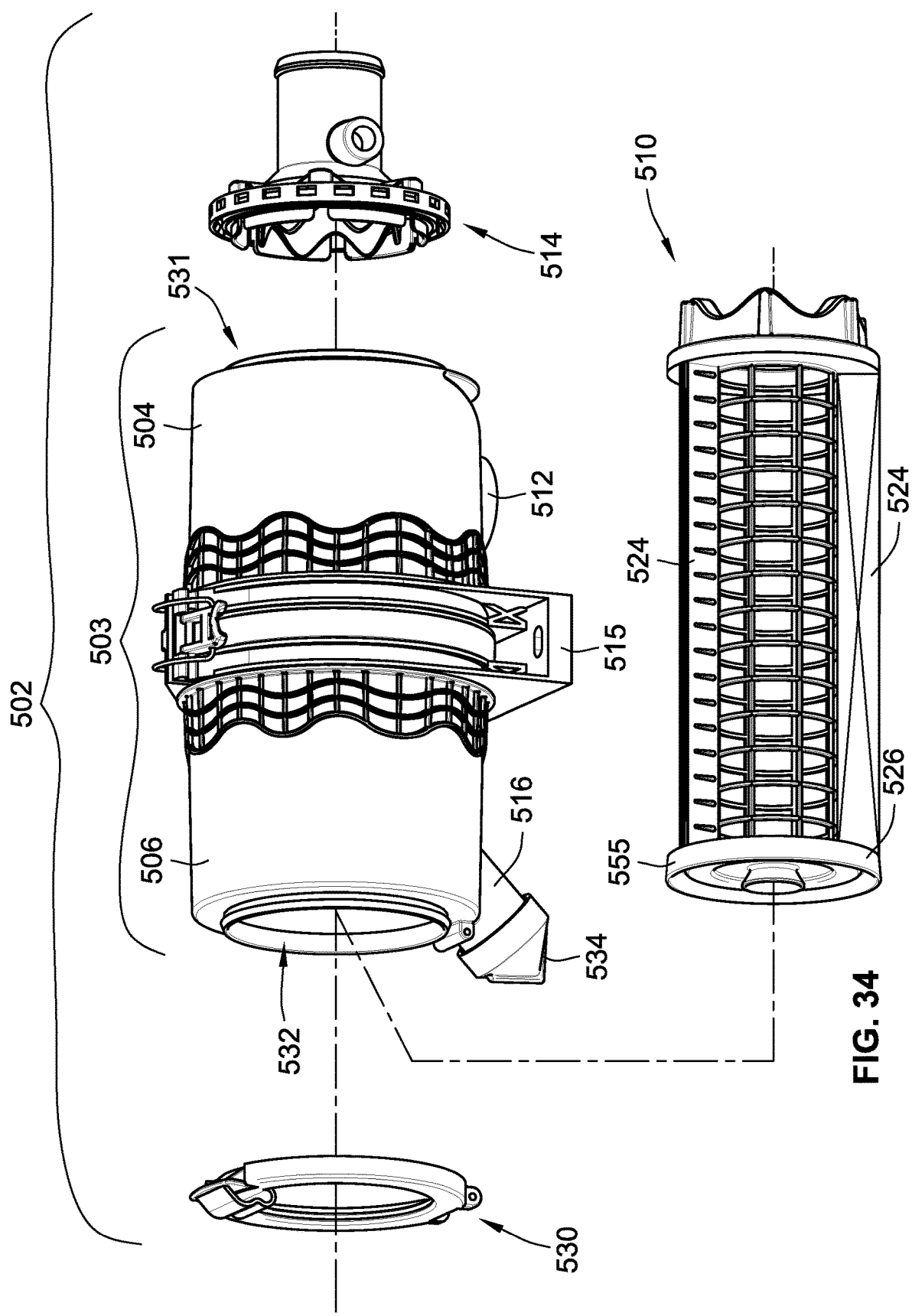
FIG. 34 is a partially exploded illustration of the filter assembly of FIG. 33.
Figure 35:
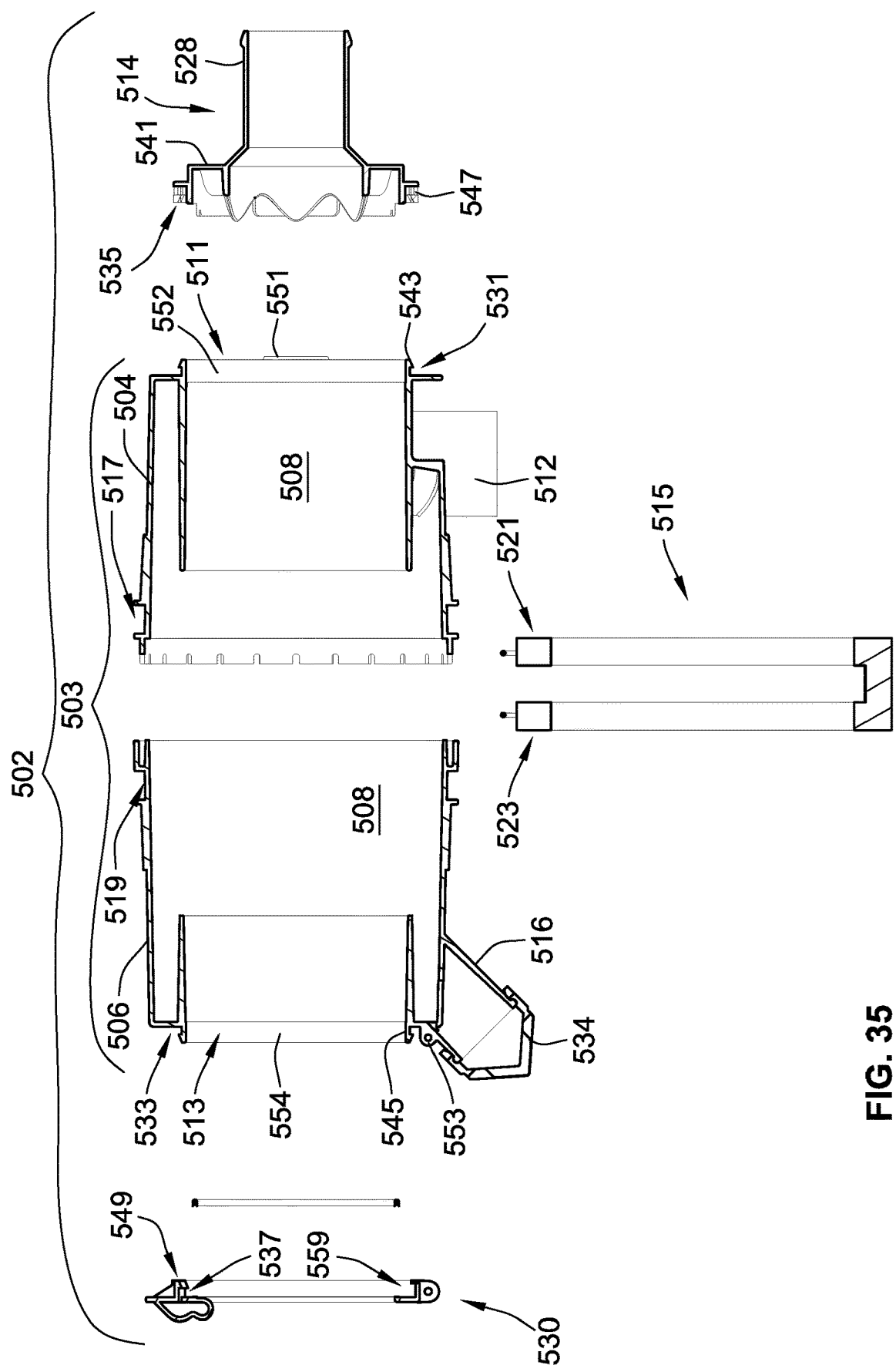
FIG. 35 is an exploded illustration of the filter housing of the filter assembly of FIG. 33.
Figure 36:
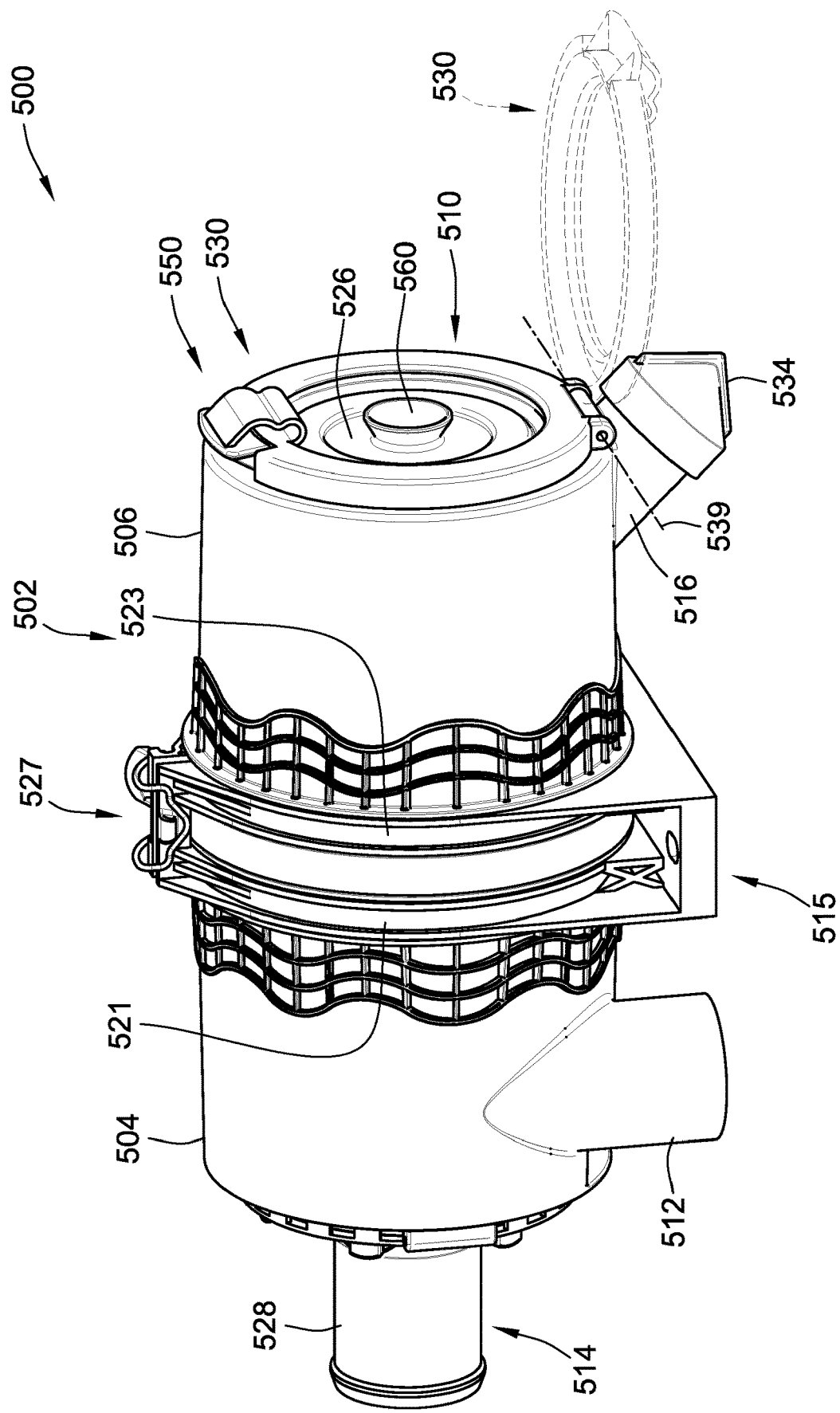
FIG. 36 is a further illustration of the filter assembly of FIG. 33 with the cover member in an open and closed state.
Figure 37:
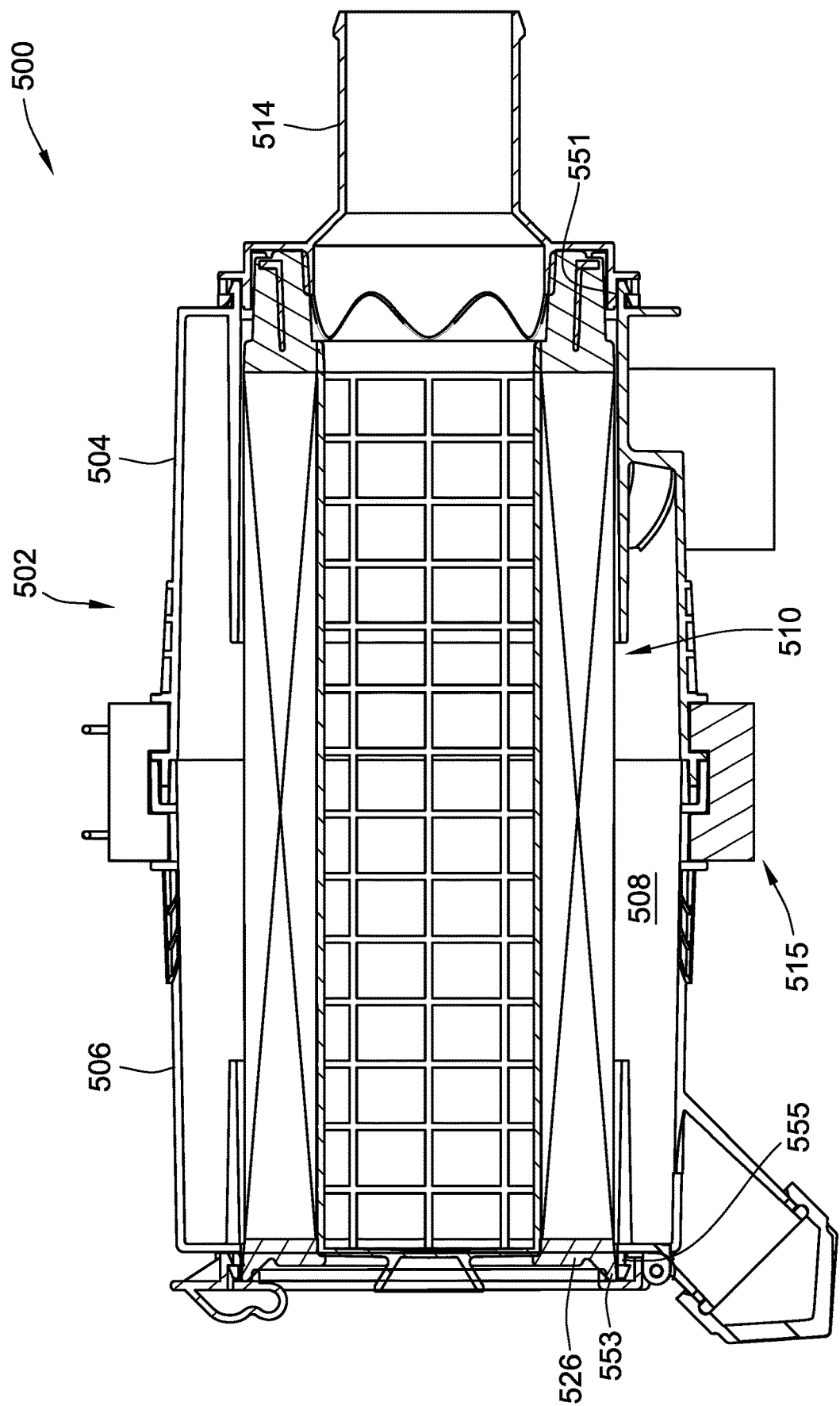
FIG. 37 is a cross-sectional illustration of the filter assembly of FIG. 33.
Figure 38:
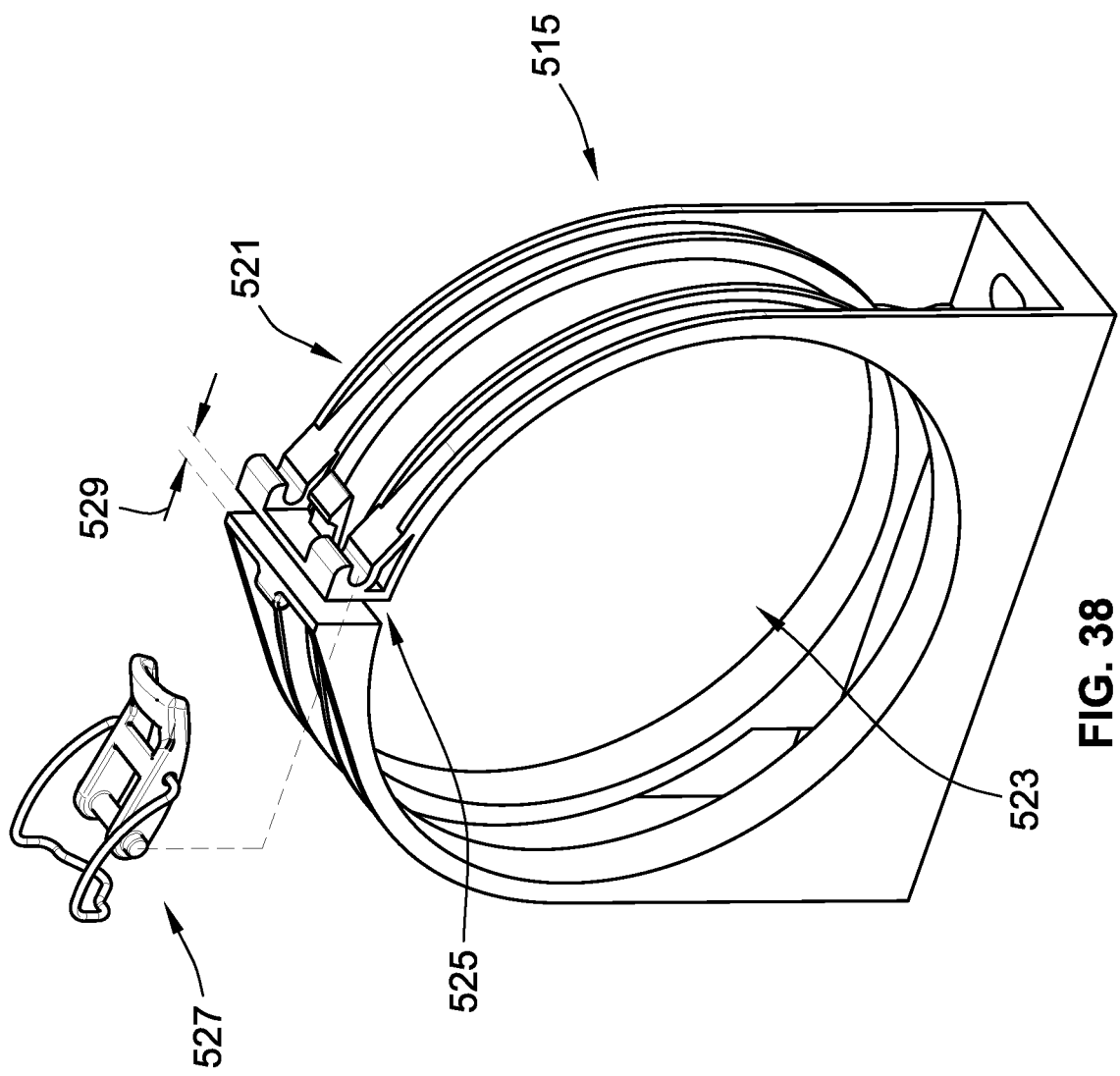
FIG. 38 illustrates a mounting bracket for the filter assembly of FIG. 33.

With additional reference to FIGS. 34-37, the filter assembly 500 includes a housing 502 (also referred to as a filter housing assembly) that includes a housing body 503 illustrated as being formed from a first housing component 504 and a second housing component 506 that are axially connected to one another to define an internal cavity 508 (see FIGS. 35 and 37) that receives a filter element 510 (illustrated in simplified form in FIGS. 34 and 37).

With principle reference to FIGS. 34, 35, the housing body 503 includes first and second openings 511, 513 opening into internal cavity 508. In this embodiment, the first and second openings 511, 513 are at opposed ends of the housing body 503. Further, each of the first and second housing components 504, 506 define one of the first and second openings 511, 513, respectively.

The first and second housing components 504, 506 are operably connectable together at ends opposite of first and second openings 511, 513. A mounting bracket 515 for mounting the filter assembly 500 to a device for which the filter assembly 500 will be filtering a desired fluid, typically air, secures the first and second housing components 504, 506 to one another. The mounting bracket 515 generally circumscribes the ends of the first and second housing components 504, 506. The first and second housing components include grooves 517, 519 that receive clamping segments 521, 523 of the mounting bracket to secure the two housing components 504, 506 axially together. The clamping segments 521, 523 are axially spaced apart forming a gap therebetween which receives a portion of the two housing components 504, 506 therebetween to secure the components together. Further, the clamping segments 521, 523 are generally annular broken rings with a break 525 in the rings which allows for the inner diameter of the clamping segments 521, 523 to be changed so as to allow for passing the housing components 504, 506 into the clamping segments 521, 523. A buckle arrangement 527 is carried by the mounting bracket 515 and releasable pulls the free ends of the clamping segments 521, 523 toward one another (see e.g. arrows 529) to tighten the clamping segments 521, 523 around the housing components 504, 506 and into grooves 517, 519. The buckle arrangement 527 can be released to separate the housing components 504, 506.

With reference to FIGS. 34 and 35, the first and second openings 511, 513 are sized for receipt of filter element 510 there through to all for mounting the filter element 510 within the internal cavity 508 through either opening 511, 513. The filter housing assembly 502 includes a fluid port component 514 that defines an outlet port for the housing assembly 503. The outlet port is provided by a tubular connector 528 that is configured for connecting to downstream piping such as rubber houses that will carry away cleaned air after passing through the filter assembly 500. The outlet is in fluid communication with cavity 508 through the fluid port component 514.

The first housing component 504 also defines a second fluid port in the form of a dirty fluid inlet 512. This is where dirty fluid enters the internal cavity 508. The filter element 510 operably seals to the fluid port component 514 to prevent dirty fluid from operably bypassing the filter element 510 and passing through the outlet. A shield 518 is positioned adjacent inlet 512 to prevent direct impingement of dirty fluid on the filter media 524 of the filter element 510.

When installed, the filter element 510 is thus positioned within the internal cavity 508 between the inlet and the outlet.

A dust evacuation port 516 can be provided and includes a valve 534 that allows dust that has been separated from the dirty fluid upstream of the filter media 524 to be evacuated from the filter housing 502. In this embodiment, the inlet 512 is provided by the first housing component 504 while the dust evacuation port 516 is provided by the second housing component 506.

Opposite the fluid port component 514 is a cover member 530. The cover member is selectably movable between a closed state that prevents removal of the filter element 510 from the internal cavity and an open state that allows a user to remove a filter element 510 from the internal cavity 508 and to install a new filter element 510 into the internal cavity 508.

While comparing FIGS. 35, 36, 40 and 41, the filter housing assembly 502 is reconfigurable between at least two separate configurations. More particularly, the fluid port component 514 and cover member 530 may be attached proximate either of the first and second openings 511, 513. For example, in FIG. 36, the fluid port component 514 is attached to the first housing component 504 proximate first opening 511. Additionally, the cover member 530 is attached to the second housing component 506 proximate second opening 513. In this embodiment, the filter element 510 would be selectively insertable into and removable from the filter housing 502 through the second opening 513.

Figure 40:
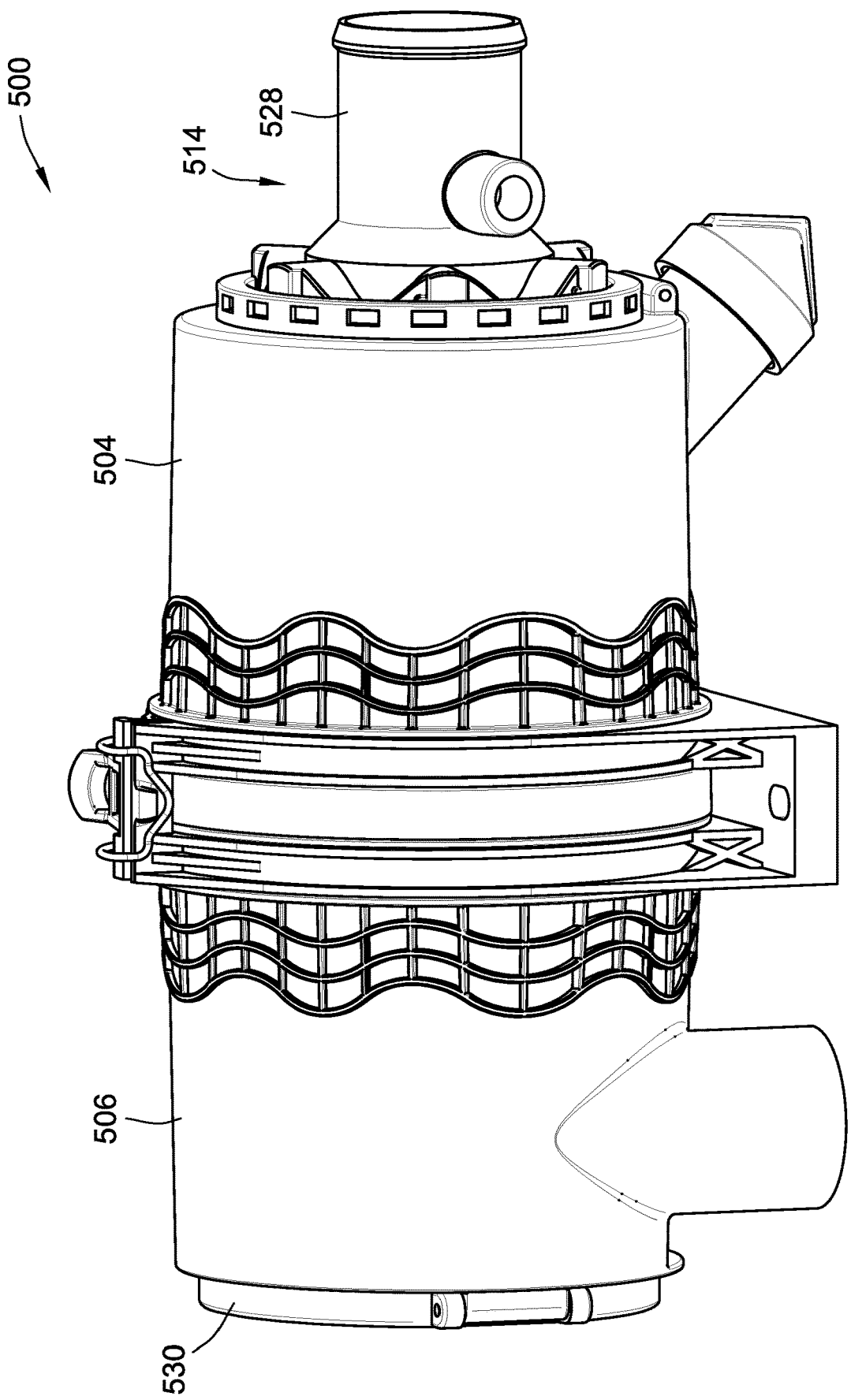
FIG. 40 illustrates the filter assembly of FIG. 33 in a second configuration.
Figure 41:
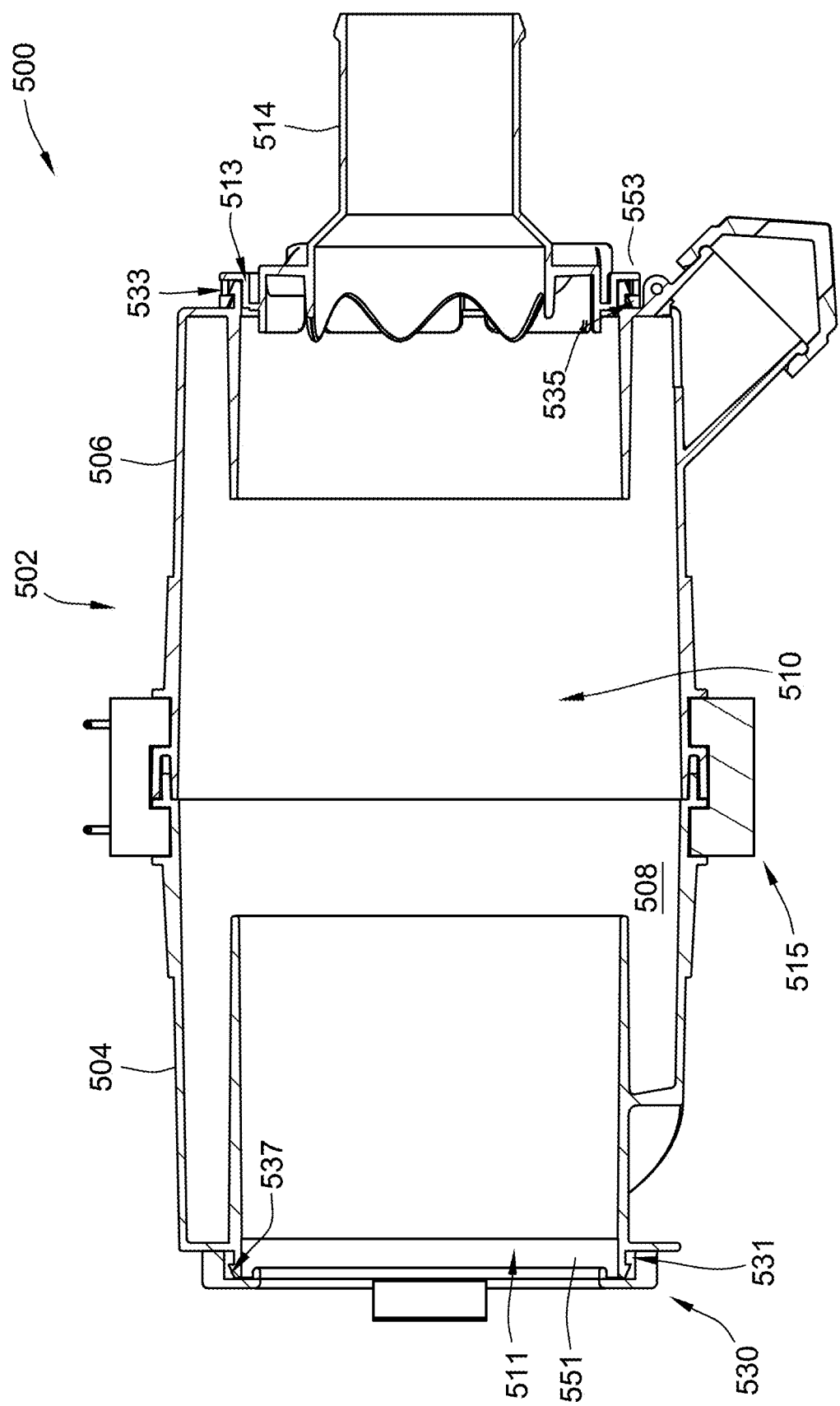
FIG. 41 is a cross-section illustration of the filter housing of the filter assembly of FIG. 33 in the second configuration.

However, in FIG. 40, the fluid port component 514 is attached to the second housing component 506 proximate second opening 513. Additionally, the cover member 530 is attached to the first housing component 504 proximate first opening 511. In this embodiment, the filter element 510 would be selectively insertable into and removable from the filter housing 502 through the second opening 513.

This allows the same filter housing assembly 502 to be used in different locations having different sized and shaped spaces for mounting the filter housing assembly 502, e.g. different sized and shaped engine compartments of vehicles.

With reference to FIGS. 35 and 37, the first housing component 504 includes a first attachment interface 531 proximate first opening 511 and the second housing component 506 includes a second attachment interface 533 proximate the second opening 513. The housing interfaces 531, 533, in this embodiment, are substantially, if not, identical.

Further, the fluid port component 514 includes a first housing attachment interface 535 and the cover member 530 includes a second housing attachment interface 537.

In the first configuration, the first housing attachment interface 535 is engaged with the first attachment interface 531 to secure the fluid port component 514 to first housing component 504 of the housing body 503 proximate the first opening 511. When so attached, the outlet port provided by the tubular connector 528 fluidly communicates with internal cavity 508 through the first opening 511. Further, the second housing attachment interface 537 is engaged with the second attachment interface 533 to secure the cover member 530 to the second housing component 506 of the housing body 503 proximate the second opening 513. As noted above, the cover member 530 is selectively movable, e.g. pivotable about an axis 539 illustrated in FIG. 36, between a closed state (see solid lines in FIG. 36) and an open state (see dashed liens in FIG. 36). In the closed state, the cover member 530 will engage the filter element 510 and prevent it from being removed from internal cavity 508 through the second opening 513. In the open state, the cover member 530 has pivoted about axis 539 sufficiently out of the way of opening 513 to permit removal of the filter element 510 and insertion of a new filter element 510. The openings 511, 513 define central axis extending through the openings 511, 513. Axis 539 is perpendicular to the central axes defined by openings 511, 513.

In the second configuration, the first housing attachment interface 535 is engaged with the second attachment interface 533 to secure the fluid port component 514 to the second housing component 506 of the housing body 503 proximate the second opening 513. When so attached, the outlet port provided by the tubular connector 528 fluidly communicates with internal cavity 508 through the second opening 513. Further, the second housing attachment interface 537 is engaged with the first attachment interface 531 to secure the cover member 530 to the first housing component 504 of the housing body 503 proximate the first opening 511. As noted above, the cover member 530 is selectively movable, e.g. pivotable about an axis, between a closed state and an open state. This is the same as illustrated in FIG. 36, but with the cover member 530 pivoted relative to the first housing component 504 rather than the second housing component 506 as in FIG. 36. In the closed state, the cover member 530 will engage the filter element 510 and prevent it from being removed from internal cavity 508 through the first opening 511. In the open state, the cover member 530 has pivoted about the axis sufficiently out of the way of opening 511 to permit removal of the filter element 510 and insertion of a new filter element 510.

With reference to FIG. 35, in addition to the tubular connector 528, the fluid port component 514 includes a base member 541 from which the tubular connector 528 extends.

Further, the first attachment interface 531 of the first housing component 504 includes an axially extending projection in the form of ring 543 that includes a radially projecting projection. Similarly, the second attachment interface 533 includes an axially extending ring 545 that includes a radially projecting projection. These projections project radially outward, but it is contemplated that they could project radially inward.

To cooperate with the first and second attachment interfaces 531, 533, the first housing attachment interface 535 and second housing attachment interface 537 include radially projecting projections 547, 549. These projections extend radially inward but could extend radially outward.

To allow for the hinged connection of the cover member 530 to allow for selective servicing of the system, the first attachment interface 531 and second attachment interface 533 include hinge components 551, 553 that operably cooperate with the cover member 530 depending on the configuration of the filter housing 502 and which end of the housing body 503 to which the cover member 530 and fluid port component 514 are attached. With additional reference to FIG. 42, it is noted that radially inward extending projection 549 of the cover member is provided as part of a user operable latch 550 (see also FIG. 36). If a user applies a force in the direction of arrow 556, the latch will bend disengaging the radially extending projection of the cover member 530 from the radially extending projection of the corresponding one of the first and second attachment interfaces 531, 535. Further, the radially extending projections are configured to allow the latch to flex appropriately when closing the cover to allow the radially extending projections to slide past one another and then resiliently engage when sufficiently passed to allow for latching the cover member 530 to the housing body 530.

It is noted that the attachment interfaces 531, 533, 535, 537 need not be perfectly identical or that the various engagements occur in identical fashion. Thus, the attachment interface of the fluid port component 514 need not engage the attachment interfaces of the housing body 503 in a same manner as the attachment interface of the cover member 530 engages the attachment interfaces of the housing body 503. It simply needs to be that the attachment interfaces of the housing body 503 be configured to correctly and operably attach each of the cover member 530 and fluid port component 514 at either end as desired by the user.

While cooperating radially extending projections are illustrated, other connections could be provided such as for example buckles.

With reference to FIG. 35, the housing body 503 includes first and second seal surfaces 552, 554. In this embodiment, the seal surfaces 552, 554 are formed by radially inner surfaces of axially extending annular rings 543, 545. With reference to FIG. 34, the filter element 510 includes a tubular extension of filter media 524 that extends between opposed ends. A closed end cap 526 is attached to one end of the filter media 524. The closed end cap 526 defines a seal 555 that cooperates with the first and second seal surfaces 552, 554, depending on the particular configuration of the system. More particularly seal 555 is a radial seal that will radially engage seal surface 554 in the first configuration and seal surface 552 in the second configuration.

Figure 42:
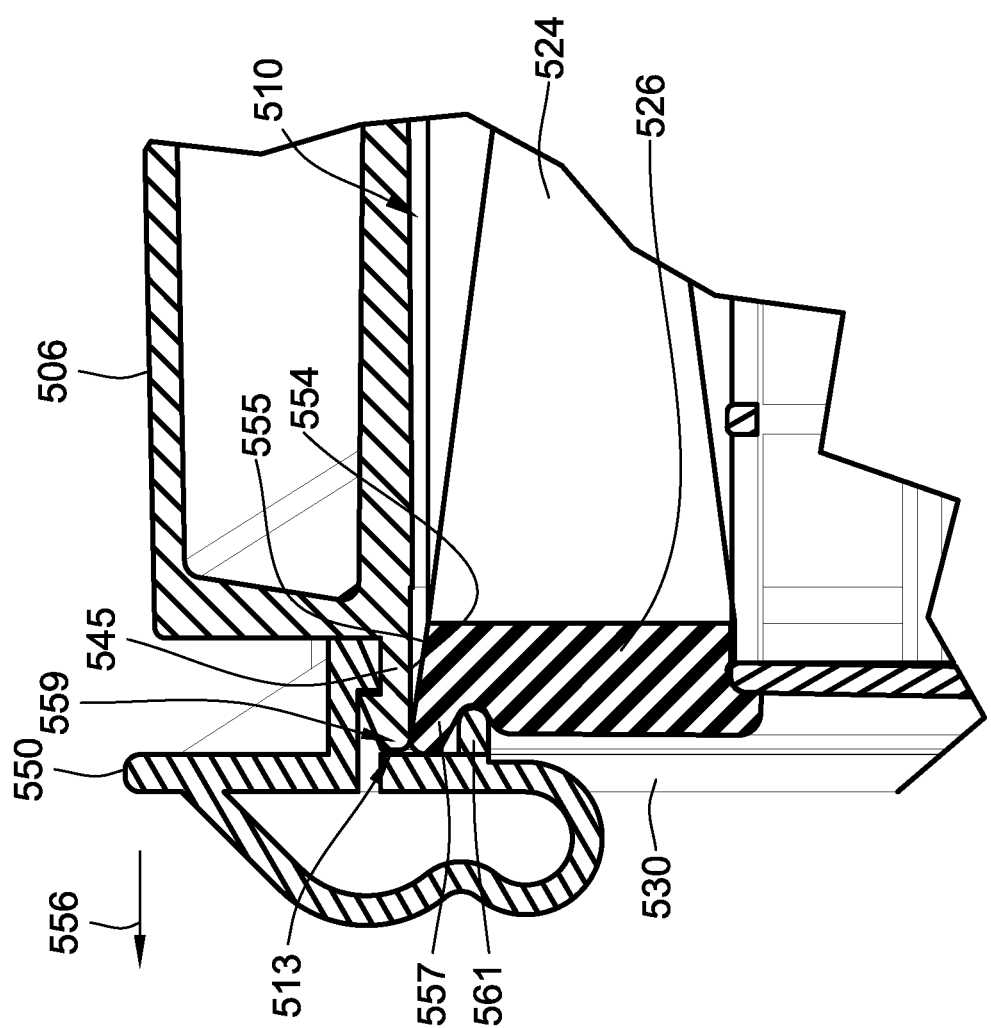
FIG. 42 is an enlarged cross-sectional illustration of the cover member attached to a housing component.

With additional reference to FIG. 42, seal 555 includes an annular projection 557 (also referred to as an annular ring) that is axially received in an annular groove 559 (see also FIG. 35 for groove 559) formed by the cover member 530 when the closed state. Further, the axially extending rings 543, 545 of the housing body 503 proximate first and second openings 511, 513 are axially received in annular groove 559 depending on the configuration when the cover member 530 is in a closed state.

The cover member 530 includes an axially extending projection 561, which may be an annular wall, preferably radially engages annular projection 557 of seal 555 to force, radially in this embodiment, seal 555 into seal surface 552 or 554 (depending on the configuration). The annular wall may or may not form a complete annular structure but even if it is a segment that generally forms an annular structure, it shall be considered to be annular. While this design uses an annular groove 559, a simple annular projection 561 (also referred to as a ring) could be used to provide the radial biasing. Further, as noted above, such an annular projection 561 need not be continuous but could be formed from a plurality of wall segments. Further, while radial seals are provided, axial seals and axial compression of the seal into an axially facing sealing surface of the filter housing 502 could be incorporated in alternative embodiments. Again, while FIG. 42 only shows one of the configurations, the operation would be identical for the other configuration with the cover member 530 attached to the opposite end proximate the other opening in the housing body.

The annular groove 559 is formed in an annular collar of the cover member 530. In some embodiments, the annular collar forms the entire cover member 530.

The closed end cap 526 can be formed from a combination of components such as a soft foamed outer rim that provides the seal and a rigid inner component. The presently illustrated design includes such a construction. Alternatively, the closed end cap could be formed continuously from the soft material molded directly to the filter media or having the filter media embedded therein. Further, the soft material could be preformed and then subsequently attached to either a rigid support or directly to the filter media. Further, any rigid material could be preformed or molded directly to the filter media.

A handle could be provided by the closed end cap 526. This handle could be an axially extending projection or a recess that is engageable by a service technician. FIG. 26 illustrates the inclusion of a handle 560. This handle 560 is an axial projection that is formed from a rigid component of the closed end cap 526. The rigid portion of the closed end cap is an imperforate end portion of a rigid central core used to support the filter media. However, the imperforate end portion could have a recess that is used to help remove a filter element from the filer housing body 503.

In this embodiment, the cover member 530 includes an annular ring member for securing the filter element 510 within the housing body 503. As such, in this embodiment, the actual filter element 510 is visible through the opening defined by the annular construction of the cover member 530 when the cover member 520 is in a closed state.

It shall be readily apparent that the inner diameter of the annular ring member of the cover member 530 is smaller than an outer diameter of the closed end cap 526 such that when in the closed state there is sufficient overlap between the closed end cap 526 and the cover member 530 to secure the filter element 510 within the housing body 530. Thus, the cover member 530 is configured such that it will extend radially inward relative to the openings 511, 513 of the housing body in the closed state for securing the filter element 510. Additionally, the hinged connection of, at least the ring portion of the cover member 530 that secures the filter element 510 in the housing body 503, is such that the ring portion can pivot sufficiently out of the way to the open state such that the filter element 510 can be installed and removed as necessary for maintenance purposes. Again, such pivoting is provided about axis 539. FIG. 36 illustrates these orientations of the cover member 530.

Figure 43:
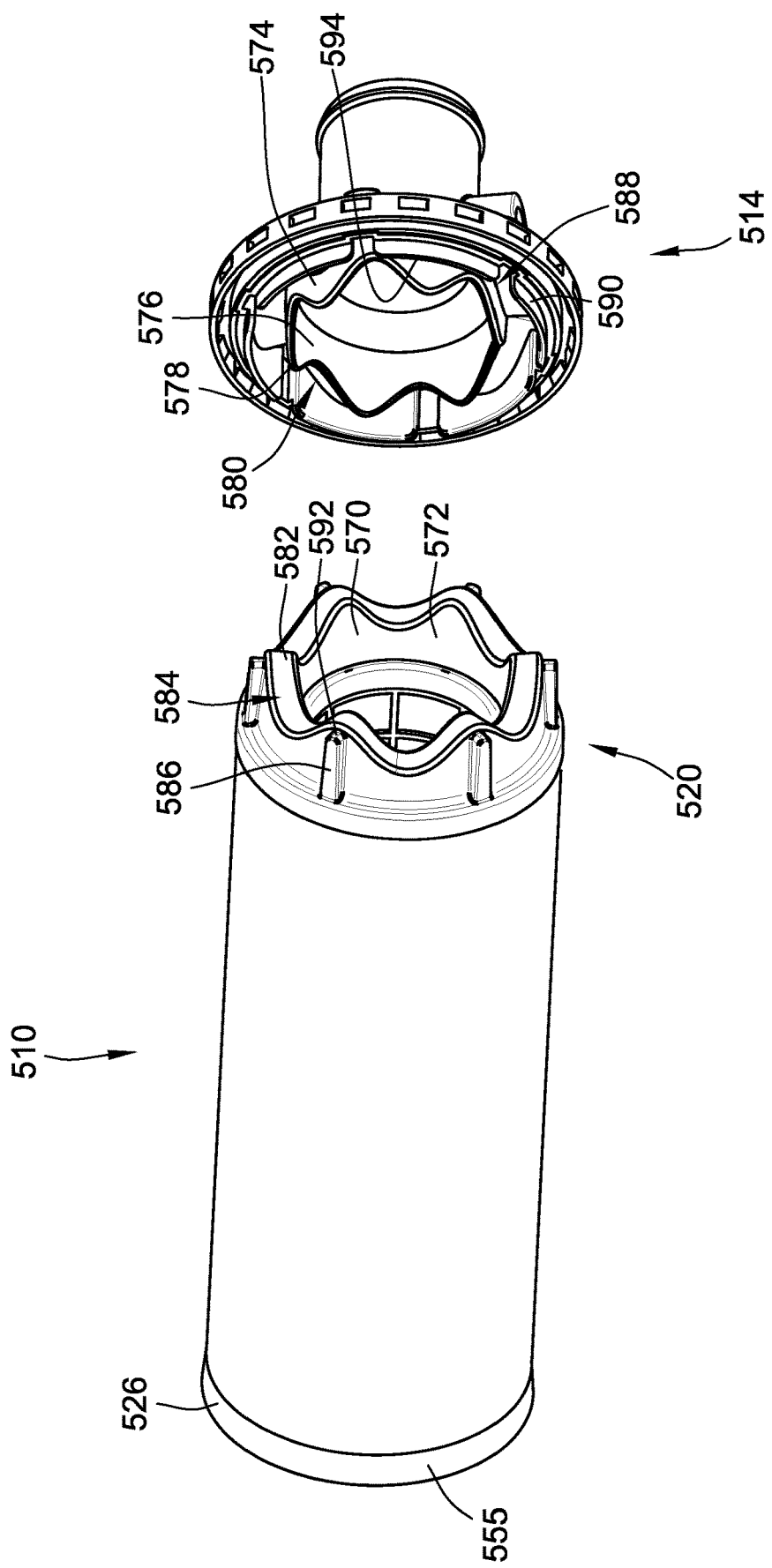
FIG. 43 illustrates a filter element and the fluid port component of the filter assembly of FIG. 33.

With additional reference to FIG. 43, a contoured end member 520 is provided at an opposite end of the filter element 510 as the closed end cap 526. As noted above, the filter assembly 500 can incorporate any of the iterations of the axially undulating wave features of the prior embodiments.

However, in this embodiment all of the axially undulating mating features of the filter housing 502 are provided by the fluid port component 514. More particularly, the features for providing angular orientation and sealing with the contoured end member 520 are provided by fluid port component 514.

The engagement of the filter element 510 with the filter housing 502 is similar to the design illustrated in FIGS. 17-21, 22A, and 22-26. In this embodiment, the contoured end member 520 defines a radially inner surface 570 that defines a radially inward directed sealing surface 572 that defines an axially undulating wave profile for operably radially sealing on sealing surface 574 provided by a radially outer surface of ring member 576 of the fluid port component 514. The ring member 576 has an axially undulating wave profile that matches that of the sealing surface 572 of the contoured end member 520. The axially undulating wave profile of ring member 576 is provided by projections 578 and valleys 580 formed between adjacent projections 578. The cooperating wave profiles of the ring member 576 and contoured end member 520 have sufficient axial dimension to allow for a positive seal between the filter element 510 and the housing 502. The contoured end member 520 includes a plurality of axially extending projections 582 and valleys 584 formed angularly between adjacent projections 582 provide the wave profile for the contoured end member 520. Projections 578 and 582 generally surround a central axis and form generally annular walls. The depth of the valleys 580 and height of the projections 578 are, preferably, such that an simple o-ring style seal that does not have axial undulations cannot be installed into the filter housing and form a continuous seal completely around the central axis.

A plurality of radially extending projections 586 extend radially outward from the projections 582 of the contoured end member 520. These projections 586 are axially received in axially extending grooves 588 formed by the fluid port component 514. The grooves 588 are formed between axially extending, angularly spaced apart wall segments 590. Wall segments 590 form a generally annular wall that has angularly spaced apart interruptions formed by grooves 588. In accordance with the discussions above, the positioning of the ends 592 of the projections 586 is such that these ends 592 will abut axial free ends 594 of the wall segments 590 prior to full sealing engagement between the countered end member 520 and the filter housing 502, e.g. fluid port component 514. Instead, the projections 586 must be axially received in grooves 588 for the filter element to be properly seated into the filter housing 502. Further, the length of the filter element 510 (e.g. between ends 592 and the distal end of the closed end cap 526) is such that if the projections 586 are abutting free ends 594 rather than being inserted into grooves 588, the cover member 530 cannot be transitioned to the closed state. More particularly, the length is such that the wave profile of the radially engaging sealing surfaces 572 and 574 will not fully engage unless the filter element 510 is properly angularly oriented and axially inserted into the filter housing 502 with the projections 586 received in grooves 588.

Figure 44:
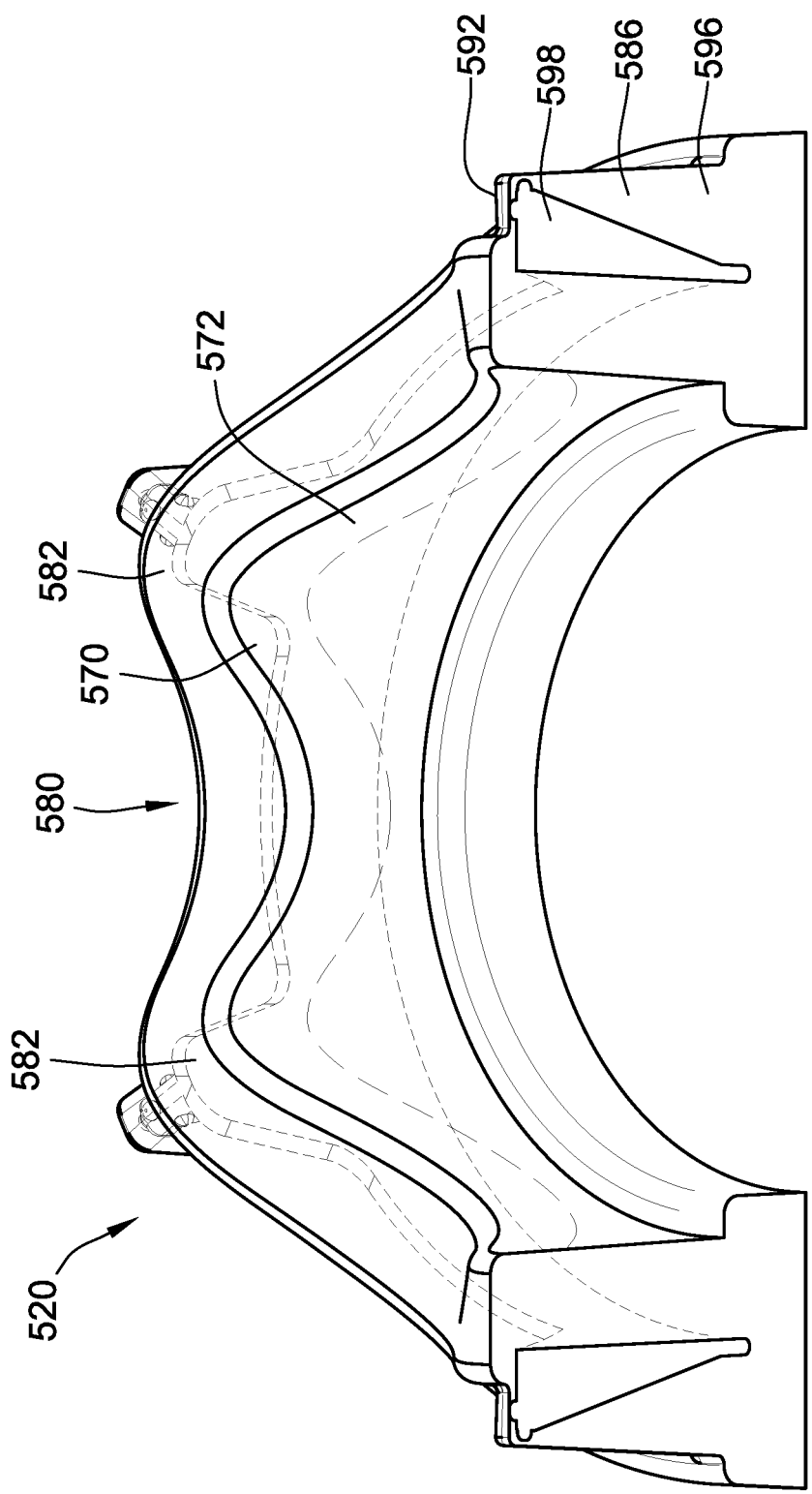
FIGS. 44 and 45 illustrate the contoured end member of the filter element of the filter assembly of FIG. 33.
Figure 45:
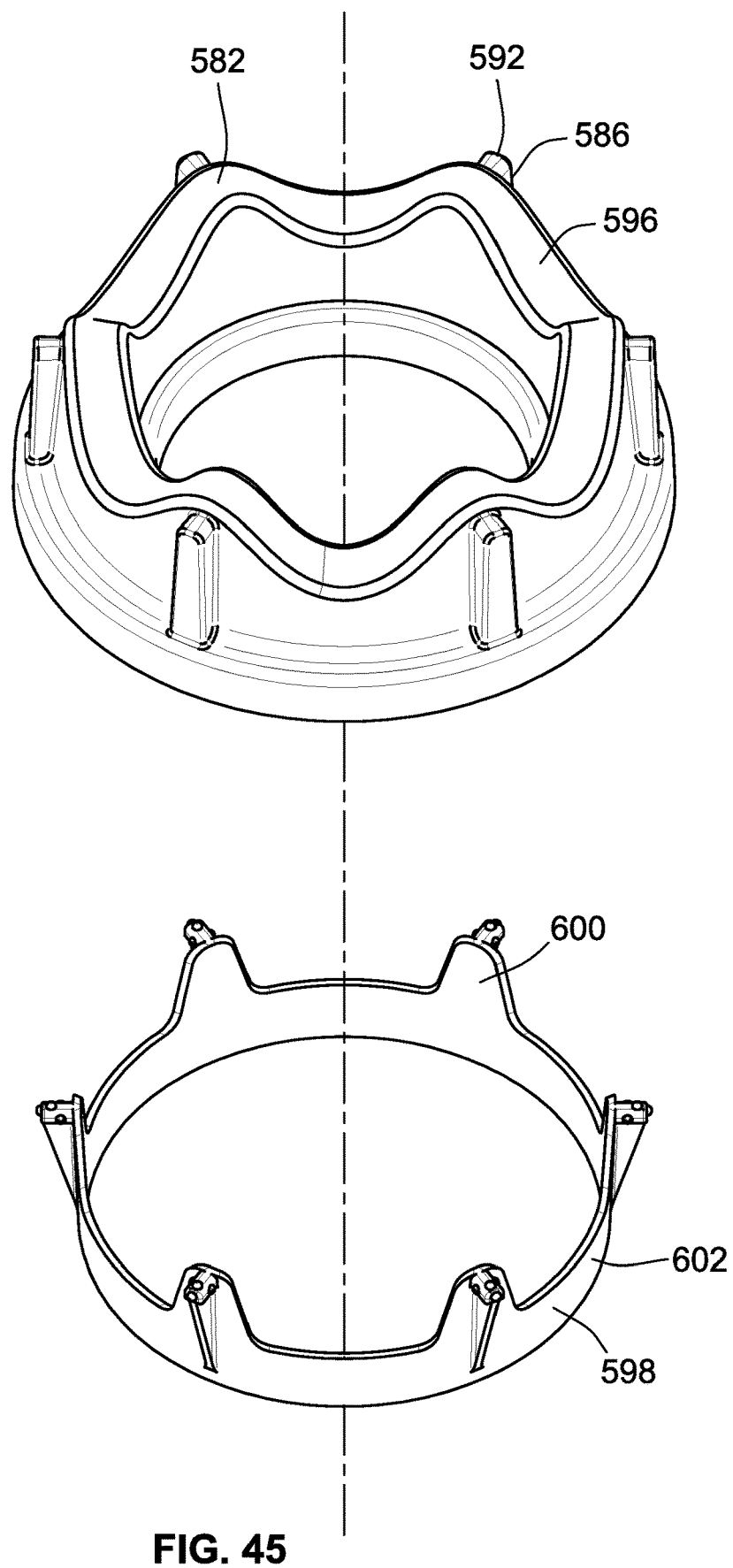

With reference to FIGS. 44 and 45, the countered end member 520 is formed from multiple components. In this embodiment, the countered end member 520 has an outer soft component 596 that defines the sealing surface 572. Further, the countered end member 520 includes an inner rigid component 598 that provides support to the projections 586. More particularly, the rigid component 598 includes a plurality of angularly spaced apart legs 600 that angularly and axially align with projections 582 and projections 586. Typically, the rigid component 598 will have an annular base member 602 from which the legs 600 axially project to provide further stability to the contoured end member 520.

Typically, the rigid component 598 is formed from a preformed material. The outer soft component 596, such as a urethane and more particularly a foamed urethane, will encapsulate the rigid component 598. In some embodiments, an end of the filter media 524 and the rigid component 598 will be placed in a mold and the soft component 596 will be molded around the rigid component 598 and to the filter media 524 to secure the components to one another. Further, the rigid component 598 is formed from a material that is more rigid than the material for forming the soft component 596. In some embodiments, this would be a rigid plastic material or could be formed from other material such as metal. Further yet, it could be formed from a more rigid urethane material.

The rigid component 598 provides rigidity to prevent the projections 586 from deforming if a user applies excessive axial force to the filter element 510 during installation without properly aligning projections 586 with grooves 588.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter cartridge comprising:
filter media:
a contoured end member including a contoured alignment portion and a contoured seal portion;
wherein:
the contoured alignment portion is an axial end portion of the contoured end member, the axial end portion defining a wave profile formed by a plurality of axially extending alignment projections.
the contoured seal portion provides a radially directed seal surface that has a contoured profile in the axial direction and is provided by a plurality of axially extending seal projections;
wherein the alignment projections extend an axial distance that is at least twice an axial distance of the seal projections.

2. A filter cartridge comprising:
filter media;
a contoured end member including a contoured alignment portion and a contoured seal portion; and
wherein the contoured seal portion of the contoured end member has a plurality of axially extending projections that form a wave profile and define a radially facing seal surface and the contoured alignment portion of the contoured end member includes at least one alignment projection extending axially that is positioned radially outward of the wave profile.

3. The filter cartridge of claim 2, wherein the contoured end member is formed from at least two pours of material.

4. The filter cartridge of claim 3, wherein the two pours of material have different rigidities.

5. The filter cartridge of claim 2, wherein the contoured end member includes a preform and a second material poured over, at least in part, the preform.

6. The filter cartridge of claim 2, wherein the alignment projection is more rigid than the wave profile.

7. A filter assembly comprising:
a filter cartridge according to claim 2;
a filter housing having an internal cavity receiving the filter cartridge;
an alignment feature and a seal feature, the alignment feature cooperating with the contoured end member of the filter cartridge to angularly align the filter cartridge within the filter housing and the seal feature cooperating with the contoured end member to form a seal between the filter housing and the filter cartridge.

8. The filter assembly of claim 7, wherein the housing has a first housing component and the alignment feature is provided by the first housing component;
wherein the seal features is provided by a second component attached to the first housing component.

9. The filter assembly of claim 8, wherein the second component is snap attached to the first housing component.

10. The filter assembly of claim 7, wherein the housing includes a first housing component; and
wherein the seal and alignment features are provided by a second component attached to the first housing component.

11. A filter cartridge comprising:
filter media;
a contoured end member including a contoured alignment portion and a contoured seal portion;
wherein the the contoured alignment portion of the contoured end member includes a plurality of castellations that form alternating first and second axially extending slots, the first and second slots having different axial lengths.

12. A filter assembly comprising:
a filter element;
a reconfigurable filter housing assembly including:
a housing body defining an internal cavity, a first opening into the internal cavity and a second opening into the internal cavity,
a fluid port component including a first fluid port; and
a cover member;
wherein:
in a first configuration, the first fluid port component is attached to the housing body proximate the first opening with the first fluid port in fluid communication with the internal cavity through the first opening and the cover member is attached to the housing body proximate the second opening, the cover member configured to prevent removal of the filter element through the second opening when in a closed state and configured to permit removal of the filter element through the second opening when in an open state; and
in a second configuration, the first fluid port component is attached to the housing body proximate the second opening with the first fluid port in fluid communication with the internal cavity through the second opening and the cover member is attached to the housing body proximate the first opening, the cover member configured to prevent removal of the filter element through the first opening when in a closed state and configured to permit removal of the filter element through the first opening when in an open state: and
the filter element including:
a contoured end member including a contoured alignment portion and a contoured seal portion; and
filter media, positioned within the internal cavity of the housing body;
wherein the filter element is insertable into the housing body through the second opening in the first configuration and is insertable into the housing body through the first opening in the second configuration;
further comprising:
a second fluid port in fluid communication with the internal cavity;
the filter housing assembly includes a first housing seal surface provided by the housing body, a second housing seal surface provided by the housing body and a third housing seal surface provided by the fluid port component;
the filter element sealable between the second fluid port and the first fluid port to force dirty fluid to flow through the filter media as fluid flows between the first and second fluid ports;
the filter element including a first element seal member and a second element seal member;
the first filter element seal member sealing with the third housing seal member;
the second element seal member sealing with the second housing seal surface when inserted into the internal cavity in the first configuration and with the cover member in a closed state; and
the second element seal member sealing with the first housing seal surface when inserted into the internal cavity in the first configuration and with the cover member in a closed state.

13. The filter assembly of claim 12, wherein the housing body is formed from a plurality of body components connected together, one of the housing body components carrying the second fluid port.

14. The filter assembly of claim 12, wherein:
the cover member includes an annular collar member, the collar member defining an annular ring, the annular ring:
forces the second element seal member into the second housing seal surface when in the first configuration and when the cover member is in the closed state; and
forces the second element seal member into the first housing seal surface when in the second configuration and when the cover member is in the closed state.

15. The filter assembly of claim 14, wherein the annular collar member is hingedly attached for selective pivoting between the closed state and the open state.

16. The filter assembly of claim 12, wherein:
the cover member includes an annular collar member, the collar member having an outer diameter being greater than a diameter of the first opening and being greater than a diameter of the second opening, the annular collar having an inner diameter being smaller than the diameter of the first opening and being smaller than the diameter of the second opening;
the annular collar overlapping, in part, the first opening when in the closed state in the second configuration and overlapping, in part, the second opening when in the closed state in the first configuration.

17. The filter assembly of claim 16, wherein the filter element includes:
an extension of filter media extending between a first end a second end,
a first end cap attached to the first end being a closed imperforate end cap and including the second element seal member;
the first end cap exposed through the annular collar when in the closed state in the first configuration;
the first end cap exposed through the annular collar when in the closed state in the second configuration.

18. The filter assembly of claim 17, wherein:
the housing assembly includes a first axially extending annular flange proximate the first opening providing the first seal surface;
the housing assembly includes a second axially extending annular flange proximate the second opening providing the second seal surface;
the annular collar defining an annular groove;
the second axially extending annular flange and a portion of the first end cap being axially received into the annular groove if in the first configuration with the cover member in the closed state;
the first axially extending annular flange and a portion of the first end cap being axially received into the annular groove if in the second configuration with the cover member in the closed state.

19. The filter assembly of claim 18, wherein the closed imperforate end cap includes an axially extending portion that is axially received in the groove when the cover member is in the closed state.

20. The filter assembly of claim 19, wherein the axially extending portion is an annular ring portion, the ring portion radially tapering when moving axially away from the filter media.

21. The filter assembly of claim 19, wherein the axially extending portion is formed from a resilient member that may be radially flexed when engaged by the cover member in the closed state.

22. A filter assembly comprising:
a filter element
a reconfigurable filter housing assembly including:
a housing body defining an internal cavity, a first opening into the internal cavity and a second opening into the internal cavity.
a fluid port component including a first fluid port; and
a cover member;
wherein:
in a first configuration, the first fluid port component is attached to the housing body proximate the first opening with the first fluid port in fluid communication with the internal cavity through the first opening and the cover member is attached to the housing body proximate the second opening, the cover member configured to prevent removal of the filter element through the second opening when in a closed state and configured to permit removal of the filter element through the second opening when in an open state; and
in a second configuration, the first fluid port component is attached to the housing body proximate the second opening with the first fluid port in fluid communication with the internal cavity through the second opening and the cover member is attached to the housing body proximate the first opening, the cover member configured to prevent removal of the filter element through the first opening when in a closed state and configured to permit removal of the filter element through the first opening when in an open state: and
the filter element including:
a contoured end member including a contoured alignment portion and a contoured seal portion; and
filter media, positioned within the internal cavity of the housing body;
wherein the filter element is insertable into the housing body through the second opening in the first configuration and is insertable into the housing body through the first opening in the second configuration;
wherein:
the housing body includes a first annular ring adjacent the first opening including a radially extending projection and a second annular ring adjacent the second opening including a radially extending projection;
the fluid port component including a radially extending projection engaging the radially extending projection of the first annular ring in the first configuration to secure the fluid port component to the housing body and engaging the radially extending projection of the second annular ring in the second configuration to secure the fluid port component to the housing body;
the cover member including a radially extending projection engaging the radially extending projection of the second annular ring in the first configuration to secure the cover member to the housing body and engaging the radially extending projection of the first annular ring in the second configuration to secure the cover member to the housing body.

23. The filter assembly of claim 22, wherein the radially extending projection of the cover member is provided by a latch for selectively disengaging and engaging the radially extending projection of the cover member relative to the radially extending projection of the first and second annular rings to allow for selective securement and release of the filter element from the filter housing body.

* * * * *

UNITED STATES PATENT AND TRADEMARK OFFICE
CERTIFICATE OF CORRECTION

PATENT NO. : 11,136,947 B2
APPLICATION NO. : 16/014611
DATED : October 5, 2021
INVENTOR(S) : Michael J. Von Seggern et al.

It is certified that error appears in the above-identified patent and that said Letters Patent is hereby corrected as shown below:

In the Claims

Column 19, Claim 11, Line 36 currently reads "Wherein the the contoured alignment portion of the" and should correctly read -- Wherein the contoured alignment portion of the --

Column 21, Claim 17, Line 6 currently reads "a second end" and should correctly read -- and second end --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*